United States Patent
Pesik et al.

(10) Patent No.: US 12,170,030 B2
(45) Date of Patent: Dec. 17, 2024

(54) AIRCRAFT DOOR CAMERA SYSTEM FOR ENGINE INLET MONITORING

(71) Applicant: Rosemount Aerospace Inc., Burnsville, MN (US)

(72) Inventors: Joseph T. Pesik, Eagan, MN (US); Jonathan Boer, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 149 days.

(21) Appl. No.: 17/886,185

(22) Filed: Aug. 11, 2022

(65) Prior Publication Data

US 2023/0050216 A1    Feb. 16, 2023

Related U.S. Application Data

(60) Provisional application No. 63/231,840, filed on Aug. 11, 2021.

(51) Int. Cl.
*G06T 7/13*      (2017.01)
*B64D 45/00*      (2006.01)
(Continued)

(52) U.S. Cl.
CPC ............ *G08G 5/065* (2013.01); *B64D 45/00* (2013.01); *B64D 45/0005* (2013.01); *B64D 47/08* (2013.01); *G06T 7/13* (2017.01); *G06T 7/246* (2017.01); *G06T 7/70* (2017.01); *G06T 7/73* (2017.01); *G06T 7/74* (2017.01); *G06V 10/22* (2022.01); *G06V 10/759* (2022.01); *G06V 10/82* (2022.01); *G06V 20/17* (2022.01); *G06V 20/188* (2022.01); *G06V 20/52* (2022.01); *G06V 20/56* (2022.01); *G06V 20/64* (2022.01); *G06V 40/10* (2022.01); *H04N 7/181* (2013.01); *H04N 7/183* (2013.01); *B64C 1/1423* (2013.01);
(Continued)

(58) Field of Classification Search
None
See application file for complete search history.

(56) References Cited

U.S. PATENT DOCUMENTS 8,042,765 B1    10/2011   Nance
9,047,771 B1    6/2015   Thoreen et al.
(Continued)

FOREIGN PATENT DOCUMENTS

EP      0980828 A1    2/2000
EP      3114670 A2    1/2017
(Continued)

OTHER PUBLICATIONS

Extended European Search Report for EP Application No. 22190049.1, dated Jan. 2, 2023, 10 pages.

*Primary Examiner* — Samuel D Fereja
(74) *Attorney, Agent, or Firm* — Kinney & Lange, P.A.

(57) ABSTRACT

A camera with a field of view toward an external environment of an aircraft is disposed within an aircraft door such that an engine inlet of an engine of the aircraft is within the field of view of the camera. A display device is disposed within an interior of the aircraft. A processor is operatively coupled to the camera and to the display device. The processor analyzes image data captured by the camera to determine whether persons or foreign objects are present near the engine inlet, or detect damage or deformation of the engine inlet.

19 Claims, 31 Drawing Sheets

(51) Int. Cl.
| | |
|---|---|
| *B64D 47/08* | (2006.01) |
| *G06T 7/181* | (2017.01) |
| *G06T 7/246* | (2017.01) |
| *G06T 7/70* | (2017.01) |
| *G06T 7/73* | (2017.01) |
| *G06V 10/22* | (2022.01) |
| *G06V 10/75* | (2022.01) |
| *G06V 10/82* | (2022.01) |
| *G06V 20/10* | (2022.01) |
| *G06V 20/17* | (2022.01) |
| *G06V 20/52* | (2022.01) |
| *G06V 20/56* | (2022.01) |
| *G06V 20/64* | (2022.01) |
| *G06V 40/10* | (2022.01) |
| *G08G 5/06* | (2006.01) |
| *H04N 7/18* | (2006.01) |
| *B64C 1/14* | (2006.01) |
| *B64C 25/36* | (2006.01) |
| *B64D 25/14* | (2006.01) |

(52) U.S. Cl.
CPC .............. *B64C 25/36* (2013.01); *B64D 25/14* (2013.01); *B64D 2045/0085* (2013.01); *G06T 2207/20076* (2013.01); *G06T 2207/20081* (2013.01); *G06T 2207/20084* (2013.01); *G06T 2207/30196* (2013.01); *G06T 2207/30241* (2013.01); *G06T 2207/30248* (2013.01)

(56) References Cited

U.S. PATENT DOCUMENTS

| | | |
|---|---|---|
| 9,789,970 B2 | 10/2017 | Giesa et al. |
| 10,207,818 B2 | 2/2019 | Besettes et al. |
| 10,249,203 B2 | 4/2019 | Pesik et al. |
| 10,252,818 B2 | 4/2019 | Butler et al. |
| 10,691,943 B1 | 6/2020 | Ferstl et al. |
| 11,094,210 B2 | 8/2021 | Pesik |
| 11,393,355 B1 | 7/2022 | Warren et al. |
| 2011/0139934 A1 | 6/2011 | Giesa et al. |
| 2012/0081542 A1 | 4/2012 | Suk et al. |
| 2016/0090196 A1* | 3/2016 | Besettes ................ B64C 1/1407 244/129.5 |
| 2016/0272020 A1 | 9/2016 | Bill |
| 2017/0113813 A1 | 4/2017 | Heuer et al. |
| 2017/0297726 A1 | 10/2017 | Volny et al. |
| 2018/0079533 A1* | 3/2018 | Suchezky ............... B64D 29/00 |
| 2018/0237156 A1* | 8/2018 | Ross ..................... B64D 45/00 |
| 2018/0301045 A1 | 10/2018 | Pesik et al. |
| 2019/0039748 A1 | 2/2019 | Bredemeier et al. |
| 2020/0290750 A1 | 9/2020 | Ferrell et al. |
| 2020/0290751 A1 | 9/2020 | Waffler et al. |
| 2020/0366879 A1 | 11/2020 | Arnold et al. |
| 2021/0129596 A1 | 5/2021 | Francois et al. |
| 2021/0139165 A1 | 5/2021 | Vana et al. |
| 2022/0277601 A1* | 9/2022 | Coupard ................ B64D 45/00 |

FOREIGN PATENT DOCUMENTS

| | | |
|---|---|---|
| EP | 3114670 B1 | 6/2021 |
| EP | 4134298 A1 | 2/2023 |

* cited by examiner

AIRCRAFT DOOR CAMERA SYSTEM FOR ENGINE INLET MONITORING

CROSS-REFERENCE TO RELATED APPLICATIONS

This application claims the benefit of U.S. Provisional Application No. 63/231,840 filed Aug. 11, 2021 for "AIRCRAFT DOOR CAMERA SYSTEM FOR MONITORING AN EXTERNAL ENVIRONMENT OF THE AIRCRAFT" by J. Pesik and J. Boer.

This application is related to U.S. application Ser. No. 17/886,147 filed Aug. 11, 2022 for "AIRCRAFT DOOR CAMERA SYSTEM FOR EVACUATION SLIDE DEPLOYMENT MONITORING" by J. Pesik and J. Boer, U.S. application Ser. No. 17/886,181 filed Aug. 11, 2022 for "AIRCRAFT DOOR CAMERA SYSTEM FOR WING MONITORING" by J. Pesik and J. Boer, U.S. application Ser. No. 17/886,189 filed Aug. 11, 2022 for "AIRCRAFT DOOR CAMERA SYSTEM FOR LANDING GEAR MONITORING" by J. Pesik and J. Boer, U.S. application Ser. No. 17/886,193 filed Aug. 11, 2022 for "AIRCRAFT DOOR CAMERA SYSTEM FOR JET BRIDGE ALIGNMENT MONITORING" by J. Pesik and J. Boer, and U.S. application Ser. No. 17/886,196 filed Aug. 11, 2022 for "AIRCRAFT DOOR CAMERA SYSTEM FOR DOCKING ALIGNMENT MONITORING" by J. Pesik and J. Boer.

The specifications of each of these applications are incorporated herein by reference in their entirety.

BACKGROUND

The present disclosure relates generally to aircraft monitoring systems, and more particularly to aircraft monitoring systems including cameras disposed within aircraft doors for generating views external to the aircraft.

Modern aircraft are typically outfitted with multiple entry or evacuation doors. Passengers may pass through these doors during boarding or deboarding operations or during emergency evacuations. Such aircraft doors are often constructed with a window providing the crew a view to an external environment of the aircraft. Window features, such as size and location within the door, are constrained by the door architecture. Further, these windows must be designed to withstand environments about the aircraft such as high speeds, cold temperatures, low external pressures, and pressurized aircraft cabins. As a result, such windows typically have significant supporting structures that result in limited window size and viewing angles.

The view provided by these windows may be used in a variety of phases of flight. For instance, the crew may utilize the aircraft door windows to determine whether an evacuation slide deployment path is unobstructed and safe during emergency operations. Due at least in part to the typically limited size of the windows, obtaining a full understanding of the scene outside the door often requires a crew member to move his or her head and eyes side to side and up and down, from edge to edge of the window. Additional movement necessitated by the limited size of the window may detract from the crew's duties and, in emergency situations, may result in delayed execution of safe evacuation procedures.

SUMMARY

In one example, a system for monitoring an external environment of an aircraft includes an aircraft door, a camera, a display device, and a processor. The camera has a field of view toward the external environment of the aircraft and is disposed within an aircraft door such that an engine inlet of an engine of the aircraft is within the field of view of the camera. The display device is disposed within an interior of the aircraft. The processor is operatively coupled to the camera and display device. The processor receives image data captured by the camera that is representative of the external environment of the aircraft and outputs the captured image data for display at the display device. The processor analyzes the captured image data by: identifying a region within the captured image data that corresponds to the engine inlet, monitoring the engine inlet based on the captured image data corresponding to the engine inlet, and producing a warning associated with the engine inlet in response to the captured image data.

In another example, a method of monitoring an external environment of an aircraft includes receiving, with a processor, image data captured by a camera disposed within an aircraft door of the aircraft such that an engine inlet of an engine of the aircraft is within a field of view of the camera. The processor analyzes the captured image data by: identifying a region within the captured image data that corresponds to the engine inlet, monitoring the engine inlet based on the captured image data corresponding to the engine inlet, and producing a warning associated with the engine inlet in response to the captured image data. The captured image data is output for display at a display device disposed within an interior of the aircraft.

In another example, a system of monitoring an external environment of an aircraft includes a plurality of aircraft doors, a plurality of cameras, a display device, and a processor. At least one of the plurality of cameras are disposed within one of the aircraft doors and each camera has a field of view that is unique among the plurality of cameras. An engine inlet of an engine of the aircraft is within the field of view of at least one camera. The display device is disposed within an interior of the aircraft. The processor is operatively coupled to the camera and display device to: receive, from each respective camera of the plurality of cameras, image data captured by the respective camera that is representative of the external environment of the aircraft within the field of view of the respective camera, aggregate the captured image data received from each camera of the plurality of cameras to produce aggregated image data representative of the external environment of the aircraft, wherein image data from overlapping fields of view of the plurality of cameras is presented only once in the aggregated image data, analyze the aggregated image data, and output the aggregated image data for display at the display device. The processor analyzes the aggregated image data by: identifying a region within the aggregated image data that corresponds to an engine inlet of an engine of the aircraft, monitoring the engine inlet, based on the aggregated image data corresponding to the engine inlet, and producing a warning associated with the engine inlet in response to the aggregated image data.

DETAILED DESCRIPTION

As described herein, an example aircraft monitoring system includes a camera disposed within an aircraft door that provides image data of a field of view of an external environment of the aircraft. The camera system can, in some examples, replace the window of the aircraft door, such that the aircraft door is windowless, thereby decreasing the weight of the aircraft door by eliminating the need for robust support structures that are typically utilized to enable such windows to withstand the operational environment of the aircraft. Moreover, placement of the camera at the skin of the aircraft can provide wider viewing angles than would otherwise be achievable through a physical window of the aircraft door (due in part to viewing angle limitations imposed by the thickness of the aircraft door). In some examples, multiple camera systems can be used to provide multiple (e.g., two, three, or more) independent views of the physical conditions of the environment about the aircraft, each camera providing a different, independent field of view.

According to techniques of this disclosure, the image data captured by the camera systems can be further analyzed via image processing operations to provide alerts, automatic guidance, or other outputs that can reduce aircraft crew workload, thereby increasing crew efficiency as well as the safety of the aircraft crew and passengers during aircraft operation. For instance, as is further described below, captured image data from the camera system (or systems) disposed within the aircraft door (or doors) can be analyzed to provide alerts and/or guidance related to wing edge collision avoidance, wing leading edge deformation (e.g., due to ice accretion or foreign object damage), safety-clearance between ground personnel and an engine inlet, engine inlet foreign object ingestion, engine inlet damage visualization, presence of a chock block at, e.g., a main landing gear of the aircraft, jet bridge alignment during docking operations, surface marking alignment, incursion warning, and the aggregation of image data from multiple cameras to provide increased situational awareness of the external environment of the aircraft. Accordingly, camera systems implementing techniques of this disclosure can effectively replace windows within the aircraft doors, thereby decreasing the weight and cost associated with support structures within the aircraft doors that enable the windows to withstand the operational environment of the aircraft. Moreover, image data captured by the one or more cameras can be analyzed to provide alerts, guidance, or other outputs that can reduce crew workload and increase crew efficiency and safety of the passengers and aircraft flight crew.

Figure 1:
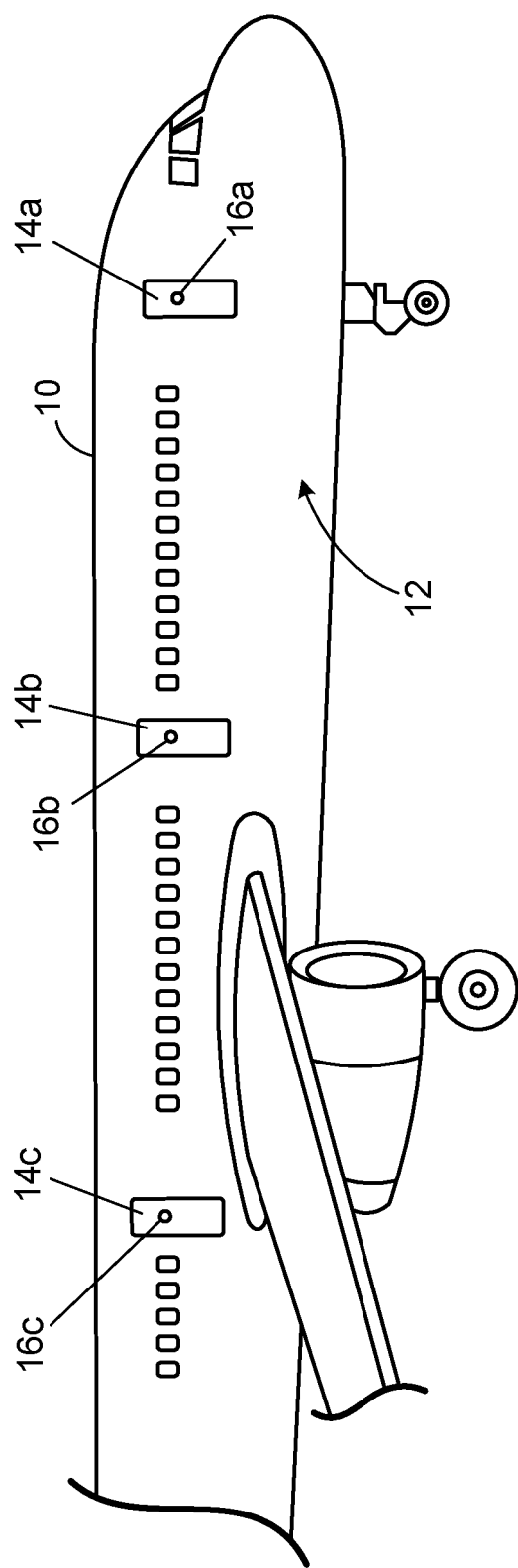
FIG. 1 is a perspective view of an aircraft including doors having camera systems with fields of view toward an exterior of the aircraft.

FIG. 1 is a perspective view of aircraft 10 with aircraft skin 12, including doors 14a, 14b, and 14c having cameras 16a, 16b, and 16c disposed therein. As illustrated in FIG. 1, cameras 16a, 16b, and 16c can be disposed within aircraft doors 14a, 14b, and 14c, respectively. While the example of FIG. 1 illustrates three cameras disposed within three aircraft doors, it should be understood that in other examples, other numbers of camera systems can be incorporated in aircraft doors, such as one camera (e.g., within a single door), two cameras (e.g., each within a separate door), or three or more cameras disposed within three or more aircraft doors. In certain examples, more than one camera can be disposed within a single door. In yet other examples, not every door need have a camera disposed therein, meaning that one or more aircraft doors incorporates a camera and one or more aircraft doors does not incorporate a camera.

As in the example of FIG. 1, cameras 16a, 16b, and 16c can be disposed within aircraft doors 14a, 14b, and 14c, respectively, such that cameras 16a, 16b, and 16c are flush with aircraft skin 12 to maintain aerodynamic efficiency and to reduce drag. For instance, as is further described below, cameras 16a, 16b, and 16c can be disposed within aircraft doors 14a, 14b, and 14c, such that an outermost surface of cameras 16a, 16b, and 16c (e.g., a lens of the camera or other outer-most surface of the camera) is flush with (i.e., even with) aircraft skin 12. In other examples, cameras 16a, 16b, and 16c need not be disposed flush with aircraft skin 12.

As illustrated in FIG. 1, cameras 16a, 16b, and 16c are disposed such that a field of view of cameras 16a, 16b, and 16c is oriented toward an exterior of aircraft 10. Each of cameras 16a, 16b, 16c is operatively (e.g. communicatively and/or electrically) connected to a processor (not illustrated) and to a display device (not illustrated) to a provide a visual representation of the field of view of the respective camera. In some examples, each of cameras 16a, 16b, and 16c can be operatively connected to a separate processor and display device, though cameras 16a, 16b, and 16c need not be connected to separate processors and display devices in all examples. For instance, any two or more of cameras 16a, 16b, and 16c can be operatively connected to a same processor and/or a same display device.

Cameras 16a, 16b, and 16c are configured to capture image data from a field of view external to the aircraft. Any one or more of cameras 16a, 16b, and 16c can be visible light spectrum cameras, infrared spectrum cameras, or other types of cameras capable of capturing image data within a field of view external to the aircraft. In some examples, any one or more of cameras 16a, 16b, and 16c can include or be accompanied by a light source, such as a light emitting diode (LED) or other light source to illuminate at least a portion of the field of view of the respective camera to improve visibility and the ability of the camera to capture image data in low-light scenarios. The processor (not illustrated in FIG. 1) receives the captured image data, processes the captured image data, and communicates the captured image data to the display device. The display device (not illustrated in FIG. 1) displays the image data received from the processor. As such, cameras 16a, 16b, and 16c provide a visual representation to the flight crew and others of the external environment of the aircraft for use in multiple phases of flight.

In certain examples, cameras 16a, 16b, and 16c can be configured to be installed in the volume previously occupied by a window of the door, thereby serving as a replacement for the window. In such examples, any one or more of aircraft doors 14a, 14b, and 14c can be windowless, meaning that the respective door does not include a window, but rather includes a respective one of cameras 16a, 16b, and 16c that are operatively coupled to a display device to provide the field of view of the external environment of aircraft 10. In such examples, as is further described below, cameras 16a, 16b, and 16c can provide a field of view that is greater than would be otherwise achievable via a corresponding window. That is, cameras 16a, 16b, and 16c, disposed at or near aircraft skin 12, can provide a greater viewing angle than would otherwise be achievable through a window of the door due to the limitations imposed on the viewing angle through the window by the thickness of the door and the corresponding support structures for the window that typically limit the size of the window. Moreover, image data captured by cameras 16a, 16b, and 16c can be analyzed via image processing operations to provide alerts, guidance, or other outputs that can reduce crew workload and increase safety of operations.

Figure 2:
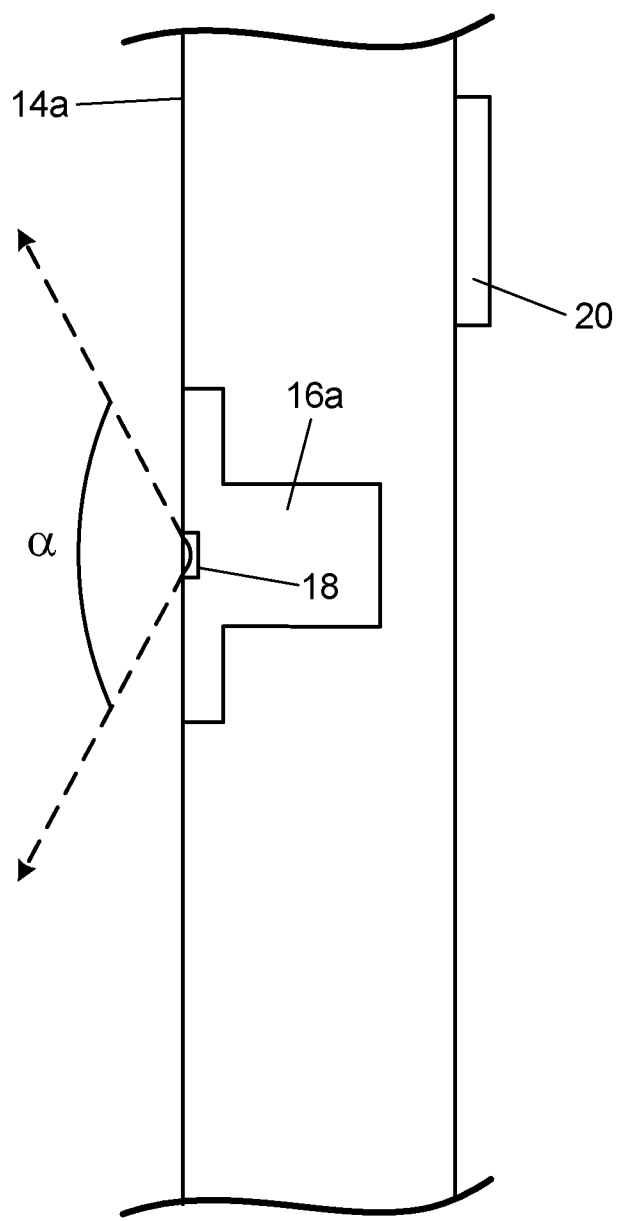
FIG. 2 is a partial cross-sectional view of the camera disposed within an aircraft door and operatively coupled with a display device.

FIG. 2 is a partial cross-sectional view of camera 16a disposed within aircraft door 14a with a field of view toward an exterior of aircraft 10. Though the example of FIG. 2 is described below within the context of camera 16a for purposes of clarity and ease of discussion, it should be understood that the techniques described below with respect to FIG. 2 are applicable to any one or more of cameras 16a, 16b, and 16c.

As illustrated in FIG. 2, camera 16a includes lens 18. Camera 16a is operatively (e.g. communicatively and/or electrically) connected with display device 20. Camera 16a can be operatively connected to display device 20 via wired or wireless connection, or both. As is further described below, camera 16a is also operatively connected with a processor (not illustrated in FIG. 1) that is configured to receive image data captured by camera 16a and to provide a representation (e.g., a graphical representation) of the captured image data to display device 20 to provide a visual representation of the external environment of aircraft 10.

In the example of FIG. 2, camera 16a is disposed within aircraft door 14a flush with aircraft skin 12, such that an outermost portion of camera 16a (i.e., an outermost surface of lens 18 and other housing and mounting structures of camera 16a) is flush with (i.e., even with) aircraft skin 12.

In other examples, any portion of camera 16a can protrude from aircraft skin 12 into an oncoming airflow about aircraft skin 12. In yet other examples, any one or more portions of camera 16a can be recessed within aircraft skin 12.

As illustrated in FIG. 2, the field of view of camera 16a is oriented toward an exterior of aircraft 10 through lens 18. Image capturing electronics (not illustrated) of camera 16a are positioned within camera 16a to provide the field of view having angle α. Captured image data within the field of view is provided to display device 20 that graphically presents a visual depiction of the exterior of aircraft 10.

Display device 20 can be a liquid crystal display (LCD), an organic light emitting diode (OLED) display, or other type of display device capable of providing graphical output of the image data captured by camera 16a to a user. As illustrated in FIG. 2, display device 20 can be mounted to the inside of door 14a opposite camera 16a. In other examples, display device 20 can be mounted to a wall surface within aircraft 10, such as a wall surface adjacent to camera 16a or in other areas of an interior of aircraft 10. In yet other examples, display device 20 can be a mobile display device, such as a tablet computer or other mobile display device, that can output the image data captured by camera 16a while positioned at any location throughout aircraft 10. In certain examples, display device 20 can be mounted in the cockpit of the aircraft 10 or can be part of an existing cockpit display system, such as an electronic flight instrument system (EFIS).

Accordingly, camera 16a that is operatively connected to display device 20 can provide a graphical representation of an exterior of aircraft 10 to a flight crew or other user. The combination of camera 16a and display device 20 can be utilized to effectively replace a window in the aircraft door, such that the aircraft door can be constructed to be windowless and without the supporting structure that is commonly associated with windows in aircraft doors, and without compromising the utility of a door that includes a window for viewing the exterior of the aircraft. Moreover, as is further described below, image data captured by camera 16a can be analyzed via image processing techniques to provide alerts or other guidance to aircraft crew to increase efficiency of the crew and safety of aircraft operation.

Figure 3:
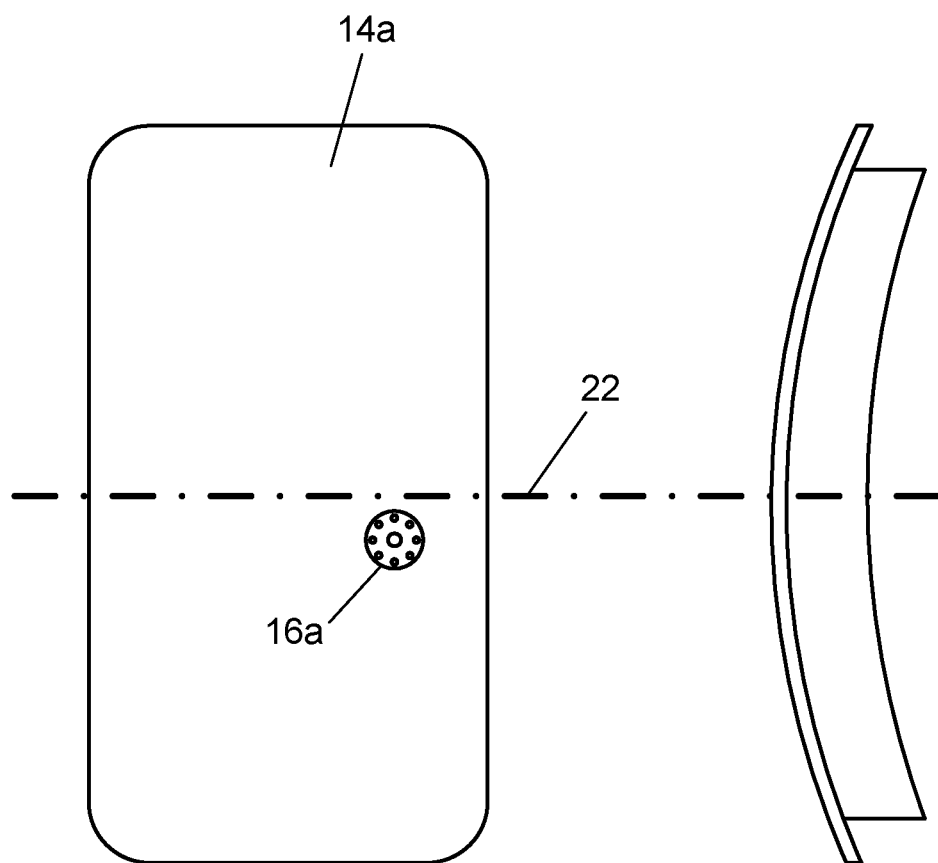
FIG. 3 illustrates a representation of the camera disposed within the aircraft door below a vertical midpoint of the aircraft door.

FIG. 3 illustrates a representation of camera 16a disposed within aircraft door 14a at or below vertical center of curvature 22 of aircraft door 14a. While the example of FIG. 3 is described below within the context of camera 16a and door 14a for purposes of clarity and ease of discussion, it should be understood that the techniques described below with respect to FIG. 3 are applicable to any one or more of cameras 16a, 16b, and 16c disposed within any of doors 14a, 14b, and 14c. Moreover, while illustrated and described in the example of FIG. 3 as being mounted below vertical center of curvature 22 of aircraft door 14a, camera 16a can be mounted at other locations within aircraft door 14a, such as in a volume configured to contain a window and/or associated support structure of aircraft door 14a, or other locations within aircraft door 14a.

Vertical center of curvature 22, as illustrated in FIG. 3, can correspond to a location of door 14a at which a line tangential to the aircraft skin at the outer surface of door 14a is vertical (e.g., a midpoint of a vertical height of the fuselage of an aircraft), below which an orthogonal vector to the fuselage is oriented in a downward direction. Camera 14a, disposed below vertical center of curvature 22 has a field of view angled toward a surface of the ground. As such, camera 16a when disposed below vertical center of curvature 22 can provide views of features below camera 16a, such as a main landing gear, an engine inlet, a leading edge of a wing, an aft edge of the wing, surface markings for docking alignment, jet bridge features, or other features within the field of view of camera 16a.

As is further described below, a processor (not illustrated) can perform analysis based in part on the features captured in the field of view of camera 16a, thereby providing information relevant to operational control of the aircraft, such as alerts, guidance of other operational information.

Figure 4A:
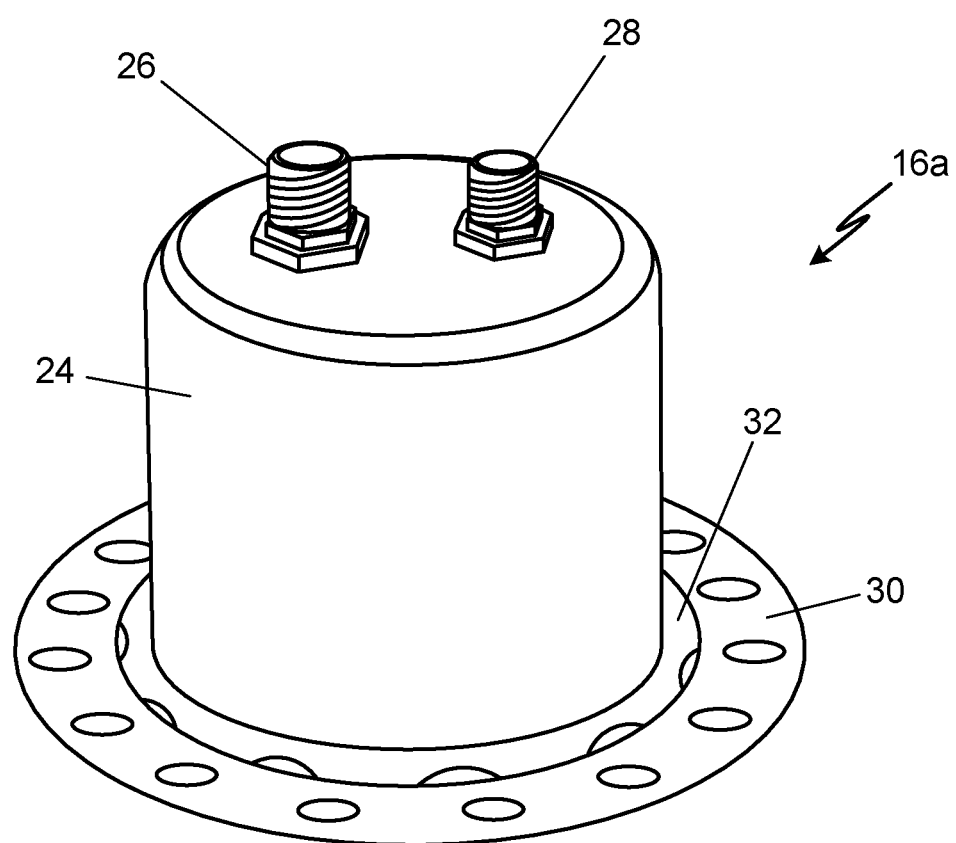
FIG. 4A is a perspective view of the camera assembly including an electronics housing and a mounting gasket.
Figure 4B:
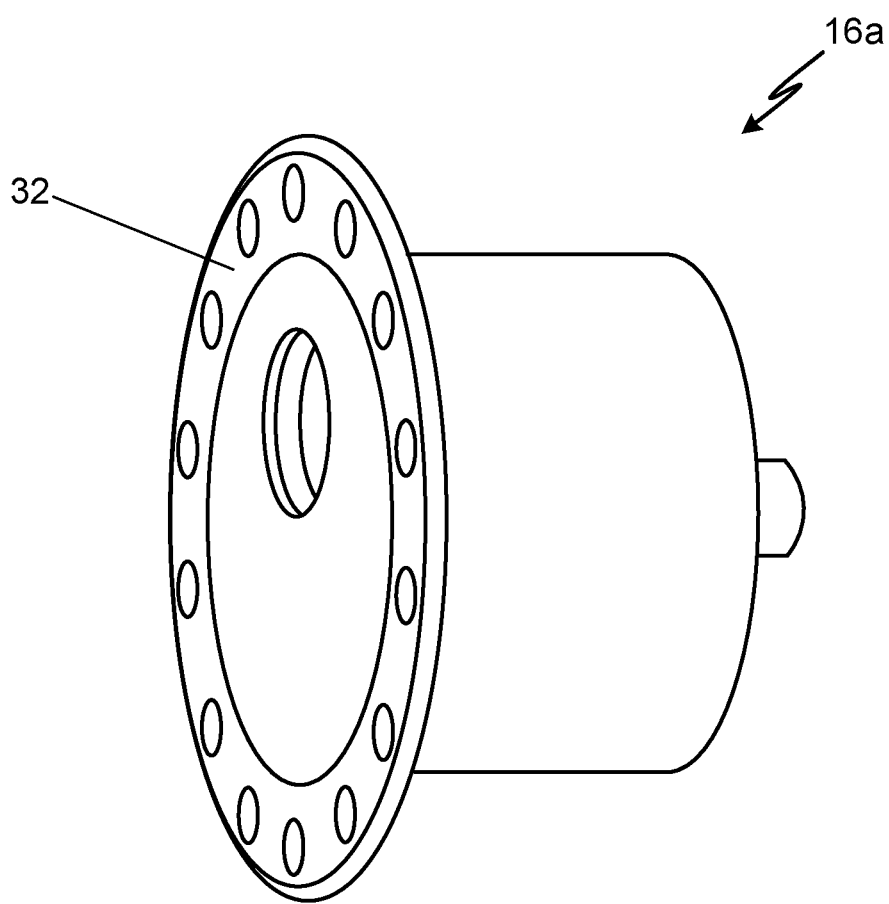
FIG. 4B is a perspective view of the camera assembly showing a mounting flange in relation to a viewing window of the camera.

FIG. 4A is a perspective view of camera 16a showing electronics housing 24, input/output connector 26, power connector 28, and mounting gasket 30 on a back side of mounting flange 32. FIG. 4B is a perspective view of camera 16a showing a front side of mounting flange 32 including mounting bores that are utilized for mounting camera 16a to an external surface of an aircraft. The examples of FIGS. 4A and 4B are described below together for purposes of clarity and ease of discussion. Moreover, it should be understood that while the examples of FIGS. 4A and 4B are described below with respect to camera 16a, the examples of FIGS. 4A and 4B are applicable to any of cameras 16a, 16b, and 16c.

Electronics housing 24 is configured to enclose electrical and other components of camera 16a, such as one or more processors, memory, lens components, image sensor components, or other components of camera 16a. Electronics housing 24, as illustrated in FIGS. 4A and 4B, can enclose (e.g., all) components of camera 16a, such that camera 16a can be considered a line replaceable unit (LRU) in some examples. Power connector 28 is electrically connected to components within the interior of electronics housing 24 to provide electrical power to the components during operation. Input/output connector 26 is connected to electrical components within the interior of electronics housing 24 for communication between camera 16a and components of the aircraft that are remote from camera 16a, such as aircraft avionics components, a display device (or devices), or other components. Camera 16a can be configured to communicate over an aircraft data bus via input/output connector 26, such as via the Aeronautical Radio, Incorporated (ARINC) 429 interface, a Controller Area Network (CAN) bus network, or other communication network. Though the example of FIG. 4A illustrates power connector 28 and input/output connector 26 as separate connectors, in some examples, power connector 28 and input/output connector 26 can be combined into a single connector that provides both electrical power and communication capabilities for camera 16a.

Mounting flange 32 is utilized to mount camera 16a to the aircraft. Mounting bores within mounting flange 32 can be utilized for securing mounting flange 32 (and therefore camera 16a) to the aircraft. As in the example of FIGS. 4A and 4B, mounting flange 32 can be utilized to secure camera 16a to the aircraft from the outside of the aircraft (i.e., rather than mounting from within the aircraft door) for ease of installation, maintenance, and replacement. Mounting gasket 30, adhered (e.g., adhesively adhered or otherwise adhered) to a back side of mounting flange 32 and configured to make contact with the aircraft can effectively seal the connection between mounting flange 32 and the aircraft structure to prevent ingress of water, particulates, or other contaminants.

Mounting flange 32 can be configured to be mounted flush (i.e., even) with an outer skin of the aircraft to reduce drag and maintain aerodynamic efficiency of the aircraft. For instance, mounting flange 32 can be configured to be installed within a recess produced on the outer skin of the aircraft at an exterior of the aircraft door, such that an outermost surface of mounting flange 32 is flush with the aircraft skin. In other examples, mounting flange 32 can protrude from the aircraft skin into the airflow about the exterior of the aircraft.

Camera 16a can therefore be disposed within an aircraft door to capture a field of view of the external environment and external components of the aircraft. Camera 16a, in some examples, can be mounted flush with the aircraft skin to maintain aerodynamic efficiency of the aircraft while capturing a field of view that is greater than would otherwise be achievable via a window in the door of the aircraft.

Figure 5:
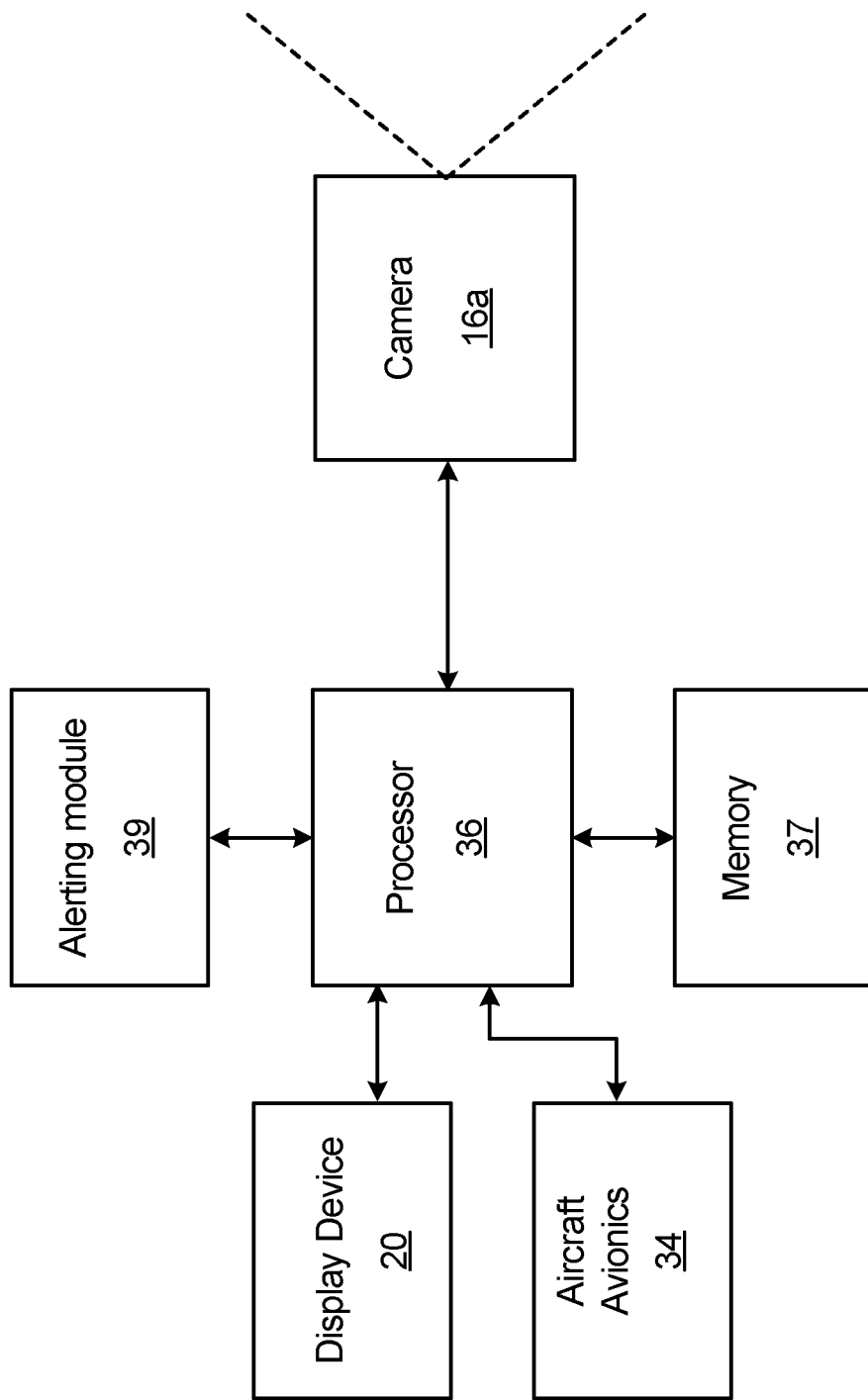
FIG. 5 is a block diagram illustrating components of the camera system in communication with the display and aircraft avionics equipment.

FIG. 5 is a block diagram illustrating components of camera 16a in communication with display device 20 and aircraft avionics equipment 34. While described below with respect to camera 16a for purposes of clarity and ease of discussion, it should be understood that the techniques described below with respect to FIG. 5 are applicable to any one or more of cameras 16a, 16b, and 16c.

As illustrated in FIG. 5, camera 16a includes processor 36 and computer-readable memory 37. Camera 16a, processor 36, and computer-readable memory 37 can be disposed within an electronics housing, such as electronics housing 24 (FIGS. 4A and 4B). Camera 16a is electrically and/or communicatively coupled with processor 36. In some examples, processor 36 and/or computer-readable memory 37 can be considered part of camera 16a (e.g., integral to camera 16a). In other examples, any one or more of processor 36 and computer-readable memory 37 can be separate from and electrically and/or communicatively coupled with camera 16a. Alerting module 39 can be a component of processor 36 (e.g., integral to processor 36) or aircraft avionics equipment 24, or can be a separate hardware or software component within aircraft 10.

Processor 36, in some examples, is configured to implement functionality and/or process instructions for execution during operation of camera 16a. For instance, processor 36 can be capable of processing instructions stored in computer-readable memory 37. Examples of processor 36 can include any one or more of a microprocessor, a controller, a digital signal processor (DSP), an application specific integrated circuit (ASIC), a field-programmable gate array (FPGA), or other equivalent discrete or integrated logic circuitry.

Computer-readable memory 37 can be configured to store information for use by processor 36 or other components of camera 16a during operation of camera 16a. Computer-readable memory 37, in certain examples, can include a non-transitory medium. The term "non-transitory" can indicate that the storage medium is not embodied in a carrier wave or a propagated signal. In some examples, a non-transitory storage medium can store data that can, over time, change (e.g., in RAM or cache). Computer-readable memory can include volatile and/or non-volatile memory elements. Examples of volatile memory elements can include random access memories (RAM), dynamic random access memories (DRAM), static random access memories (SRAM), and other forms of volatile memories. Examples of non-volatile memory elements can include magnetic hard discs, optical discs, flash memories, or forms of electrically programmable memories (EPROM) or electrically erasable and programmable (EEPROM) memories.

Processor 36, as illustrated in FIG. 5, can be operatively connected (e.g., electrically and/or communicatively connected) with camera 16a, computer-readable memory 37, display device 20, and aircraft avionics 34. Processor 36, in certain examples, can include and/or be further connected to communication components, graphics processing components, or other electrical components for facilitating communication between components (or via an aircraft data bus) and for processing image data captured by camera 16a for image processing operations and display at display device 20.

In operation, camera 16a captures image data within a field of view of camera 16a that is oriented toward an exterior of the aircraft. Image data captured by camera 16a is processed by processor 36 and output to display device 20 for providing a visual representation of the field of view of camera 16a. Processor 36, as is further described below, can further analyze the captured image data for providing alerts (e.g., audible and/or visual alerts, which can be partially or entirely generated in conjunction with alerting module 39) that are generated by display device 20 and/or other components of the aircraft, such as aircraft avionics 34. In certain examples, processor 36 can receive inputs from aircraft avionics 34 corresponding to, e.g., a phase of flight of the aircraft and/or a state of one or more aircraft components, such as a weight-on-wheels input, aircraft airspeed, aircraft altitude, engine operating parameters, or other aircraft state variables. Processor 36 can, in some examples, utilize the received inputs during processing of the image data captured by camera 16a, as is further described below.

Camera 16a can therefore provide image data captured from a field of view of camera 16a that is provided to display device 20 for a visual representation of the field of view. The captured image data can be further analyzed by processor 36 to provide alerts (such as, for example, in conjunction with alerting module 39), guidance, or other output to display device 20, aircraft avionics, or other aircraft components to reduce crew workload, thereby increasing efficiency of the flight crew and enhancing operational safety of the aircraft.

Figure 6:
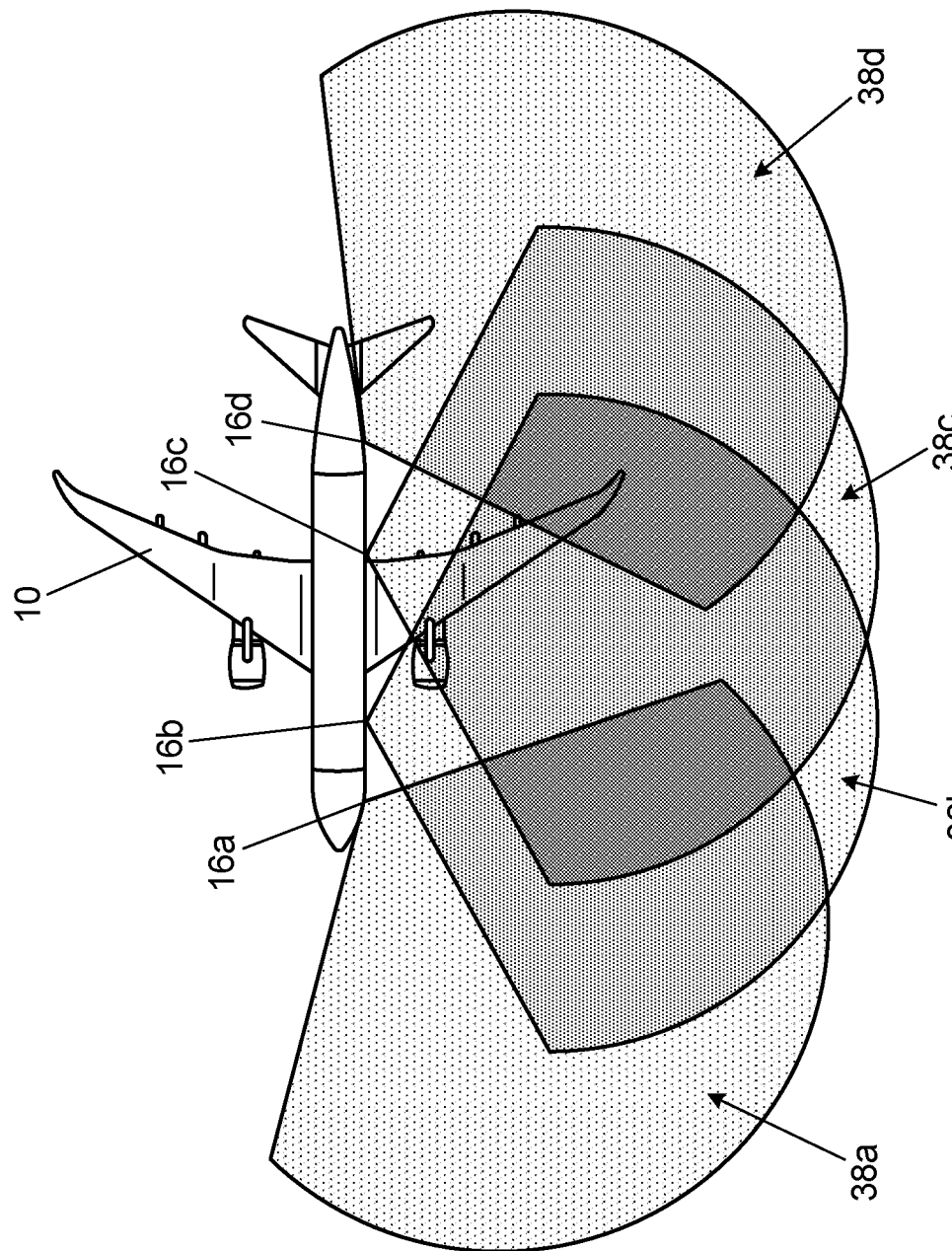
FIG. 6 is a top-down view of an aircraft including multiple camera systems disposed within doors of the aircraft and having overlapping fields of view.

FIG. 6 is an overhead view of aircraft 10 with cameras 16a, 16b, 16c and 16d having fields of view 38a, 38b, 38c, and 38d corresponding to cameras 16a, 16b, 16c and 16d, respectively. Cameras 16a, 16b, 16c, and 16d can each be disposed within a different aircraft door of aircraft 10. While the example of FIG. 6 is described herein with respect to four cameras (i.e., cameras 16a, 16b, 16c, and 16d), in other examples, more than four cameras can be utilized or fewer than four cameras can be utilized.

As illustrated in FIG. 6, cameras 16a, 16b, 16c, and 16d can be oriented such that each of cameras 16a, 16b, 16c, and 16d includes a unique field of view. The fields of view, as illustrated in FIG. 6, can include overlapping portions. Cameras 16a, 16b, 16c, and 16d can be disposed and oriented at various doors and locations about aircraft 10 (including both sides of aircraft 10) such that a combined field of view among the set of cameras covers a substantial portion of the circumference of aircraft 10, such as eighty percent, ninety percent, or even an entirety of a circumference of aircraft 10. As described herein, captured image data corresponding to the fields of view can be aggregated to produce a combined image that represents an aggregate of the fields of view and such that image data from overlapping fields of view is presented only once in the combined image.

As illustrated in FIG. 6, field of view 38a (corresponding to camera 16a) overlaps a portion of field of view 38b (corresponding to camera 16b) at a minimum, and may overlap field of view 38c (corresponding to camera 16c), but may not overlap field of view 38d (corresponding to camera 16d). Field of view 38b overlaps a portion of field of view 38a, field of view 38c, and may overlap field of view 38d, though need not in all examples. Field of view 38c may overlap a portion of field of view 38a and at least a portion of field of view 38b and field of view 38d. Field of view 38d may overlap a portion of field of view 38b and a portion of field of view 38c, but does not necessarily overlap field of view 38a.

Cameras 16a, 16b, 16c and 16d can each be operatively connected to one or more processors (not illustrated in FIG. 6). In one example, the processor is a central processor that aggregates the image data and outputs the combined image data for display at one or more display devices. For instance, each of cameras 16a, 16b, 16c, and 16d can be operatively connected to a separate display device via one or more processors that receives the aggregated image data and outputs the combined image for display at the respective display device. In other examples, the aggregated image data can be output for display at a single display device, such as a display device in the cockpit of aircraft 10.

Accordingly, cameras 16a, 16b, 16c, and 16d can capture image data from overlapping fields of view. The captured image data can be aggregated and presented in a combined image that represents an aggregate of the fields of view of the set of cameras 16a, 16b, 16c, and 16d. The combined image can be displayed within aircraft 10, thereby providing a single image of the external environment of aircraft 10 that enhances situational awareness of the flight crew.

Wing Monitoring for Anticipated Foreign Object Collisions

Figure 7A:
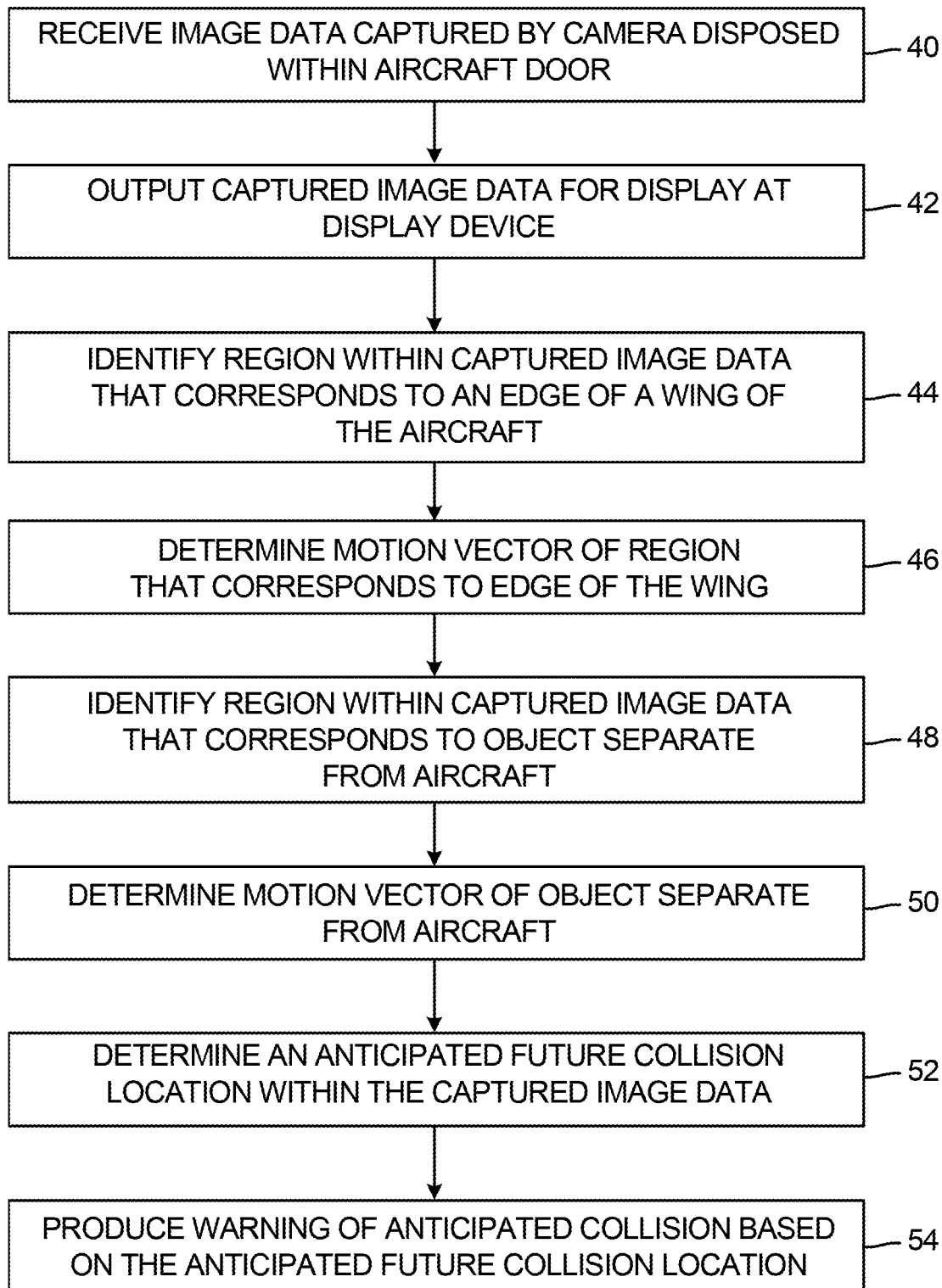
FIG. 7A is a flow chart illustrating example operations for utilizing captured image data from a camera disposed within an aircraft door to produce a warning of anticipated collision based on an identified region within the captured image data that corresponds to an edge of a wing of the aircraft.
Figure 7B:
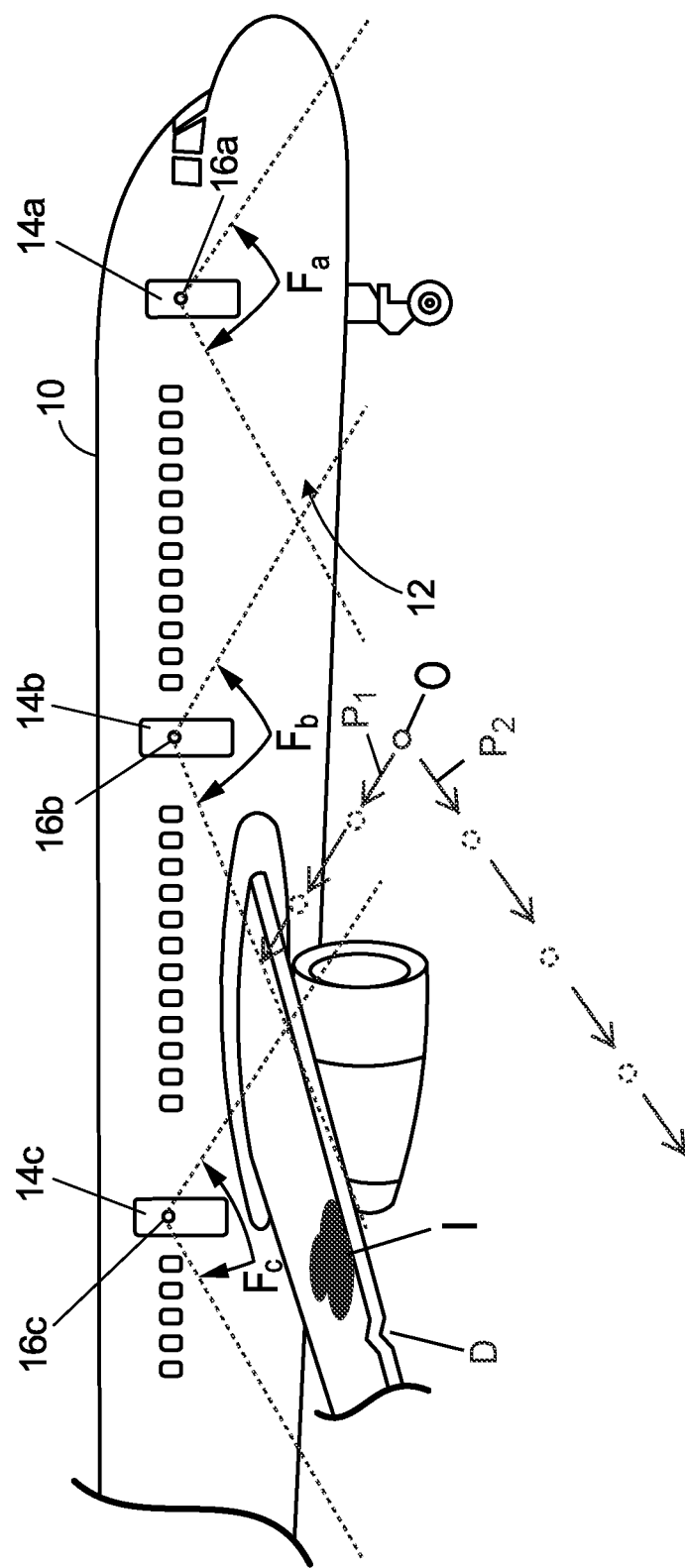
FIG. 7B is a schematic depiction of the aircraft of FIG. 1, including fields of view of the cameras of FIG. 1, damage to a wing of the aircraft, and an object separate from the aircraft.

FIG. 7A is a flow chart illustrating example operations for utilizing captured image data from a camera disposed within an aircraft door to produce a warning of anticipated collision based on an identified region within the captured image data that corresponds to an edge of a wing of the aircraft. FIG. 7B illustrates aircraft 10 with aircraft skin 12, including doors 14a, 14b, and 14c having cameras 16a (with field of view $F_a$), 16b (with field of view $F_b$), and 16c (with field of view $F_c$) disposed therein, object O, damaged area D, and ice accretion I. FIGS. 7A-7B will be discussed together. For purposes of clarity and ease of discussion, the example operations of FIG. 7A are described below within the context of camera 16b (FIGS. 1-6 and 7B) disposed within aircraft door 14b (FIGS. 1-4 and 7B) and operatively connected to display device 20 (FIGS. 2 and 5).

As described in more detail below, processor 36 can analyze the image data captured by camera 16b in a variety of ways by monitoring the leading edge of a wing of aircraft 10. This monitoring can include, for example, monitoring field of view $F_b$ of camera 16b for foreign objects approaching the leading edge of the wing and/or detecting deformation (due to damage or ice accretion) on the leading edge of the wing. Processor 36 can further be configured to produce a warning associated with the leading edge of the wing in response to the captured image data from camera 16b. This warning can communicate that, for example, a collision with a foreign object is likely and/or that the wing is deformed as compared to a baseline state (as described below in reference to FIGS. 7B-8).

Image data captured by a camera that is disposed within an aircraft door and which has a field of view toward an external environment of the aircraft is received (Step 40). For example, processor 36 can receive image data captured by camera 16b having field of view $F_b$ that is oriented toward an exterior of aircraft 10. The captured image data is output for display at a display device that is disposed within an interior of the aircraft (Step 42). For instance, processor 36 can output the captured image data that is received from camera 16b for display at display device 20 that is disposed within an interior of aircraft 10.

A region within the captured image data that corresponds to an edge of a wing of the aircraft is identified (Step 44). For example, camera 16b can be disposed within a door of aircraft 10 such that field of view $F_b$ of camera 16b is oriented to capture image data corresponding to a wing of aircraft 10. Processor 36 can analyze the captured image data to identify a region of the captured image data that corresponds to an edge of the wing of aircraft 10. For instance, processor 36 can utilize an edge detection algorithm to identify edges of the wing of aircraft 10.

As one example, processor 36 can utilize the Canny edge detector multi-stage algorithm to identify and track strong edges within the image of the captured image data associated with the wing of the aircraft, though other edge detection algorithms are possible. The Canny edge detector algorithm smooths the captured image data (e.g., via a Gaussian filter) to remove noise, determines intensity gradients of the captured image data (e.g., via intensity values associated with each pixel of the image), and removes spurious edge detection using a lower bound cut-off (or other magnitude threshold) of gradient magnitudes. Thereafter, the Canny edge detector algorithm categorizes pixels associated with potential edges as one of a strong edge, a weak edge, or a suppressed pixel based on a comparison of the magnitude of the gradient associated with the potential edge pixel to threshold values. Those pixels associated with a gradient that is greater than an upper threshold value are categorized as strong edge pixels. Those pixels associated with a gradient that is less than the upper threshold value but greater than a lower threshold value are categorized as weak edge pixels. Those pixels associated with a gradient that is less than the lower threshold value are categorized as suppressed pixels. Strong edge pixels are included in the candidate edge. Weak edge pixels are included in the candidate edge if a strong edge pixel is included within an eight-pixel neighborhood of the weak edge pixel. Suppressed pixels as well as weak edge pixels that are not within an eight-pixel neighborhood of a strong edge pixel are not included in the candidate edge.

In some examples, processor 36 categorizes a region of pixels about the identified edge as corresponding to the edge of the wing. For instance, a leading edge of the wing, depending on the vantage point and the field of view of the camera, can be categorized based on a region of pixels rather than a line of pixels to thereby accommodate the rounded edge of the leading edge of the wing. Processor 36 identifies edges of the wing and regions corresponding to the wing for use in determining relative motion of the wing through successive image frames in the captured image data and for identifying potential collisions.

A motion vector of the identified region within the captured image data that corresponds to the edge of the wing of the aircraft is determined (Step 46). For example, processor 36 can determine a motion vector associated with the region within the captured image data received from camera 16a that corresponds to the wing of the aircraft using multiple frames of image data received from camera 16a. For instance, processor 36 can utilize an Optical Flow algorithm, such as the Horn-Shunck method, the Lucas Kanade method, the Pyramid-KL algorithm, or other optical flow algorithm to generate a motion (or velocity) vector corresponding to pixels in the region of the captured image data corresponding to the identified edge of the wing of the aircraft. Such Optical Flow algorithms utilize a change of an identified pixel in the frame sequence of image data and correlation between adjacent frames to correlate pixels between frames and to determine motion information, including a motion (or velocity) vector between frames. Processor 36 can determine a motion vector associated with the identified region corresponding to the edge of the wing of the aircraft as an average (or other central tendency) of the direction and magnitude of motion vectors determined for the pixels included in the identified edge of the wing.

A region within the captured image data that corresponds to an object, such as object O in FIG. 7B, that is separate from the aircraft is identified (Step 48). For example, processor 36 can analyze the captured image data by utilizing an object detection algorithm, such as the Single Shot Detector (SSD) algorithm for object detection, the You Only Look Once (YOLO) object recognition algorithm, or other real-time object detection algorithm to identify a region of the captured image data corresponding to an object separate from aircraft 10, such as object O.

As an example, processor 36 can utilize the YOLO object recognition algorithm to identify a region within the captured image data corresponding to object O as the region within the captured image data that is output by the YOLO algorithm as a bounding box around an identified object. For instance, the YOLO algorithm (a real-time neural network-based algorithm) can be trained using baseline image data of objects to recognize any one or more of a plurality of objects. Candidate objects can include, e.g., humans, vehicles of various type and size, jetways, buildings, aircraft, walls, or other objects that may be encountered by an aircraft during, e.g., taxiing, docking, or other operations. The YOLO algorithm divides an image into regions and produces bounding boxes in relation to the image data that enclose identified objects. Processor 36, executing a YOLO algorithm for example, can determine a region of the captured image data corresponding to an object that is separate from the aircraft as a region of a bounding box surrounding an object that is produced by the YOLO algorithm. In some examples, a library of common airborne or surface objects (such as birds, poles, buildings, fences, aircraft wings or tails, and ground vehicles) can be maintained to enable real-time identification of objects as compared against the library database. This image library can assist in proactive identification of potential collision objects and present preemptive warnings to crew members.

A motion vector of the region that corresponds to the object separate from the aircraft, such as object O, within the captured image data is determined (Step 50). For instance, processor 36 can utilize an Optical Flow algorithm as was described above to generate a motion (or velocity) vector corresponding to pixels in the region of the captured image data corresponding to the bounding box surrounding the identified object. Processor 36 can determine the motion vector of the object separate from the aircraft as an average or other central tendency of the direction and magnitudes of the motion vectors associated with the pixels of the bounding box. In the example shown in FIG. 7B, paths $P_1$ and $P_2$ are shown as motion vectors for object O.

An anticipated future collision location within the captured image data is determined based on the motion vector of the region that corresponds to the edge of the wing and the motion vector that corresponds to the object (Step 52). For example, processor 36 can utilize the motion vector corresponding to the edge of the wing and the motion vector corresponding to the object to determine whether the object and the edge of the wing are anticipated to intersect within the captured image data. If object O is traveling along path $P_1$, a future collision with the wing is anticipated, and a warning of anticipated future collision will be produced in Step 54. If object O is traveling along path $P_2$, a future collision is unlikely, and a warning of anticipated collision will not be produced.

A warning of anticipated collision based on the anticipated future collision location is produced (Step 54). For instance, processor 36 can output a visual alert for display at display device 20 and/or a separate display device within aircraft 10 (e.g., an EFIS display). In certain examples, such as when display device 20 includes a speaker device, processor 36 can cause display 20 (or other audio output device) to produce an audible alarm corresponding to the anticipated future collision. In some examples, processor 36 can output an alert notification (e.g., a status or other notification) to aircraft avionics or other aircraft systems via an aircraft communication data bus. In some examples, the warning of anticipated collision can include instructions to crew members regarding how to avoid the object separate from the aircraft. Camera 16b and processor 36 can form part of a system which can record captured image data for playback. This can allow footage of objects separate from the aircraft to be cached temporarily and/or stored long-term. This system can display footage of objects and/or collisions for crew members and can be used as a library of commonly encountered foreign objects.

Accordingly, processor 36 that is operatively connected with camera 16a can analyze captured image data received from camera 16b to identify an anticipated collision between a wing of the aircraft and an object separate from the aircraft. Processor 36 can output a warning of the anticipated collision, thereby alerting the pilots or other flight crew and increasing safety of operation of aircraft 10. Captured image data from any of cameras 16a, 16b, 16c, 16d can be combined to gather additional information about the external environment of aircraft 10. Additionally, a system as described above provides numerous advantages. Camera 16b and processor 36 can enable the detection of objects prior to collision, view or detect the collision as it occurs, and assess characteristics of any damage to determine a next potential course of action for crew members.

Wing Monitoring for Deformation Compared to Baseline Data

Figure 8:
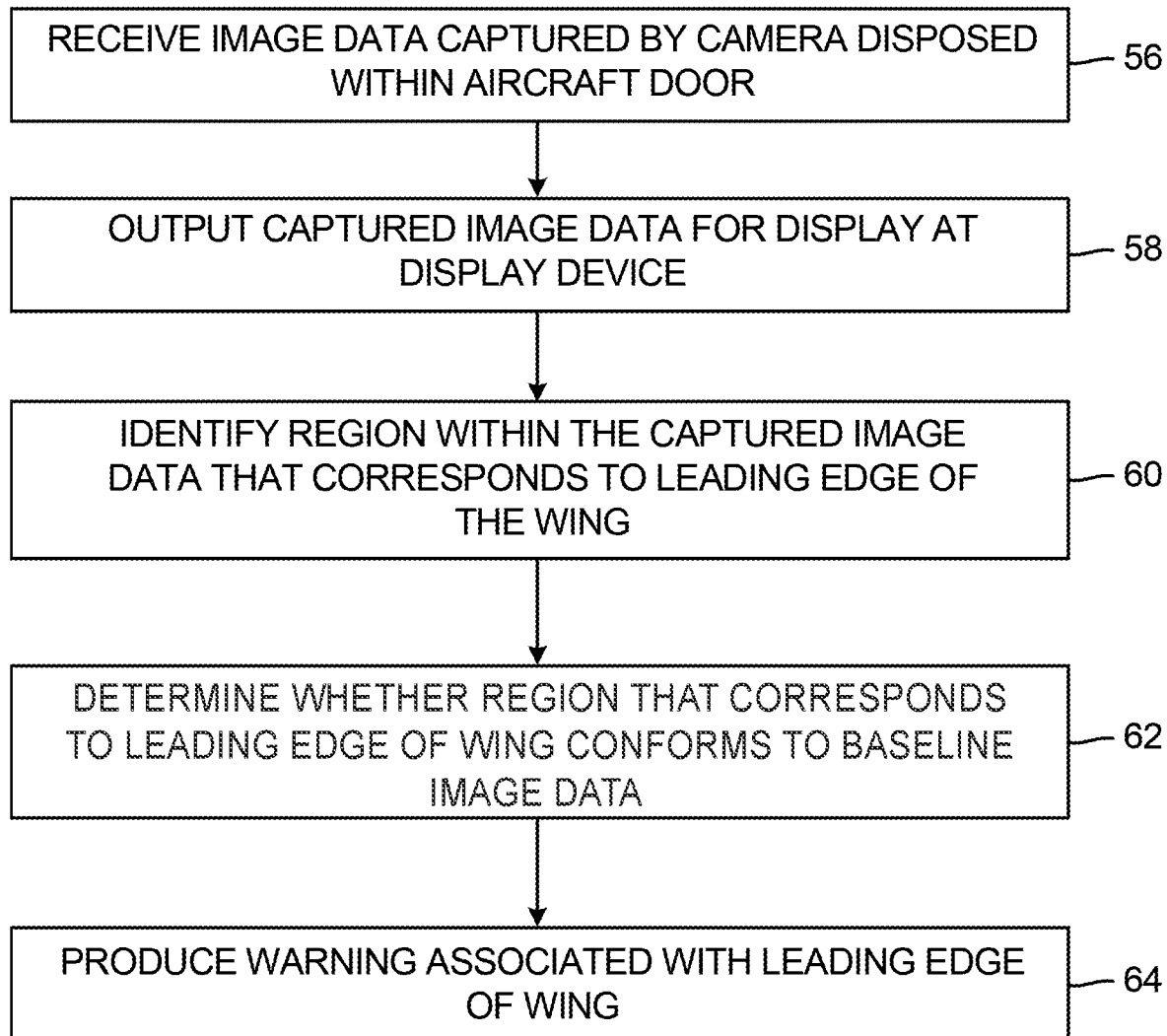
FIG. 8 is a flow chart illustrating example operations for utilizing captured image data from a camera disposed within an aircraft door to produce a warning in response to determining that a region within the captured image data that corresponds to a leading edge of a wing of the aircraft does not conform to baseline image data.

FIG. 8 is a flow chart illustrating example operations for utilizing captured image data from a camera disposed within an aircraft door to produce a warning in response to determining that a region within the captured image data that corresponds to a leading edge of a wing of the aircraft does not conform to baseline image data. For purposes of clarity and ease of discussion, the example operations of FIG. 8 are described below within the context of camera 16b (FIGS. 1-6 and 7B) disposed within aircraft door 14a (FIGS. 1-4 and 7B) and operatively connected to display device 20 (FIGS. 2 and 5).

Image data captured by a camera that is disposed within an aircraft door and which has a field of view toward an external environment of the aircraft is received (Step 56). For example, processor 36 can receive image data captured by camera 16b having a field of view that is oriented toward an exterior of aircraft 10. The captured image data is output for display at a display device that is disposed within an interior of the aircraft (Step 58). For instance, processor 36 can output the captured image data that is received from camera 16b for display at display device 20 that is disposed within an interior of aircraft 10.

A region within the captured image data that corresponds to a leading edge of a wing of the aircraft is identified (Step 60). For example, camera 16b can be disposed within a door of aircraft 10 such that the field of view of camera 16b is oriented to capture image data corresponding to a leading edge of a wing of aircraft 10. Processor 36 can analyze the captured image data to identify a region of the captured image data that corresponds to a leading edge of the wing of aircraft 10. For instance, as was previously described above, processor 36 can utilize an edge detection algorithm, such as the Canny edge detector algorithm or other edge detection algorithm to identify a region within image data captured by camera 16b that corresponds to a leading edge of a wing of aircraft 10.

It is determined whether the region within the captured image data that corresponds to the leading edge of the wing conforms to baseline image data corresponding to the leading edge of the wing (Step 62). Non-conformance of captured image data with baseline image data can occur when, for example, there is ice accretion (such as ice accretion I shown in FIG. 7B) or foreign object damage (such as damaged area D shown in FIG. 7B) on at least a portion of the wing. For example, processor 36 can access pixel coordinates of baseline image data associated with a leading edge of a wing of aircraft 10 captured by camera 16b in a baseline (e.g., known healthy) state. For instance, camera 16b can capture baseline image data of the wing of aircraft 10 when aircraft 10 is in a known, healthy state (e.g., without ice accretion on the wing, without deformation corresponding to damage of the wing, or otherwise in a known, healthy state). This baseline image data can be captured when, for example, aircraft door 14b is opened and closed during boarding procedures. This allows camera 16b to capture multiple views of the wing and calibrate the baseline image data. Processor 36 can analyze the baseline image data to identify a leading edge of the wing, such as via the Canny edge detector algorithm or other edge detection algorithm. Processor 36 can cause computer-readable memory 37 to store pixel coordinates corresponding to the leading edge of the wing that are identified based on the baseline image data.

Processor 36 can compare the pixel coordinates associated with the leading edge of the wing that are identified from the captured image data received from camera 16b during operation with the stored pixel coordinates corresponding to the baseline image data. Processor 36 can determine, in some examples, that the region that corresponds to the leading edge of the wing within the captured image data received from camera 16b does not conform to the baseline image data in response to determining that the pixel coordinates associated with the leading edge of the wing in the captured image data received from camera 16b deviates from the stored pixel coordinates associated with the baseline data by a threshold deviation. For instance, processor 36 can generate a first vector of pixel coordinates associated with the leading edge of the wing that are identified from the captured image data received from camera 16b. Processor 36 can generate a second vector of pixel coordinates as the stored pixel coordinates corresponding to the baseline image data. Processor 36 can determine an angle between the first vector and the second vector, the angle representing an extent of deviation between the two edges. That is, an angle of zero between the two vectors represents an identical match of pixel coordinates between the two edges. An increased angle between the first vector and the second vector corresponds to an increased extent of deviation between the first vector and the second vector.

Processor 36 can determine that the region within the captured image data that corresponds to the leading edge of the wing does not conform to the baseline image data corresponding to the leading edge of the wing in response to determining that the angle between the first vector and the second vector exceeds a threshold angle. Such deviation can represent ice accretion (such as ice accretion I shown in FIG. 7B) on the leading edge of the wing, deformation of the leading edge of the wing (e.g., due to foreign object damage or other damage; such as damaged area D shown in FIG. 7B), or other physical change to the leading edge of the wing that could impact aerodynamic performance of the wing. Camera 16b and processor 36, which have been calibrated on the wing surface contour, form, and dimensionality as described above, can assess that damage/deformation to the wing has occurred, determine a location of the damage/deformation, and determine an approximate size of the damaged/deformed area. Camera 16b, or cameras 16a, 16c, 16d, can additionally or alternatively monitor the trailing edge of the wing to detect damage or deformation. This monitoring can additionally or alternatively determine damage to, or improper movement of, wing control surfaces.

A warning associated with the leading edge of the wing is produced and output in response to determining that the region within the image data that corresponds to the leading edge of the wing does not conform to the baseline image data (Step 64). For example, processor 36 can output a visual alert for display at display device 20 and/or a separate display device within aircraft 10 (e.g., an EFIS display). In certain examples, such as when display device 20 includes a speaker device, processor 36 can cause display 20 (or other audio output device) to produce an audible alarm corresponding to the warning associated with the leading edge of the wing. In some examples, processor 36 can output an alert notification (e.g., a status or other notification) to aircraft avionics or other aircraft systems via an aircraft communication data bus. The warning associated with the leading edge of the wing can include an estimation of the location and size of the damaged area.

Accordingly, techniques of this disclosure can enable processor 36 to analyze captured image data received from camera 16b to produce a warning in response to determining that a leading edge of the wing does not conform to a baseline (e.g., known, healthy) state, thereby alerting the pilots or other flight crew and increasing safety of operation of aircraft 10. Additionally, a system as described above provides numerous advantages. Camera 16b and processor 36 can enable the detection of objects prior to collision, view or detect the collision as it occurs, and assess characteristics of any damage to determine a next potential course of action for crew members.

Engine Inlet Monitoring for Ground Personnel Safety Clearance

Figure 9A:
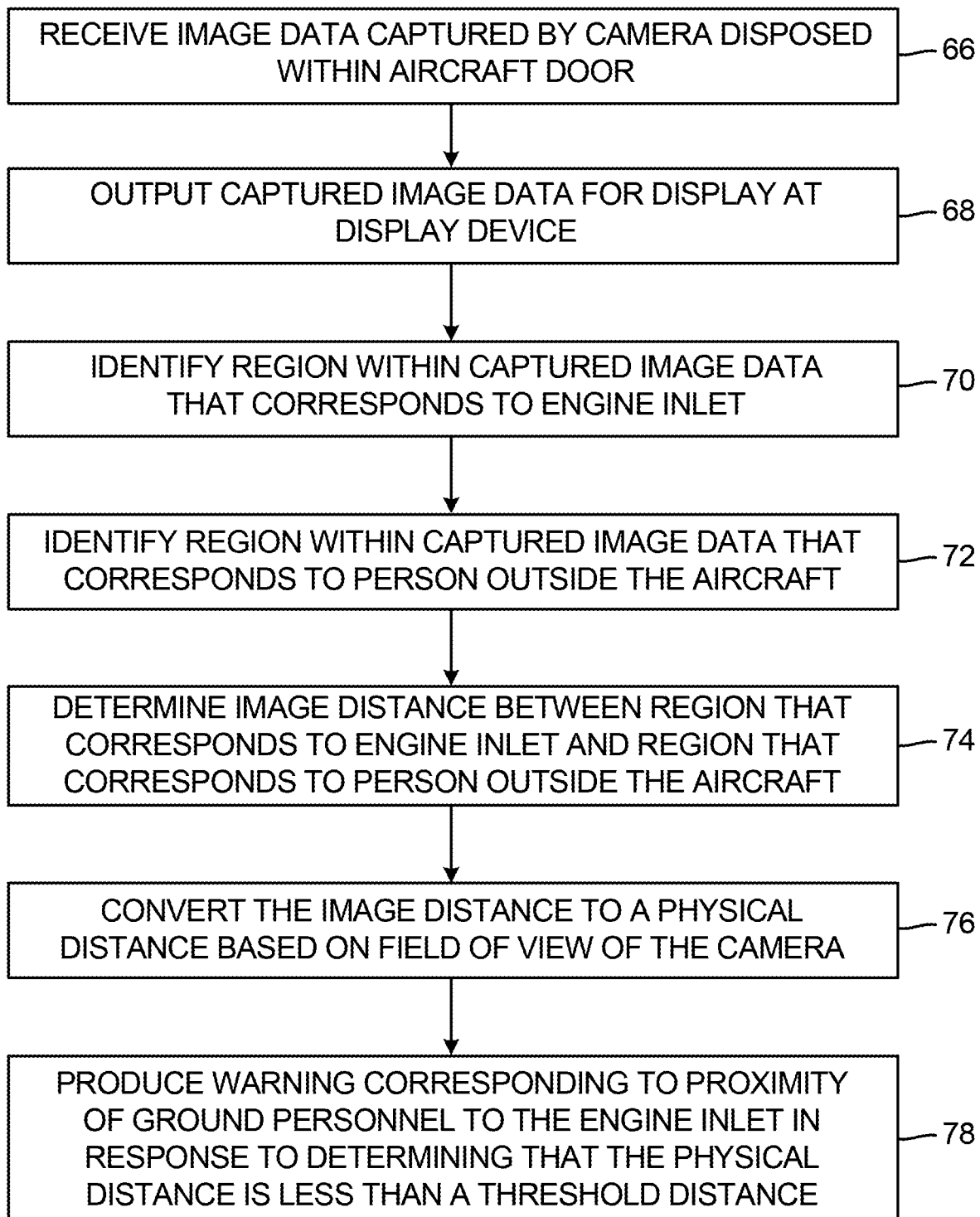
FIG. 9A is a flow chart illustrating example operations for utilizing captured image data from a camera disposed within an aircraft door to produce a warning corresponding to proximity of ground personnel to an engine inlet.
Figure 9B:
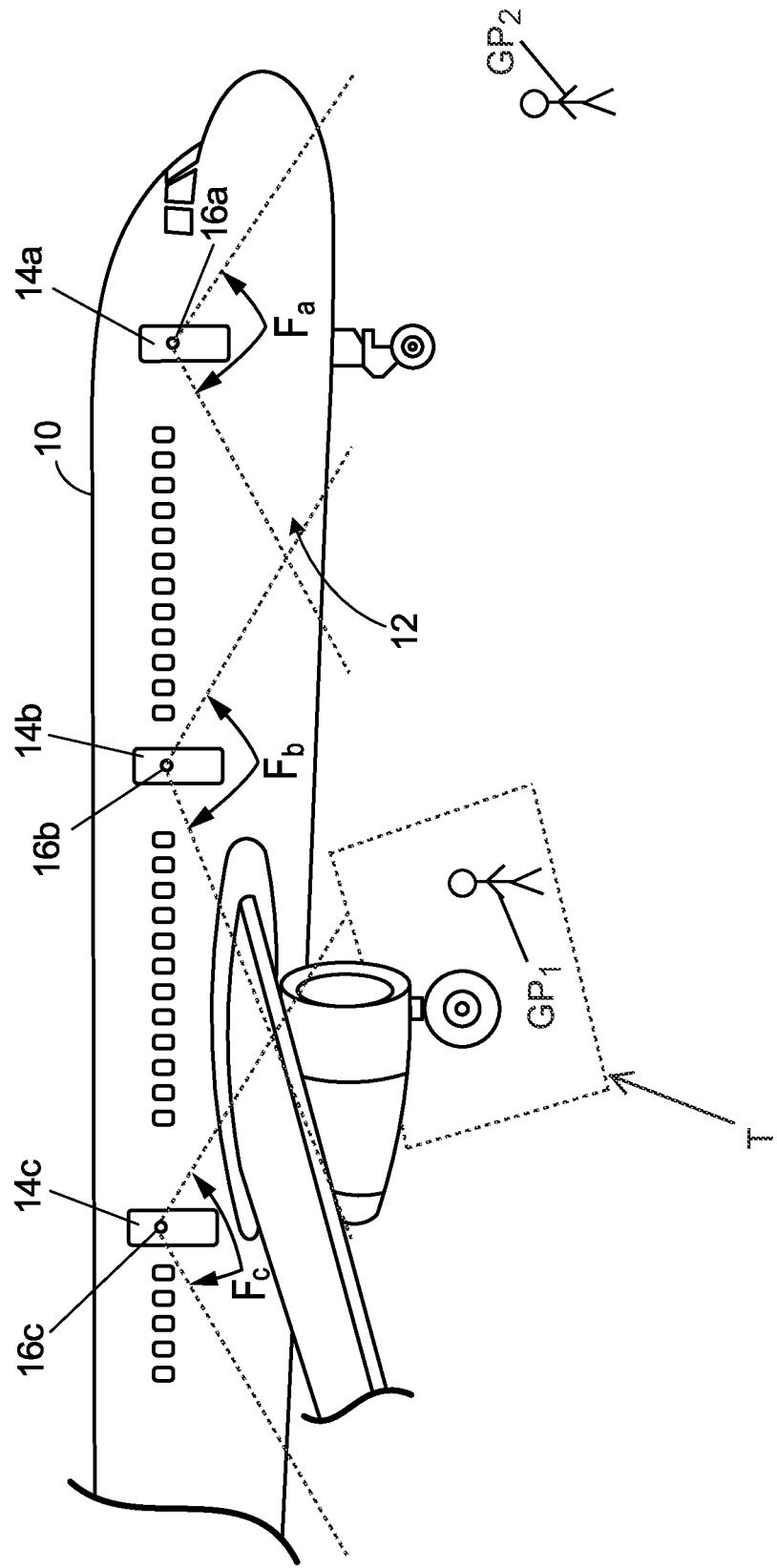
FIG. 9B is a schematic depiction of the aircraft of FIG. 1, including fields of view of the cameras of FIG. 1, and ground personnel about the aircraft.

FIG. 9A is a flow chart illustrating example operations for utilizing captured image data from a camera disposed within an aircraft door to produce a warning corresponding to proximity of ground personnel to an engine inlet. FIG. 9B illustrates aircraft 10 with aircraft skin 12, including doors 14a, 14b, and 14c having cameras 16a (with field of view $F_a$), 16b (with field of view $F_b$), and 16c (with field of view $F_c$) disposed therein, group personnel $GP_1$ and $GP_2$, and threshold region T. FIGS. 9A-9B will be discussed together. For purposes of clarity and ease of discussion, the example operations of FIG. 9A are described below within the context of camera 16b (FIGS. 1-6 and 9B) disposed within aircraft door 14b (FIGS. 1-4 and 9B) and operatively connected to display device 20 (FIGS. 2 and 5).

As described in more detail below, processor 36 can analyze the image data captured by camera 16b in a variety of ways by monitoring the engine inlet of an engine of aircraft 10. This monitoring can include, for example, monitoring field of view $F_b$ of camera 16b for foreign objects approaching the engine inlet and/or detecting deformation (due to damage or ice accretion) on the engine inlet. Processor 36 can further be configured to produce a warning associated with the engine inlet in response to the captured image data from camera 16b. This warning can communicate that, for example, ground personnel are within a threshold distance of the engine inlet (as described in reference to FIGS. 9A-9B), ingestion of a foreign object is likely (as described below in reference to FIGS. 10A-10B), and/or that the engine inlet is deformed as compared to a baseline state (as described below in reference to FIGS. 11A-11B).

Image data captured by a camera that is disposed within an aircraft door and which has a field of view toward an external environment of the aircraft is received (Step 66). For example, processor 36 can receive image data captured by camera 16b having field of view $F_b$ that is oriented toward an exterior of aircraft 10. The captured image data is output for display at a display device that is disposed within an interior of the aircraft (Step 68). For instance, processor 36 can output the captured image data that is received from camera 16b for display at display device 20 that is disposed within an interior of aircraft 10.

A region within the captured image data that corresponds to an engine inlet of an engine on the aircraft is identified (Step 70). For example, processor 36 can analyze the captured image data by utilizing an object detection algorithm, such as the SSD algorithm for object detection, the YOLO object recognition algorithm, or other real-time object detection algorithm to identify a region of the captured image data corresponding to an engine inlet. For instance, processor 36 can utilize the YOLO algorithm that has been trained via image data of the inlet of the engine of aircraft 10 to recognize the engine inlet as an object. In other examples, a different object detection algorithm can be used. Processor 36, executing, e.g., the YOLO algorithm, can identify the region within the captured image data that corresponds to the engine inlet on aircraft 10 as the region of the bounding box produced by the YOLO algorithm that encloses the identified engine inlet object within the captured image data.

A region within the captured image data that corresponds to a person outside the aircraft, such as ground personnel $GP_1$, $GP_2$, is identified (Step 72). For instance, processor 36 can execute the Histogram of Oriented Gradients (HOG) algorithm, the YOLO object recognition algorithm, the SSD algorithm, or other object detection algorithm trained on image data of humans to identify a person as an object within the captured image data. For instance, processor 36 can execute the YOLO object recognition algorithm and can identify the bounding box enclosing an identified object corresponding to a person within the captured image data as the region within the captured image data that corresponds to the person outside the aircraft.

An image distance between the region within the captured image data that corresponds to the engine inlet and the region within the captured image data that corresponds to the person outside the aircraft is determined (Step 74). For instance, processor 36 can determine, e.g., a shortest-path least number of pixels between the region of the captured image data that corresponds to the engine inlet and the region of the captured image data that corresponds to the person outside the aircraft. The image distance is converted to a physical distance based on the field of view of the camera (Step 76). For example, processor 36 can convert the number of pixels corresponding to the image distance between the regions based on a known distance between the mounting location of camera 16b and the engine inlet and a known number of pixels corresponding to the distance.

A warning corresponding to proximity of ground personnel to the engine inlet is produced in response to determining that the physical distance is less than a threshold distance (Step 78). In FIG. 9B, the threshold distance is defined by the threshold region T, and ground personnel $GP_1$ is within the region T (and accordingly, less than the threshold distance from the engine inlet) while ground personnel $GP_2$ is outside the threshold region T (more than the threshold distance from the engine inlet). In the example shown in FIG. 9B, ground personnel $GP_1$ would trigger a warning, while ground personnel $GP_2$ would not trigger a warning. The defined threshold distance can be based on a region (such as region T) defined by selected or calculated boundary locations. Additionally or alternatively, the threshold distance can itself be selected or calculated. Multiple threshold distances and/or regions can be selected for different gradations of possible alerts. For example, a secondary threshold distance and/or region which is larger than a primary threshold distance and/or region can be defined which triggers an alert to warn ground personnel that they are nearing the primary threshold distance and/or region. The threshold distance and/or the threshold region can vary based on parameters such as engine speed and/or power level. For example, a larger threshold distance and/or region can be used for a high engine power level than for a low engine power level. Processor 36 can output a visual alert for display at display device 20 and/or a separate display device within aircraft 10 (e.g., an EFIS display). In certain examples, such as when display device 20 includes a speaker device, processor 36 can cause display 20 (or other audio output device) to produce an audible alarm corresponding to the warning associated with the proximity of ground personnel to the engine inlet. In some examples, processor 36 can output an alert notification (e.g., a status or other notification) to aircraft avionics or other aircraft systems via an aircraft communication data bus. Processor 36 can additionally or alternatively wirelessly alert devices outside of aircraft 10, such as devices worn or held by ground personnel.

Accordingly, techniques of this disclosure can enable processor 36 to analyze captured image data received from camera 16b to produce a warning in response to determining that a ground personnel is within a threshold distance from an engine inlet of an engine of aircraft 10, thereby alerting the pilots or other flight crew and increasing safety of operation of aircraft 10. Captured image data from any of cameras 16a, 16b, 16c, 16d can be combined to gather additional information about the external environment of aircraft 10.

Engine Inlet Monitoring for Anticipated Foreign Object Ingestion

Figure 10A:
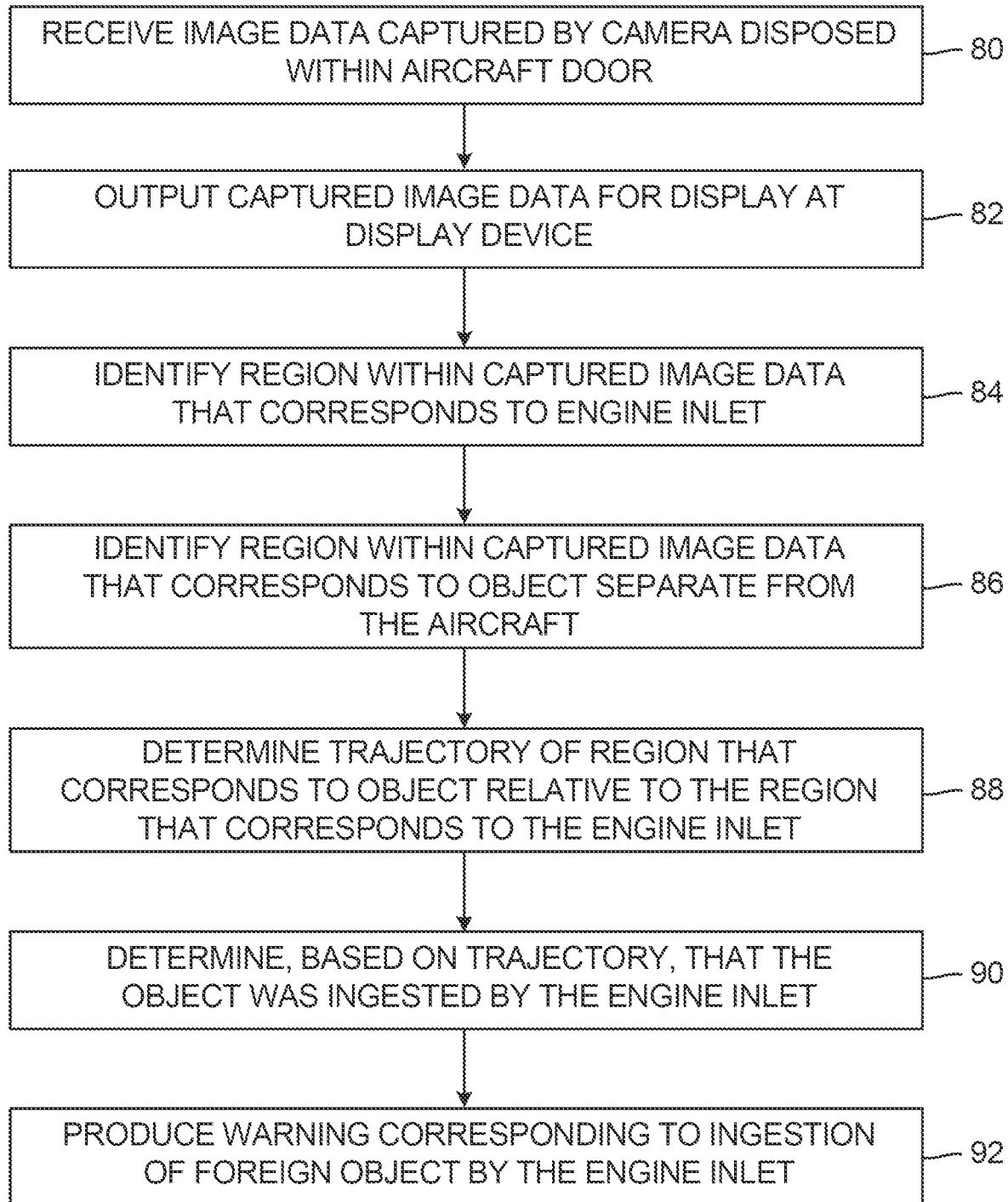
FIG. 10A is a flow chart illustrating example operations for utilizing captured image data from a camera disposed within an aircraft door to produce a warning corresponding to ingestion of a foreign object to an engine inlet of an engine of the aircraft.
Figure 10B:
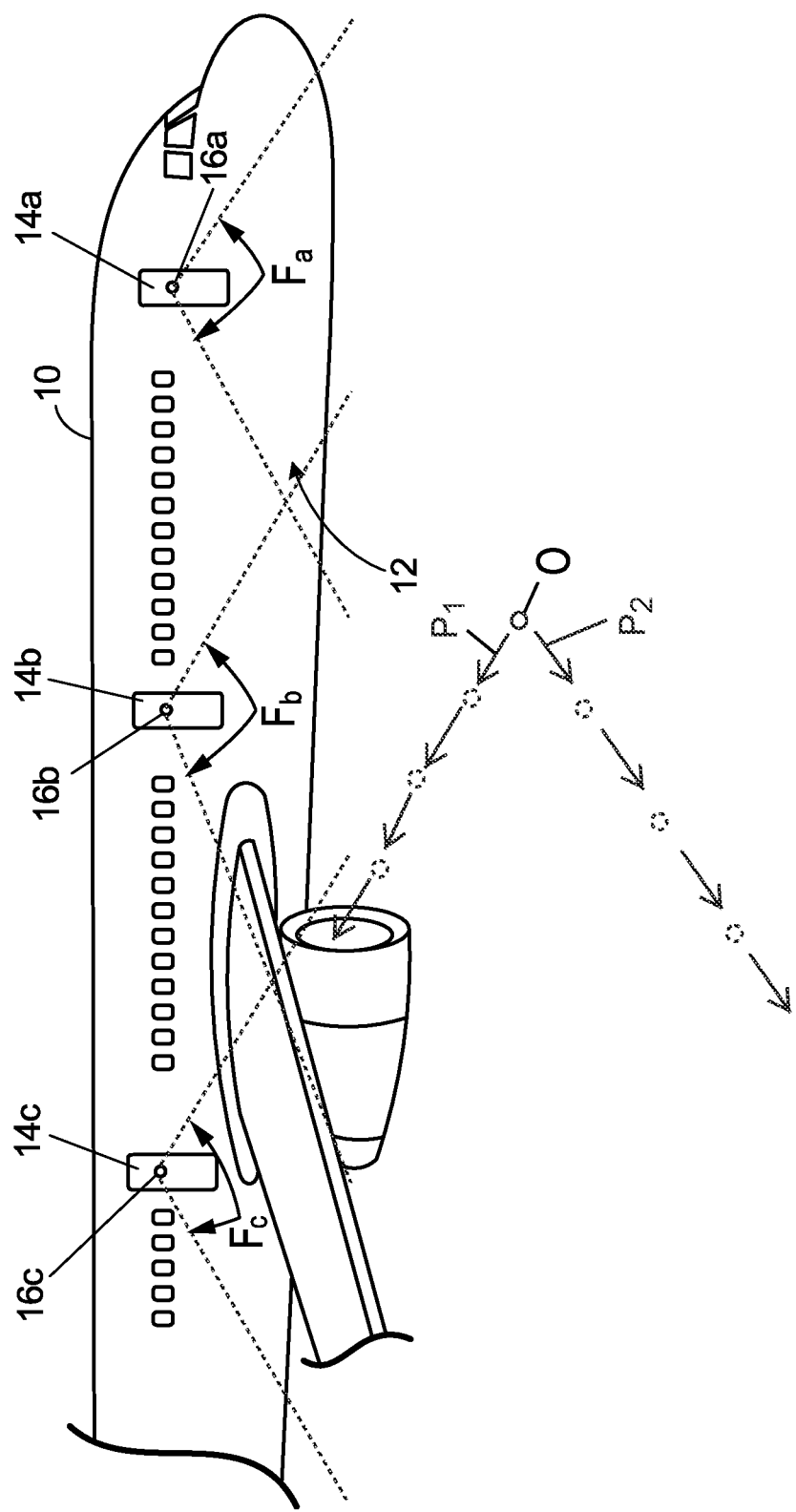
FIG. 10B is a schematic depiction of the aircraft of FIG. 1, including fields of view of the cameras of FIG. 1, and an object separate from the aircraft.

FIG. 10A is a flow chart illustrating example operations for utilizing captured image data from a camera disposed within an aircraft door to produce a warning corresponding to ingestion of a foreign object to an engine inlet of an engine of the aircraft. FIG. 10B illustrates aircraft 10 with aircraft skin 12, including doors 14a, 14b, and 14c having cameras 16a (with field of view $F_a$), 16b (with field of view $F_b$), and 16c (with field of view $F_c$) disposed therein, and object O. FIGS. 10A-10B will be discussed together. For purposes of clarity and ease of discussion, the example operations of FIG. 10A are described below within the context of camera 16b (FIGS. 1-6 and 10B) disposed within aircraft door 14b (FIGS. 1-4 and 10B) and operatively connected to display device 20 (FIGS. 2 and 5).

Image data captured by a camera that is disposed within an aircraft door and which has a field of view toward an external environment of the aircraft is received (Step 80). For example, processor 36 can receive image data captured by camera 16b having field of view $F_b$ that is oriented toward an exterior of aircraft 10. The captured image data is output for display at a display device that is disposed within an interior of the aircraft (Step 82). For instance, processor 36 can output the captured image data that is received from camera 16b for display at display device 20 that is disposed within an interior of aircraft 10. In some examples, the display device can have the ability to continuously watch for a potential object ingestion, alert crew members of a potential object ingestion, and/or show crew members video of an object ingestion.

A region within the captured image data that corresponds to an engine inlet of an engine on the aircraft is identified (Step 84). For example, processor 36 can analyze the captured image data by utilizing an object detection algorithm, such as the SSD algorithm for object detection, the YOLO object recognition algorithm, or other real-time object detection algorithm to identify a region of the captured image data corresponding to an engine inlet. For instance, processor 36 can utilize the YOLO algorithm that has been trained via image data of the inlet of the engine of aircraft 10 to recognize the engine inlet as an object, though in other examples, a different object detection algorithm can be used. Processor 36, executing, e.g., the YOLO algorithm, can identify the region within the captured image data that corresponds to the engine inlet on aircraft 10 as the region of the bounding box produced by the YOLO algorithm that encloses the identified engine inlet object within the captured image data.

A region within the captured image data that corresponds to an object separate from the aircraft, such as object O in FIG. 10B, is identified (Step 86). For example, processor 36 can analyze the captured image data by utilizing an object detection algorithm, such as the SSD algorithm for object detection, the YOLO object recognition algorithm, or other real-time object detection algorithm to identify a region of the captured image data corresponding to an object separate from aircraft 10. For instance, processor 36 can utilize the YOLO object recognition algorithm to identify the region within the captured image data corresponding to an object as the region within the captured image data that is output by the YOLO algorithm as a bounding box around an identified object, though other object detection algorithms are possible. For instance, the YOLO algorithm can be trained using baseline image data of objects to recognize any one or more of a plurality of objects. Candidate objects can include, e.g., birds of various type and size, and/or shapes of various type and size, such as ovals, circles, squares, or other polygons that may be encountered by an aircraft in flight or during other phases of operation. Processor 36, executing a YOLO algorithm for example, can determine a region of the captured image data corresponding to an object that is separate from the aircraft as a region of a bounding box surrounding an object that is produced by the YOLO algorithm.

A trajectory of the region that corresponds to object O relative to the region within the captured image data that corresponds to the engine inlet is determined (Step 88). For instance, processor 36 can determine the trajectory of the identified object based on a relative location within the captured image data of the object within successive frames of the captured image data. In other examples, processor 36 can determine the trajectory of the identified object based on a location of the identified object within the captured image data and a motion vector of the identified object determined based on, e.g., an Optical Flow or other motion tracking algorithm.

It is determined, based on the trajectory of the identified object, that a probability that the object was ingested by the engine inlet exceeds a threshold probability (Step 90). For example, processor 36 can determine, based on the trajectory of the identified object and a location of region of the captured image data corresponding to the engine inlet, a probability that the identified object intersected the engine inlet and was ingested by the engine inlet. Processor 36 can compare the determined probability to a threshold probability, such as a fifty percent probability, a sixty percent probability, or other threshold probability. In the example shown in FIG. 10B, paths $P_1$ and $P_2$ are shown as trajectories for object O. If object O is traveling along path $P_1$, a future ingestion is likely, and a warning corresponding to ingestion will be produced in Step 92. If object O is traveling along path $P_2$, a future ingestion is unlikely, and a warning corresponding to ingestion will not be produced.

A warning corresponding to ingestion of a foreign object to the engine inlet is produced in response to determining that probability that the object was ingested by the engine inlet exceeds the threshold probability (Step 92). For example, processor 36 can output a visual alert for display at display device 20 and/or a separate display device within aircraft 10 (e.g., an EFIS display). In certain examples, such as when display device 20 includes a speaker device, processor 36 can cause display 20 (or other audio output device) to produce an audible alarm corresponding to the warning associated with the ingestion of a foreign object to the engine inlet. In some examples, processor 36 can output an alert notification (e.g., a status or other notification) to aircraft avionics or other aircraft systems via an aircraft communication data bus.

Accordingly, techniques of this disclosure can enable processor 36 to analyze captured image data received from camera 16a to produce a warning in response to determining that a probability that a foreign object was ingested by the engine inlet exceeds a threshold probability, thereby alerting the pilots or other flight crew and increasing safety of operation of aircraft 10. Additionally, a system as described above provides numerous advantages. Camera 16b and processor 36 can enable the detection of objects prior to collision, view or detect the collision as it occurs, and assess characteristics of any damage to determine a next potential course of action for crew members.

Engine Inlet Monitoring for Deformation Compared to Baseline Data

Figure 11A:
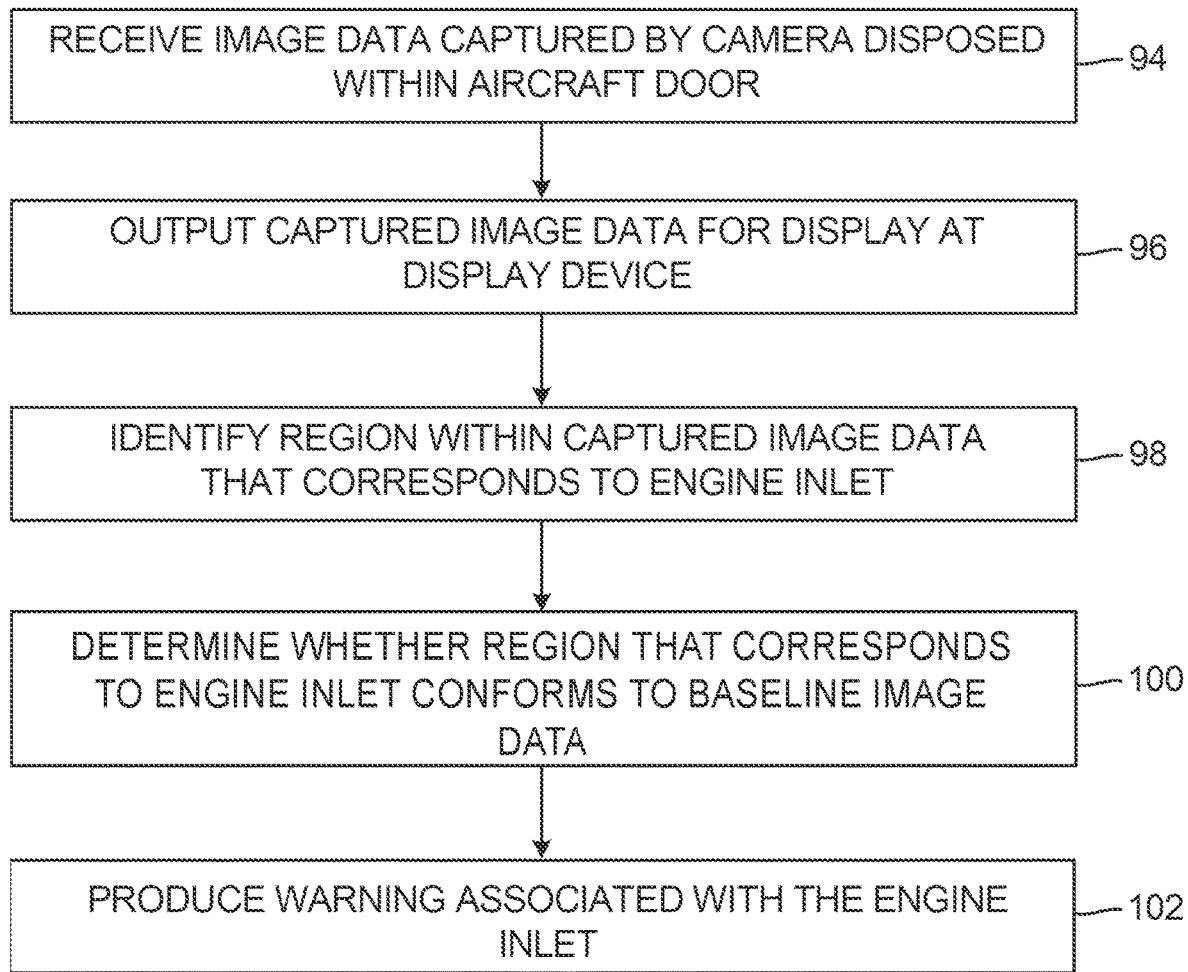
FIG. 11A is a flow chart illustrating example operations for utilizing captured image data from a camera disposed within an aircraft door to produce a warning associated with an engine inlet in response to determining that an identified region within the capture image data that corresponds to the engine inlet does not conform to baseline image data.
Figure 11B:
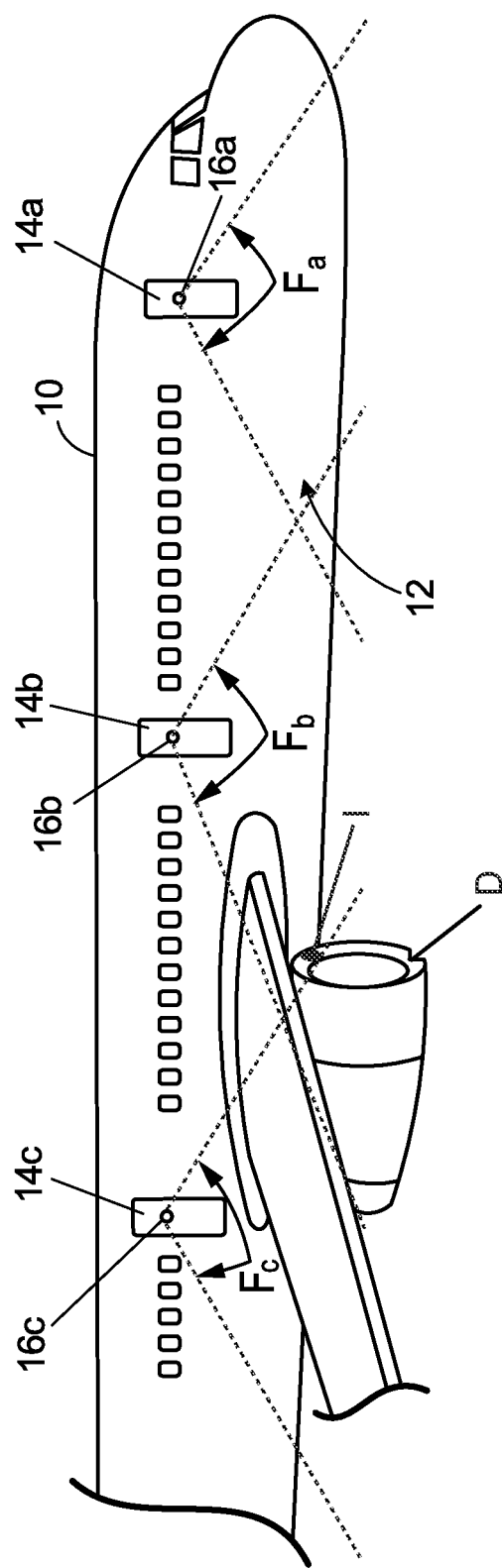
FIG. 11B is a schematic depiction of the aircraft of FIG. 1, including fields of view of the cameras of FIG. 1, and damage to an engine inlet of the aircraft.

FIG. 11A is a flow chart illustrating example operations for utilizing captured image data from a camera disposed within an aircraft door to produce a warning associated with an engine inlet in response to determining that an identified region within the capture image data that corresponds to the engine inlet does not conform to baseline image data. FIG. 11B illustrates aircraft 10 with aircraft skin 12, including doors 14a, 14b, and 14c having cameras 16a (with field of view $F_a$), 16b (with field of view $F_b$), and 16c (with field of view $F_c$) disposed therein, damaged area D, and ice accretion I. FIGS. 11A-11B will be discussed together. For purposes of clarity and ease of discussion, the example operations of FIG. 11A are described below within the context of camera 16b (FIGS. 1-6 and 11B) disposed within aircraft door 14b (FIGS. 1-4 and 11B) and operatively connected to display device 20 (FIGS. 2 and 5).

Image data captured by a camera that is disposed within an aircraft door and which has a field of view toward an external environment of the aircraft is received (Step 94). For example, processor 36 can receive image data captured by camera 16b having a field of view that is oriented toward an exterior of aircraft 10. The captured image data is output for display at a display device that is disposed within an interior of the aircraft (Step 96). For instance, processor 36 can output the captured image data that is received from camera 16b for display at display device 20 that is disposed within an interior of aircraft 10.

A region within the captured image data that corresponds to an engine inlet of an engine on the aircraft is identified (Step 98). For example, processor 36 can analyze the captured image data by utilizing an object detection algorithm, such as the SSD algorithm for object detection, the YOLO object recognition algorithm, or other real-time object detection algorithm to identify a region of the captured image data corresponding to an engine inlet. For instance, processor 36 can utilize the YOLO algorithm that has been trained via image data of the inlet of the engine of aircraft 10 to recognize the engine inlet as an object, though in other examples, a different object detection algorithm can be used. Processor 36, executing, e.g., the YOLO algorithm, can identify the region within the captured image data that corresponds to the engine inlet on aircraft 10 as the region of the bounding box produced by the YOLO algorithm that encloses the identified engine inlet object within the captured image data.

It is determined whether the region within the image data that corresponds to the engine inlet conforms to baseline image data corresponding to the engine inlet of the engine (Step 100). Non-conformance of captured image data with baseline image data can occur when, for example, there is ice accretion (such as ice accretion I shown in FIG. 11B) or foreign object damage (such as damaged area D shown in FIG. 11B) on at least a portion of the engine inlet. For example, processor 36 can perform a strict comparison of color and intensity of pixels within the identified region of the captured image data that corresponds to the engine inlet and color an intensity of pixels within the baseline image data of the engine inlet, such as baseline image data utilized for training the YOLO algorithm to recognize the engine inlet as an object. In such an example, processor 36 can determine that the image data within the region of the captured image data corresponding to the engine inlet does not conform to the baseline image data in response to determining that a threshold number of pixels deviate from the baseline image data.

In some examples, processor 36 can perform a correlation comparison of the region within captured image data that corresponds to the engine inlet and baseline image data of the engine inlet to provide an indication of an extent by which the region within the captured image data that corresponds to the engine inlet deviates from the baseline image data. In such examples, processor 36 can determine that the image data within the region of the captured image data corresponding to the engine inlet does not conform to the baseline image data in response to determining that the indication of the extent of the deviation exceeds a threshold value.

In yet other examples, processor 36 can utilize fuzzy pixel comparison, histogram comparison, and/or image masking techniques to determine whether the image data within the region of the captured image data corresponding to the engine inlet conforms to the baseline image data.

A warning associated with the engine inlet is produced in response to determining that the region within the image data that corresponds to the engine inlet does not conform to the baseline image data (Step 102). For example, processor 36 can output a visual alert for display at display device 20 and/or a separate display device within aircraft 10 (e.g., an EFIS display). In certain examples, such as when display device 20 includes a speaker device, processor 36 can cause display 20 (or other audio output device) to produce an audible alarm corresponding to the warning associated with the engine inlet. In some examples, processor 36 can output an alert notification (e.g., a status or other notification) to aircraft avionics or other aircraft systems via an aircraft communication data bus.

Accordingly, techniques of this disclosure can enable processor 36 to analyze captured image data received from camera 16b to produce a warning in response to determining that an engine inlet does not conform to baseline image data corresponding to the engine inlet (e.g., in a known, healthy state), thereby alerting the pilots or other flight crew and increasing safety of operation of aircraft 10. Additionally, a system as described above provides numerous advantages. Camera 16b and processor 36 can enable the detection of objects prior to collision, view or detect the collision as it occurs, and assess characteristics of any damage to determine a next potential course of action for crew members.

Landing Gear Monitoring for Chock Blocks and Landing Gear Condition

Figure 12A:
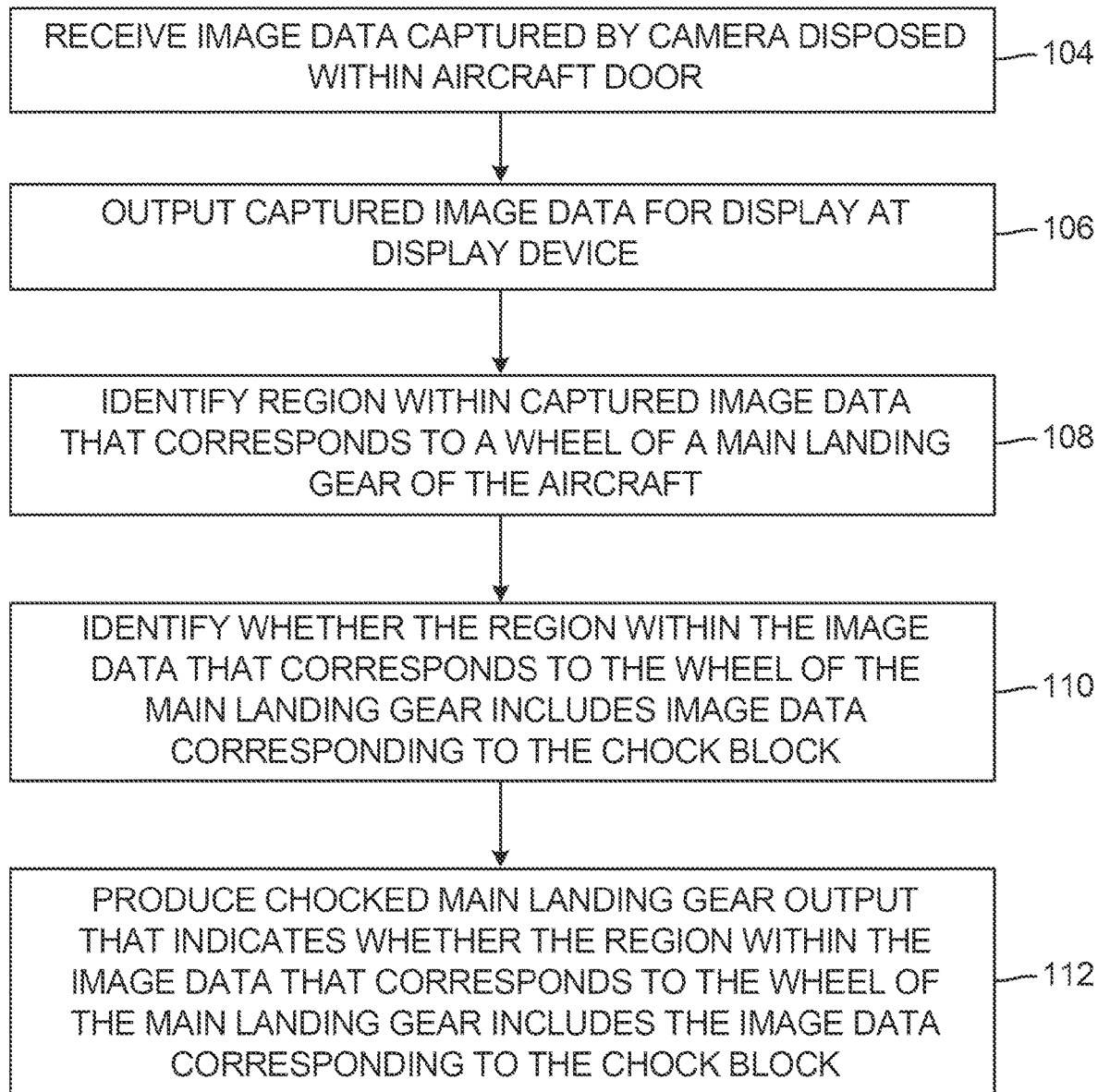
FIG. 12A is a flow chart illustrating example operations for utilizing captured image data from a camera disposed within an aircraft door to produce an output that indicates whether an identified region within the captured image data that corresponds to a wheel of main landing gear of the aircraft includes image data corresponding to a chock block.
Figure 12B:
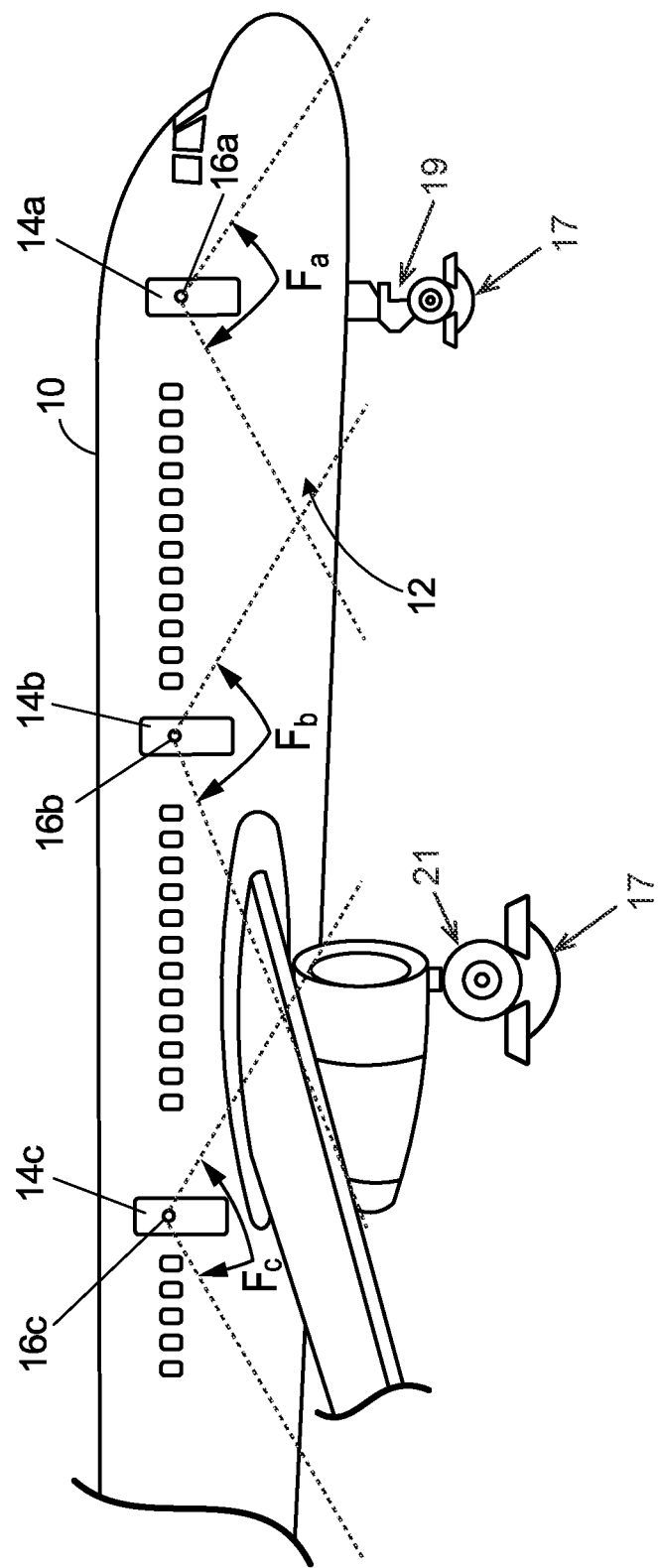
FIG. 12B is a schematic depiction of the aircraft of FIG. 1, including fields of view of the cameras of FIG. 1, and chock blocks present about landing gear of the aircraft.
Figure 12C:
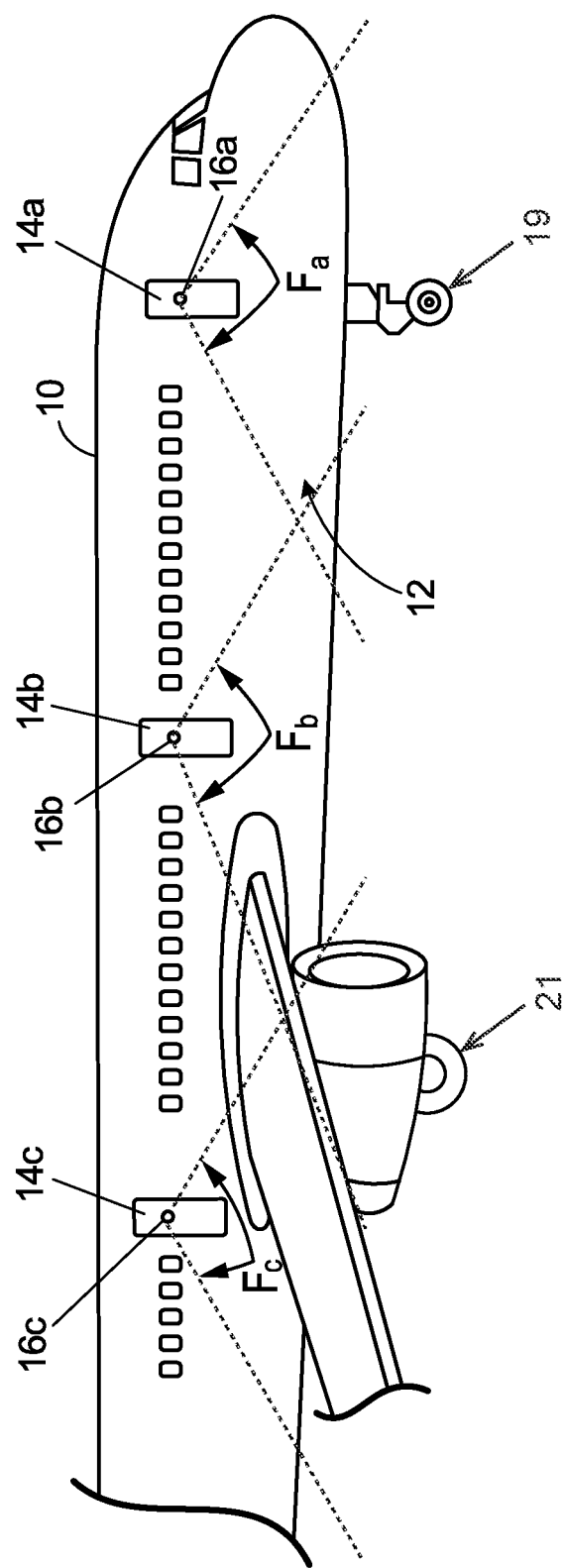
FIG. 12C is a schematic depiction of the aircraft of FIG. 1, including fields of view of the cameras of FIG. 1, when landing gear of the aircraft is not fully extended.

FIG. 12A is a flow chart illustrating example operations for utilizing captured image data from a camera disposed within an aircraft door to produce an output that indicates whether an identified region within the captured image data that corresponds to a wheel of main landing gear of the aircraft includes image data corresponding to a chock block. FIG. 12B illustrates aircraft 10 with aircraft skin 12, including doors 14a, 14b, and 14c having cameras 16a (with field of view $F_a$), 16b (with field of view $F_b$), and 16c (with field of view $F_c$) disposed therein, and chock blocks 17. FIG. 12C illustrates the subject matter of FIG. 12B and further illustrates nose landing gear 19 and main landing gear 21. Each of nose landing gear 19 and main landing gear 21 include a wheel and a tire. FIGS. 12A-12C will be discussed together. For purposes of clarity and ease of discussion, the example operations of FIG. 12A are described below within the context of camera 16c (FIGS. 1-6 and 12B-12C) disposed within aircraft door 14c (FIGS. 1-4 and 12B-12C) and operatively connected to display device 20 (FIGS. 2 and 5).

As described above in reference to FIG. 3, any of cameras 16a, 16b, 16c, 16d can be oriented to provide a field of view which includes the component to be monitored (here, the landing gear). As described in more detail below, processor 36 can analyze the image data captured by camera 16c in a variety of ways by monitoring landing gear of aircraft 10. This monitoring can include, for example, monitoring field of view $F_c$ of camera 16c for objects such as chock blocks and/or detecting whether the landing gear is fully extended, as well as the condition of the tires (inflated or flat). In the example shown in FIGS. 12B-12C, the tire of the main landing gear is fully inflated. Processor 36 can further be configured to produce a warning associated with the landing gear in response to the captured image data from camera 16c. This warning can communicate that, for example, a chock block is present near the landing gear and/or that the landing gear is not fully extended or that the tire condition is suspect/not fully inflated (as described below in reference to FIGS. 12A-12C).

Image data captured by a camera that is disposed within an aircraft door and which has a field of view toward an external environment of the aircraft is received (Step 104). For example, processor 36 can receive image data captured by camera 16c having field of view $F_c$ that is oriented toward an exterior of aircraft 10. The captured image data is output for display at a display device that is disposed within an interior of the aircraft (Step 106). For instance, processor 36 can output the captured image data that is received from camera 16c for display at display device 20 that is disposed within an interior of aircraft 10.

A region within the captured image data that corresponds to a wheel of a main landing gear of the aircraft is identified (Step 108). For example, processor 36 can analyze the captured image data by utilizing an object detection algorithm, such as the SSD algorithm for object detection, the YOLO object recognition algorithm, or other real-time object detection algorithm to identify a region of the captured image data corresponding to a main landing gear of aircraft 10. For instance, processor 36 can utilize the YOLO algorithm that has been trained via image data of the main landing gear of aircraft 10 to recognize the main landing gear as an object, though in other examples, a different object detection algorithm can be used. Processor 36, executing, e.g., the YOLO algorithm, can identify the region within the captured image data that corresponds to the main landing gear of aircraft 10 as the region of the bounding box produced by the YOLO algorithm that encloses the identified main landing gear object within the captured image data.

It is identified whether the region within the captured image data that corresponds to the wheel of the main landing gear includes image data corresponding to a chock block (Step 110). For example, processor 36 can utilize the YOLO, SSD, or other object detection algorithm trained on image data of a chock block to identify a region of the captured image data corresponding to a chock block. A similar method can be used to identify whether the landing gear, such as main landing gear 21, is fully extended, including whether the landing gear is extended at the correct angle. In response to determining that a region corresponding to the chock block is identified in the captured image data, processor 36 can determine whether the region corresponding to the chock block is proximate the region of the captured image data corresponding to the main landing gear, such as by comparing an image distance (e.g., a number of pixels or other distance) between the region within the captured image data corresponding to the main landing gear and the region within the captured image data corresponding to the chock block is less than a threshold image distance. In response to determining that the image distance is less than the threshold image distance, processor 36 can determine that the chock block is present at the main landing gear. In response to determining that the image distance is greater than the threshold image distance or that no object was detected corresponding to the chock block, processor 36 can determine that the chock block is not present at the main landing gear.

In some examples, processor 36 can utilize on object detection algorithm, such as the YOLO algorithm, the SSD algorithm, or other object detection algorithm that is trained on image data of the main landing gear with the chock block in place at the main landing gear (i.e., within the threshold distance to the main landing gear). In such examples, processor 36 can execute the object detection algorithm to identify a region of the captured image data corresponding to the main landing gear of the aircraft with the chock block in place as an object within the captured image data. In response to determining that the object corresponding to the main landing gear with the chock block in place is identified in the captured image data, processor 36 can determine that the image data that corresponds to the wheel of the main landing gear includes the image data corresponding to the chock block. In response to determining that the object corresponding to the main landing gear with the chock block in place is not identified in the captured image data, processor 36 can determine that the image data that corresponds to the wheel of the main landing gear does not include the image data corresponding to the chock block.

In examples where the wheel of the landing gear is monitored for the presence of chock blocks, a chocked main landing gear output is produced that indicates whether the region within the image data that corresponds to the wheel of the main landing gear includes the image data corresponding to the chock block (Step 112). In examples where the extension of the landing gear is monitored, an output can be produced which communicates that the landing gear is not fully extended. For example, processor 36 can produce an output for display at display device 20 (or other display device within aircraft 10) that indicates whether the chock block is in place at the main landing gear. In some examples, processor 36 can output the indication (e.g., a status or other notification) to aircraft avionics or other aircraft systems via an aircraft communication data bus.

In certain examples, processor 36 can execute the operations of the example of FIG. 12A in response to receiving an indication that aircraft 10 is docked, such as an input from aircraft avionics 34 indicating that a phase of the aircraft operation indicates that aircraft 10 is docked. As such, processor 36, in some examples, can perform the operations to determine whether the chock block is present at the main landing gear only when the phase of aircraft operation indicates that a chock block presence is expected.

Accordingly, techniques of this disclosure can enable processor 36 to analyze captured image data received from camera 16c to produce an indication of whether a chock block is present at main landing gear of the aircraft, thereby alerting flight crew in those instances when the chock block presence is expected but is not detected. Additionally and/or alternatively, an output can communicate to the flight crew that the landing gear is not fully extended and/or that a tire of the landing gear is not fully inflated. As such, the techniques of this disclosure can increase safety of operation of aircraft 10. Additionally, door cameras from the left and right sides of the aircraft, or multiple door cameras along one side of the aircraft, could generated aggregated image data to, for example, compare the horizon, landing gear height, or other parameters. Cameras such as camera 16c can continuously monitor for an event relating to the landing gear (such as presence or lack of chock blocks, incomplete landing gear extension, and/or a blown tire), and this system can alert crew members and show footage of such an event. Camera 16c and processor 36 can additionally or alternatively form part of a system which can monitor the landing gear and the edges and/or edge lines of the ground surface to, for example, alert crew members to the possibility of a potential excursion from the runway or taxi surface. This can allow crew members to avoid an excursion off of the runway or taxi surface onto, for example, an unpaved soil surface. Most simplistically, this system can continuously monitor the main landing gear and runway/taxiway edges/edge lines to determine convergence or divergence and, through aspect ratio analysis or other techniques, determine a magnitude of said convergence to determine a level of alerting that is needed. Looking out both sides of the aircraft onto finite width runway/taxiway surfaces, the combination of convergence on one side of the aircraft in lock step with the divergence on the opposite side of the aircraft can provide concurrence of a given level of probability of excursion. Likewise, multiple door cameras placed along the fuselage on a given aircraft side can work in concert to gauge the turn vector of the aircraft relative to the detected edge conditions and alert on predicted intersections at some distance along the surface.

Jet Bridge Alignment Monitoring

Figure 13A:
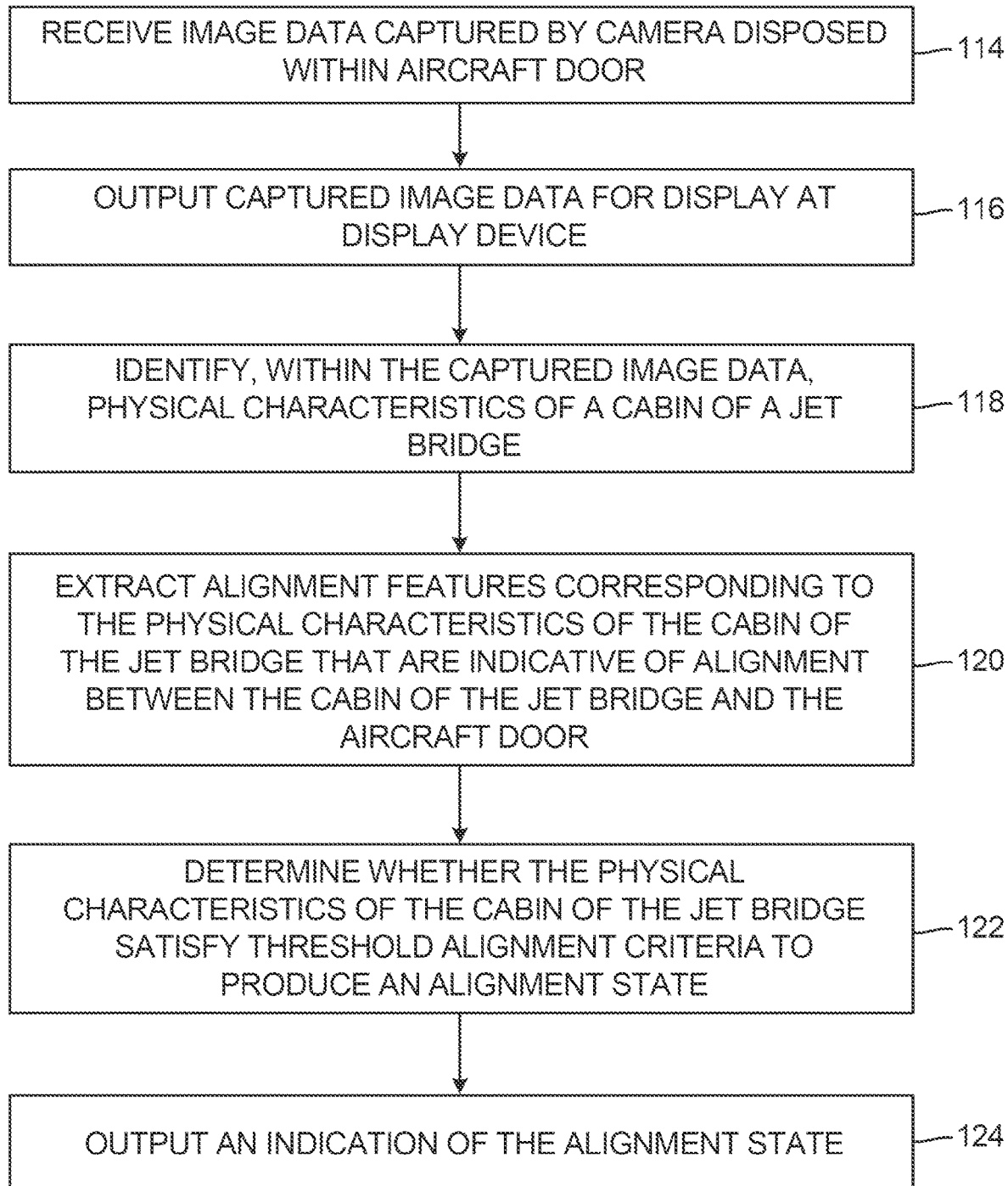
FIG. 13A is a flow chart illustrating example operations for utilizing captured image data from a camera disposed within an aircraft door to output an indication of an alignment state between the aircraft door and a cabin of a jet bridge.
Figure 13B:
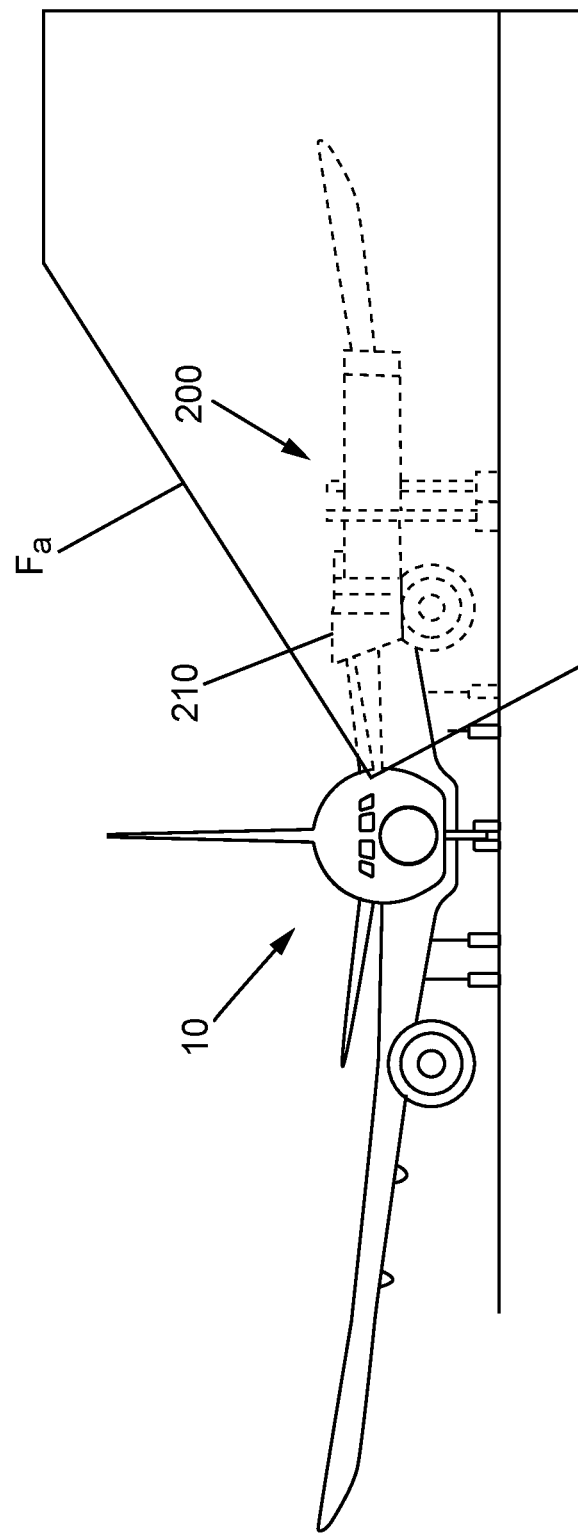
FIG. 13B is a front perspective view of the aircraft of FIG. 1, including a field of view of a camera of FIG. 1, adjacent to a jet bridge.
Figure 13C:
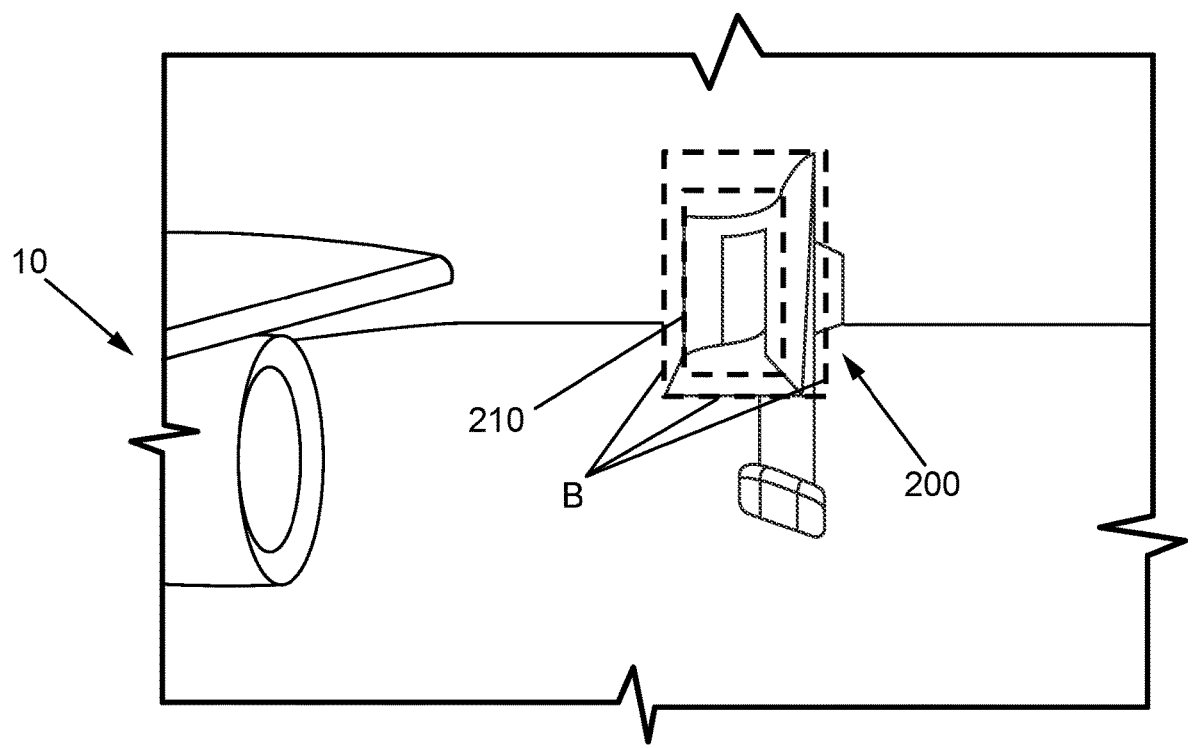
FIG. 13C-13D are perspective views of the jet bridge of FIG. 13B.
Figure 13D:
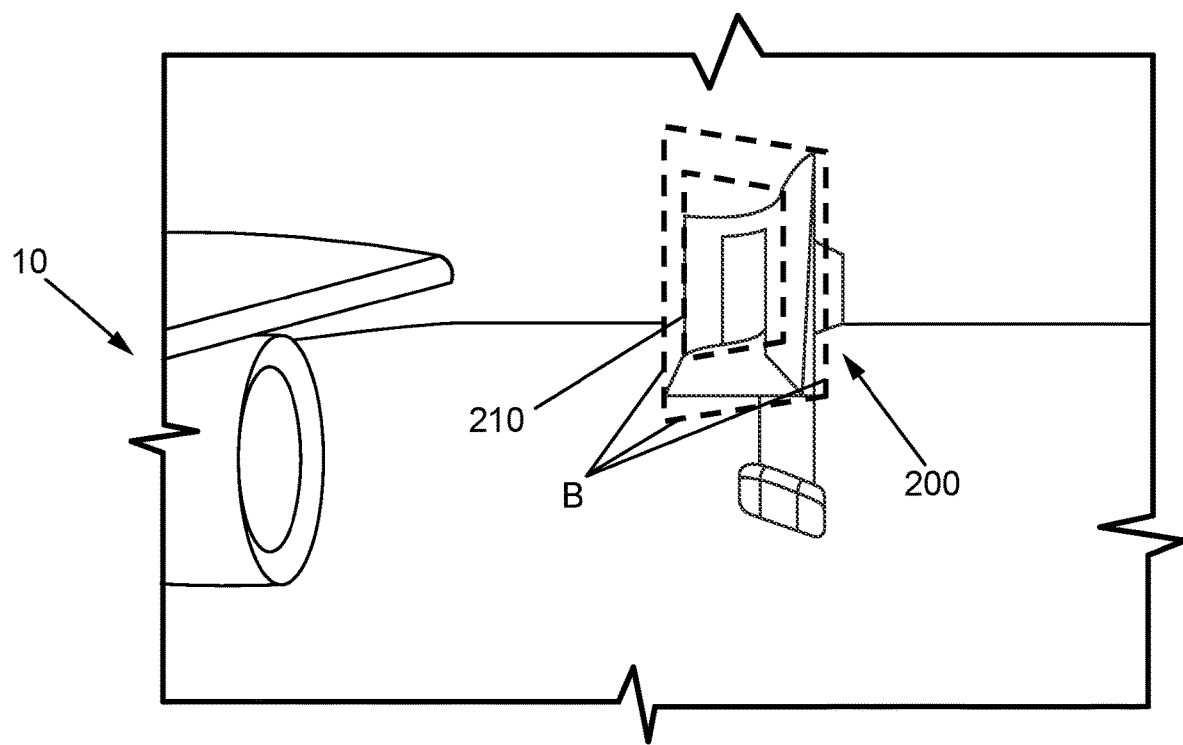
Figure 13E:
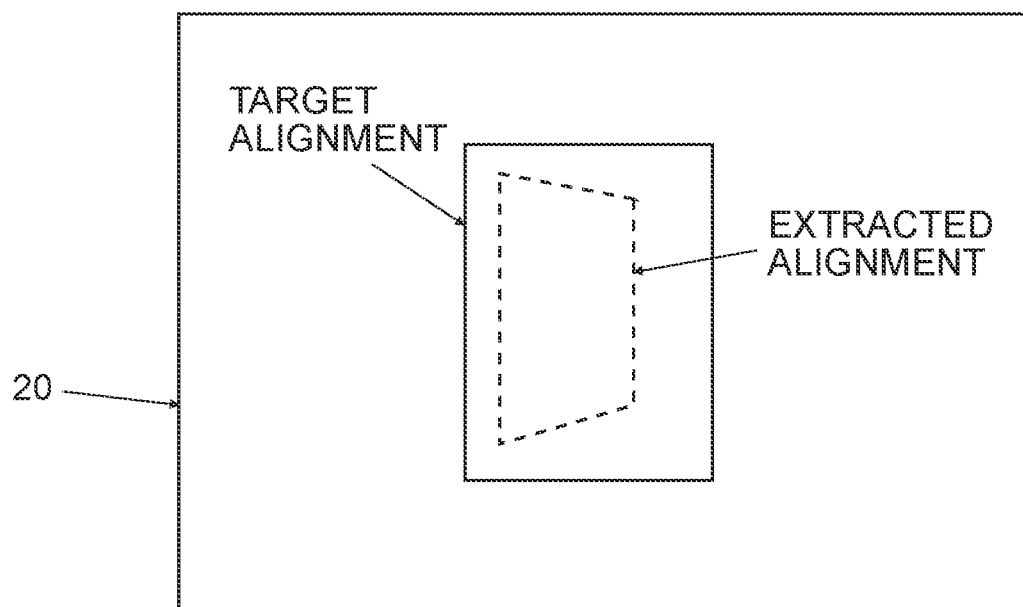
FIG. 13E is a schematic depiction of the display device of FIG. 5 outputting a graphical overlay of alignment features.

FIG. 13A is a flow chart illustrating example operations for utilizing captured image data from a camera disposed within an aircraft door to output an indication of an alignment state between the aircraft door and a cabin of a jet bridge, such as cabin 210 of jet bridge 200 (both shown in FIGS. 13B-13D). FIG. 13B is a front perspective view of aircraft 10, including a schematic depiction of field of view $F_a$ of camera 16a (shown in FIG. 1), and jet bridge 200 which includes cabin 210. FIG. 13C illustrates jet bridge 200, including boundaries B of cabin 210, when cabin 210 is in an alignment state with aircraft 10. FIG. 13D illustrates jet bridge 200, including boundaries B of cabin 210, when cabin 210 is not in an alignment state with aircraft 10. FIG. 13E is a schematic depiction of display device 20 outputting a graphical overlay of target and extracted alignment features. FIGS. 13A-13E will be discussed together. For purposes of clarity and ease of discussion, the example operations of FIG. 13A are described below within the context of camera 16a (FIGS. 1-6) disposed within aircraft door 14a (FIGS. 1-4) and operatively connected to display device 20 (FIGS. 2 and 5).

In certain examples, the operations of the example of FIG. 13A can be executed in response to receiving an indication that aircraft 10 is in a docking phase, such as an input from aircraft avionics 34 indicating that a phase of the aircraft operation indicates that aircraft 10 is docking (that is, within a docking distance of cabin 210 of jet bridge 200). As such, the example operations, in certain examples, can be performed only when the phase of aircraft operation indicates that a jet bridge alignment is expected.

Image data captured by a camera that is disposed within an aircraft door and which has a field of view toward an external environment of the aircraft is received (Step 114). For example, processor 36 can receive image data captured by camera 16a having a field of view that is oriented toward an exterior of aircraft 10. The captured image data is output for display at a display device that is disposed within an interior of the aircraft (Step 116). For instance, processor 36 can output the captured image data that is received from camera 16a for display at display device 20 that is disposed within an interior of aircraft 10.

Physical characteristics of cabin 210 of jet bridge 200 within the captured image data (here, field of view $F_a$) are identified (Step 118). Physical characteristics of cabin 210 can include, for example, boundaries B (shown in FIGS. 13C-13D) of cabin 210 or other physical characteristics of cabin 210. Processor 36 can identify the physical characteristics within the captured image data, such as boundaries B of cabin 210, using an edge detection algorithm. For instance, processor 36 can utilize the Canny edge detector or other edge detection algorithm to identify edges corresponding to outer boundaries B of cabin 210 within the captured image data. Another example of a physical characteristic of cabin 210 can be a light level present within cabin 210. The brightness of light within cabin 210 is lower than the amount of ambient light outside of cabin 210 (sunlight or floodlights used to illuminate the external environment of aircraft 10). When aircraft door 14a is sufficiently aligned and mated with cabin 210, this bright ambient light will not be within field of view $F_a$ of camera 16a. Processor 36 can determine whether a light level experienced by camera 16a exceeds an expected threshold defined by the light levels within cabin 210.

Alignment features corresponding to the physical characteristics of cabin 210 that are indicative of alignment between cabin 210 and the aircraft door are extracted from the captured image data using the identified physical characteristics of jet bridge 200 (Step 120). Alignment features can include, e.g., relative orientation of identified edges (such as boundaries B) of cabin 210 (indicating, e.g., a skewed orientation between the door and the cabin of the jet bridge), size of the identified edges within the captured image data (indicating, e.g., distance of the aircraft door to the jet bridge), relative size of the identified edges among the group of identified edges within the captured image data (indicating, e.g., a skewed orientation), or other features that are indicative of alignment between cabin 210 and the aircraft door.

It is determined, based on the alignment features, whether the physical characteristics of cabin 210 within the captured image data satisfy threshold alignment criteria to produce an alignment state (Step 122). An example of an alignment state is illustrated in FIG. 13C, while FIG. 13D illustrates an example where an alignment state is not present. For example, an alignment model (e.g., a linear regression or other model) can be developed and trained using machine learning or other techniques to produce an indication of an extent by which the extracted alignment features correlate to alignment features extracted from baseline (or training) image data captured by camera 16a while cabin 210 is aligned with the aircraft door. Processor 36 can extract the alignment features from the captured image data received from camera 16a and can utilize the trained alignment model to produce an output that indicates an extent by which the extracted alignment features correlate with the extracted features from the baseline image data, such as a normalized value (e.g., between a value of zero and one, between a value of zero and one hundred, or other normalized value) that indicates the extent of alignment. Processor 36 can compare the output that indicates the extent of alignment to a threshold alignment value to produce an alignment state that indicates whether the cabin of the jet bridge is aligned with the door of aircraft 10.

An indication of the alignment state is output (Step 124). For instance, processor 36 can output an indication of the alignment state for display at display device 20 or other display device. In certain examples, such as the example shown in FIG. 13E, the processor 36 can output the indication of the alignment state as a graphical overlay displayed at display device 20 of target alignment features over a graphical indication of the identified alignment features extracted from the captured image data. In the example shown in FIG. 13E, aircraft 10 is not in an alignment state with cabin 210, and accordingly a difference is demonstrated on the graphical overlay between the target and extracted alignment features. Another example of an indication of alignment state can be a green/red light system which indicates to crew members, such as a jet bridge operator, whether aircraft 10 is misaligned with cabin 210 (for example, if aircraft 10 is likely to hit cabin 210). A green light indicates that jet bridge alignment is proceeding in such a way that no corrections are needed, while a red light indicates that a correction is needed to avoid a misalignment and/or collision with cabin 210. The green/red light indication can additionally or alternatively be wirelessly sent to crew members who are not inside aircraft 10. Another example of an indication of alignment state can be an alert which is triggered if the aircraft door is open and cabin 210 of jet bridge 200 moves away from aircraft 10 (that is, out of a mated position with the aircraft door), and/or which is triggered if cabin 210 is not aligned with aircraft door 14a and an attempt is made to open aircraft door 14a.

Accordingly, processor 36 can analyze captured image data received from camera 16a to produce an indication of an alignment state between the cabin of the jet bridge and the aircraft door, thereby indicating the alignment state to flight crew or other personnel an increasing efficiency of docking operations of aircraft 10. Additionally, the perspective of a door camera such as camera 16a provides numerous advantages over a camera in another location on or off aircraft 10. Camera 16a is able to provide a view of the inside of cabin 210 of jet bridge 200, while cameras in other locations would be able to provide only a view of the outside of cabin 210. A view of the inside of cabin 210 can provide more consistent alignment fiducials than an external view of cabin 210. The position of camera 16a can allow for the monitoring of other alignment features, such as whether field of view $F_a$ includes bright ambient light. The use of camera 16a can improve the visibility and image quality available to crew members over conventional CCTV. A green/red light system can increase the efficiency and confidence of crew such as jet bridge operators and avoid damage to cabin 210 and/or aircraft 10. Camera 16a can form part of a system with aircraft door 14a to facilitate readiness for door opening and/or facilitate automated aircraft door opening processes when the correct signals are present (in a similar manner to the green/red light system described above, the system could receive an all-clear light which allows the aircraft doors to open). Finally, this system can facilitate warnings to crew members if aircraft door 14a is opened or opening when cabin 210 is not aligned with aircraft door 14a.

Alignment Fiducial Monitoring for Parking Operations

Figure 14A:
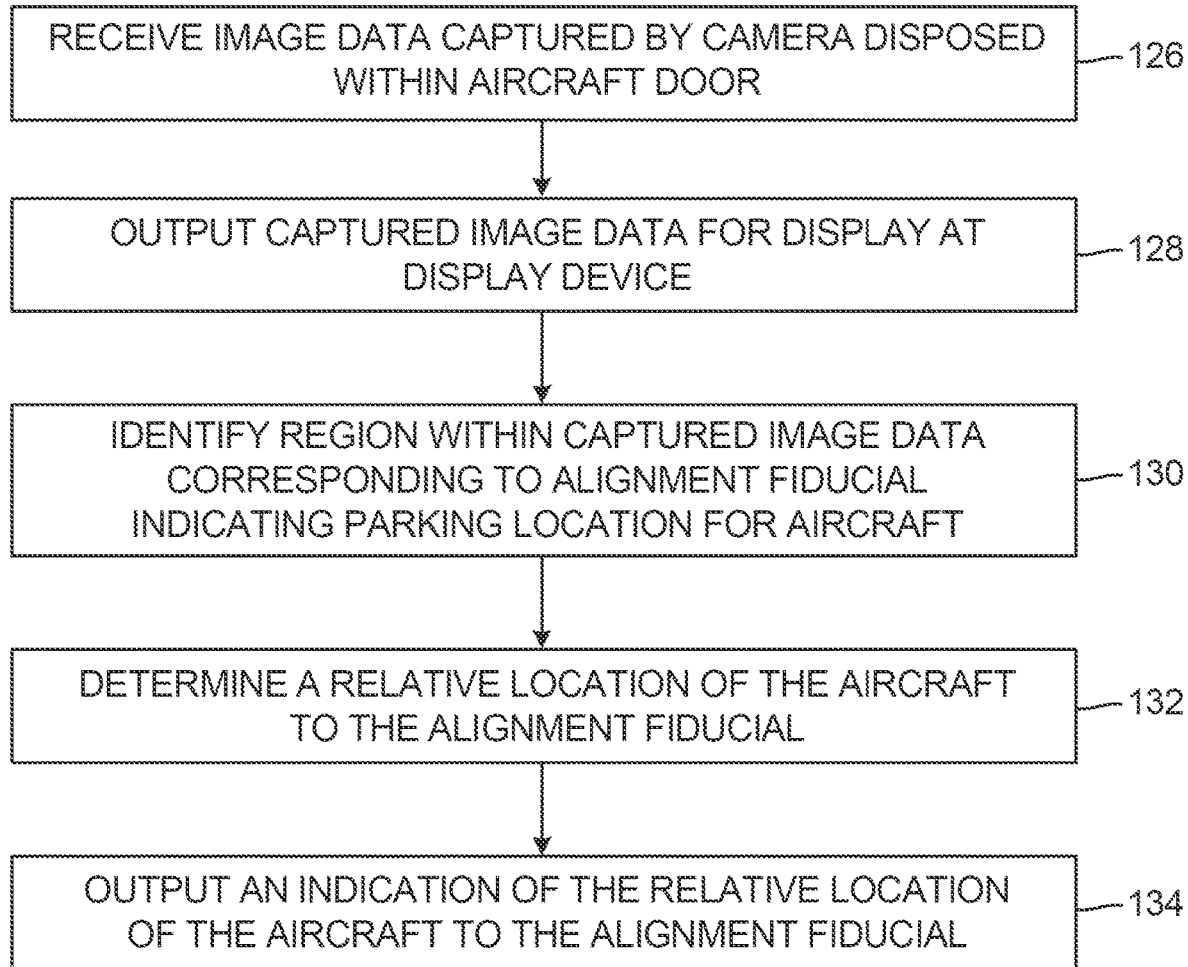
FIG. 14A is a flow chart illustrating example operations for utilizing captured image data from a camera disposed within an aircraft door to output an indication of a relative location of the aircraft to an alignment fiducial indicating a parking location for the aircraft.
Figure 14B:
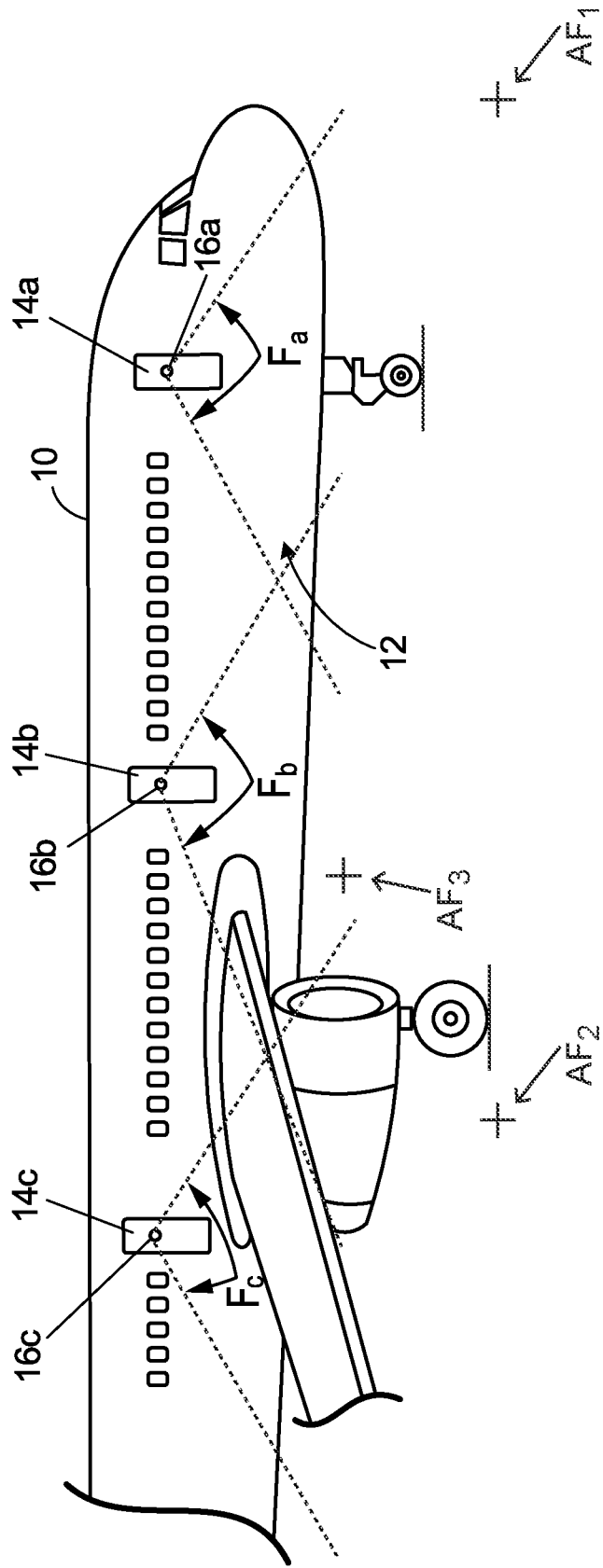
FIG. 14B is a schematic depiction of the aircraft of FIG. 1, including fields of view of the cameras of FIG. 1, relative to docking fiducials on the ground proximate to the aircraft.

FIG. 14A is a flow chart illustrating example operations for utilizing captured image data from a camera disposed within an aircraft door to output an indication of a relative location of the aircraft to an alignment fiducial indicating a parking location for the aircraft. FIG. 14B illustrates aircraft 10 with aircraft skin 12, including doors 14a, 14b, and 14c having cameras 16a (with field of view $F_a$), 16b (with field of view $F_b$), and 16c (with field of view $F_c$) disposed therein, and alignment fiducials $AF_1$, $AF_2$, $AF_3$. FIGS. 14A-14B will be discussed together. For purposes of clarity and ease of discussion, the example operations of FIG. 14A are described below within the context of camera 16a (FIGS. 1-6 and 14B) disposed within aircraft door 14a (FIGS. 1-4 and 14B) and operatively connected to display device 20 (FIGS. 2 and 5).

In certain examples, the operations of the example of FIG. 14A can be executed in response to receiving an indication that aircraft 10 is in a taxiing phase, such as an input from aircraft avionics 34 indicating that a phase of the aircraft operation indicates that aircraft 10 is taxiing. As such, the example operations, in certain examples, can be performed only when the phase of aircraft operation indicates that taxiing and alignment via an alignment fiducial indicating a parking location are expected.

Image data captured by a camera that is disposed within an aircraft door and which has a field of view toward an external environment of the aircraft is received (Step 126). For example, processor 36 can receive image data captured by camera 16a having a field of view that is oriented toward an exterior of aircraft 10. The captured image data is output for display at a display device that is disposed within an interior of the aircraft (Step 128). For instance, processor 36 can output the captured image data that is received from camera 16a for display at display device 20 that is disposed within an interior of aircraft 10.

A region within the captured image data corresponding to an alignment fiducial, such as alignment fiducial $AF_1$, indicating a parking location for the aircraft is identified (Step 130). The alignment fiducial can include, for example, intersecting orthogonal lines (as illustrated by alignment fiducials $AF_1$, $AF_2$, $AF_3$ in FIG. 14B) indicating an alignment orientation and location for parking an aircraft for, e.g., docking operations. Processor 36 can analyze the captured image data by utilizing an object detection algorithm, such as the SSD algorithm for object detection, the YOLO object recognition algorithm, or other real-time object detection algorithm to identify a region of the captured image data corresponding to the alignment fiducial. For instance, processor 36 can utilize the YOLO algorithm that has been trained via image data of the alignment fiducial to recognize the alignment fiducial as an object, though in other examples, a different object detection algorithm can be used. Processor 36, executing, e.g., the YOLO algorithm, can identify the region within the captured image data that corresponds to the alignment fiducial as the region of the bounding box produced by the YOLO algorithm that encloses the identified alignment fiducial object within the captured image data.

A relative location of the aircraft to the alignment fiducial is determined based on the region of the captured image data corresponding to the alignment fiducial (Step 132). The relative location can include a physical distance from at least a portion of the alignment fiducial as well as relative orientation of the aircraft with respect to the alignment fiducial. Processor 36 can analyze the image data within the region corresponding to the captured image data to extract relative location and alignment features from the image data within the identified region corresponding to the captured image data. Relative location and alignment features can include, for example, a size of the region within the captured image data corresponding to the alignment fiducial (indicating, e.g., distance to the alignment fiducial), and/or an angle of intersection of the intersecting lines of the alignment fiducial (indicating, e.g., a skewed alignment).

Processor 36 can utilize a relative location and alignment model, such as a linear regression model or other model, to determine an extent to which the region within the captured image data corresponding to the alignment fiducial correlates to baseline image data of the alignment fiducial when the aircraft is aligned at a parking location indicated by the alignment fiducial. For example, the relative location and alignment model can be developed and trained using machine learning or other techniques to produce an indication of an extent by which the extracted location and alignment features correlate to location and alignment features extracted from baseline (or training) image data captured by camera 16a while aircraft 10 is aligned at the parking location indicated by the fiducial. Processor 36 can extract the location and alignment features from the captured image data and can utilize the trained location and alignment model to produce an output that indicates an extent to which the location and alignment features extracted from the captured image data received from camera 16a correlate with alignment features extracted from the baseline image data, such as a normalized value that indicates the extent of correlation.

An indication of the relative location of the aircraft to the alignment fiducial is output (Step 134). For example, processor 36 can output an indication of the relative location for display at display device 20 or other display device (e.g., a display device within the cockpit of the aircraft). In certain examples, the processor 36 can output the indication of the alignment state as a graphical overlay of target location and alignment features over a graphical indication of the identified location and alignment features. The indication of the alignment state can additionally or alternatively include instructions to the cockpit regarding any necessary corrections to achieve an alignment state. Additionally or alternatively, camera 16a and processor 36 can form part of a system which can facilitate automated alignment processes by leveraging camera recognition of alignment fiducials such as ground surface markings and markings on the fixed structure of a terminal. Camera 16a and processor 36 can additionally or alternatively coordinate with other systems within or external to aircraft 10 to facilitate alignment processes.

Accordingly, processor 36 can analyze captured image data received from camera 16a to produce an indication of relative location and alignment of aircraft 10 and an alignment fiducial that indicates a parking location for aircraft 10, thereby assisting the flight crew or other personnel in taxiing and parking operations of aircraft 10. Additionally, the use of a door camera such as camera 16a can allow for effective, dynamic, and adaptive docking processes. This can additionally increase the effectiveness and confidence of crew members.

Runway Collision Monitoring

Figure 15:
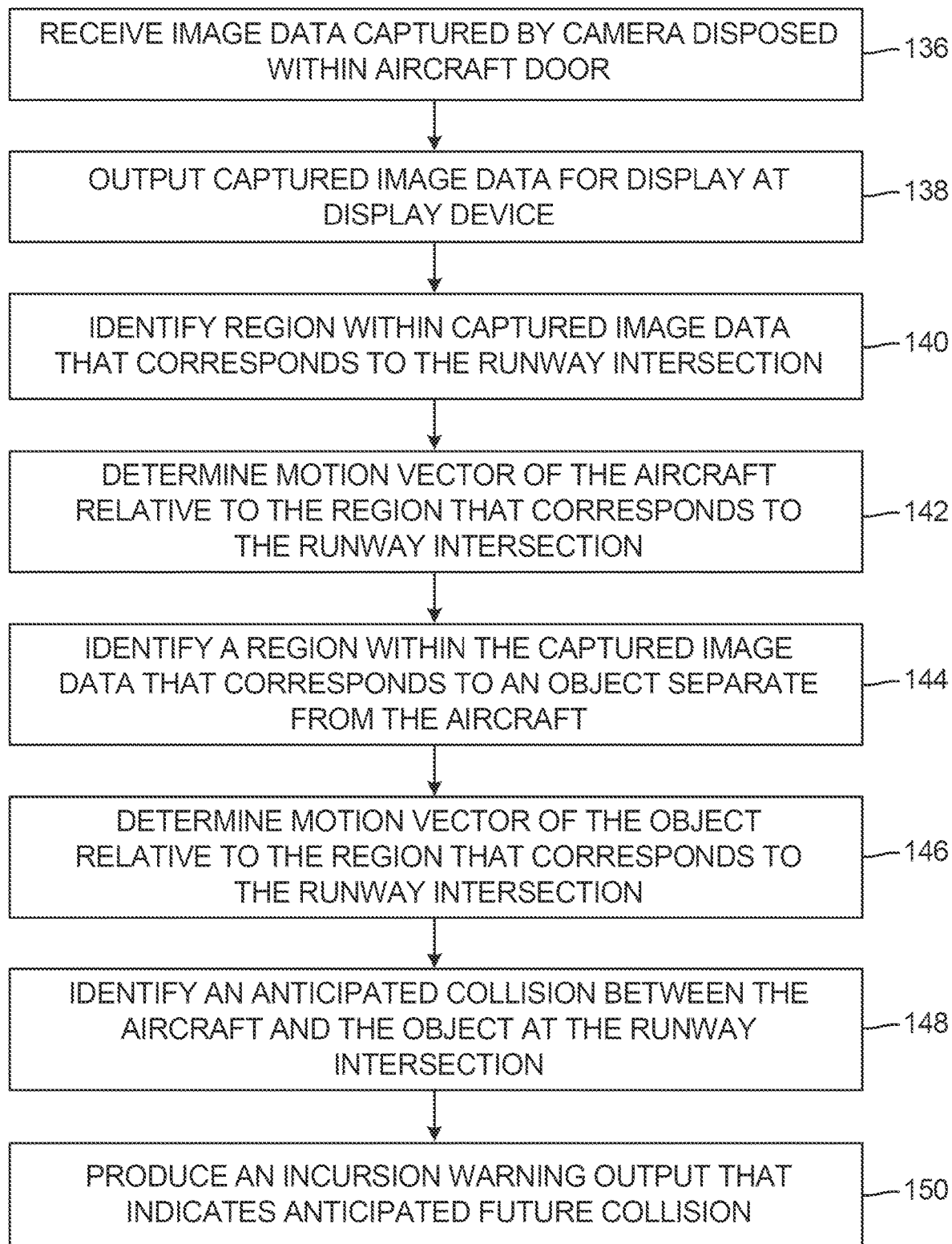
FIG. 15 is a flow chart illustrating example operations for utilizing captured image data from a camera disposed within an aircraft door to produce an incursion warning output that indicates an anticipated collision between the aircraft and an object at a runway intersection.

FIG. 15 is a flow chart illustrating example operations for utilizing captured image data from a camera disposed within an aircraft door to produce a warning of anticipated collision based on an identified region within the captured image data that corresponds to an object separate from the aircraft at a region within the captured image data that corresponds to a runway intersection. For purposes of clarity and ease of discussion, the example operations of FIG. 15 are described below within the context of camera 16a (FIGS. 1-6) disposed within aircraft door 14a (FIGS. 1-4) and operatively connected to display device 20 (FIGS. 2 and 5).

In certain examples, the operations of the example of FIG. 15 can be executed in response to receiving an indication that aircraft 10 is in a taxiing to takeoff, takeoff, or taxiing to terminal phase of flight, such as an input from aircraft avionics 34 indicating that a phase of flight of the aircraft operation indicates that aircraft 10 is taxiing to takeoff, in takeoff, or taxiing to terminal. As such, the example operations, in certain examples, can be performed only when the phase of aircraft operation indicates that an encounter with a runway intersection is expected.

Image data captured by a camera that is disposed within an aircraft door and which has a field of view toward an external environment of the aircraft is received (Step 136). For example, processor 36 can receive image data captured by camera 16a having a field of view that is oriented toward an exterior of aircraft 10. The captured image data is output for display at a display device that is disposed within an interior of the aircraft (Step 138). For instance, processor 36 can output the captured image data that is received from camera 16a for display at display device 20 that is disposed within an interior of aircraft 10.

A region within the captured image data that corresponds to a runway intersection is identified (Step 140). For example, camera 16a can be disposed within a door of aircraft 10 such that the field of view of camera 16a is oriented to capture image data corresponding to a runway intersection ahead of aircraft 10. Processor 36 can analyze the captured image data to identify the captured image data that corresponds to a runway intersection. For instance, processor 36 can analyze the captured image data by utilizing an object detection algorithm, such as the SSD algorithm for object detection, the YOLO object recognition algorithm, or other real-time object detection algorithm to identify a region of the captured image data that corresponds to a runway intersection. For example, processor 36 can utilize the YOLO algorithm that has been trained via image data of runway intersections to recognize the runway intersection as an object, though in other examples, a different object detection algorithm can be used. Processor 36 executing, e.g. the YOLO algorithm, can identify the region within the captured image data that corresponds to the runway intersection as the region of the bounding box produced by the YOLO algorithm that encloses the identified runway intersection object within the captured image data.

A motion vector of the aircraft relative to the region within the captured image data that corresponds to the runway intersection is determined (Step 142). For instance, processor 36 can determine the motion vector associated with the region within the captured image data received from camera 16a that corresponds to the runway intersection using multiple frames of image data received from camera 16a. In other examples, processor 36 can determine the trajectory of the identified runway intersection based on a location of the identified runway intersection within the captured image data and a motion vector of the identified runway intersection determined based on, e.g. an Optical Flow or other motion tracking algorithm.

A region within the captured image data that corresponds to an object separate from the aircraft is identified (Step 144). For example, processor 36 can analyze the captured image data by utilizing an object detection algorithm, such as the SSD algorithm for object detection, the YOLO object recognition algorithm, or other real-time object detection algorithm to identify a region within the captured image data corresponding to an object separate from aircraft 10. For instance, processor 36 can utilize the YOLO object recognition algorithm to identify the region within the captured image data corresponding to an object as the region within the captured image data that is output by the YOLO algorithm as a bounding box around an identified object, though other object detection algorithms are possible. For instance, the YOLO can be trained using baseline image data of objects to recognize any one or more of a plurality of objects. Candidate objects can include, e.g. aircraft of various type and size, and/or vehicles of various type and size.

Processor 36, executing, a YOLO algorithm for example, can determine a region of the captured image data corresponding to an object that is separate from the aircraft as a region of a bounding box surrounding an object that is produced by the YOLO algorithm.

A motion vector of the region that corresponds to the object relative to the region within the captured image data that corresponds to the engine inlet is determined (Step 146). For instance, processor 36 can determine the trajectory of the identified object based on a relative location within the captured image data of the object within successive frames of the captured image data. In other examples, processor 36 can determine the trajectory of the identified object based on a location of the identified object within the captured image data and a motion vector of the identified object determined based on, e.g., an Optical Flow or other motion tracking algorithm.

An anticipated collision between aircraft 10 and the object separate from the aircraft at the identified runway intersection is identified (Step 148). For example, processor 36 can utilize the motion vector corresponding to the aircraft relative to the identified region that corresponds to the runway intersection and the motion vector corresponding to the object separate from the aircraft relative to the identified region that corresponds to the runway intersection to determine whether aircraft 10 and the object separate from the aircraft are anticipated to intersect at the location corresponding to the runway intersection.

An incursion warning indicating an anticipated future collision is produced (Step 150). For instance, processor 36 can output a visual alert for display at display device 20 and/or separate display device within aircraft 10 (e.g., an EFIS display). In certain examples, such as when display device 20 includes a speaker device, the processor 36 can cause display 20 (or other audio output device) to produce an audible alarm corresponding to the anticipated future collision. In some examples, processor 36 can output an alert notification (e.g., a status or other notification) to aircraft avionics or other aircraft systems via an aircraft communication data bus.

Accordingly, processor 36 that is operatively connected with camera 16a can analyze captured image data received from camera 16a to identify an anticipated incursion collision between the aircraft and an object separate from the aircraft. Processor 36 can output a warning of the anticipated collision, thereby alerting the pilots or other flight crew and increasing safety of operation of aircraft 10.

Evacuation Slide Deployment Monitoring

Figure 16A:
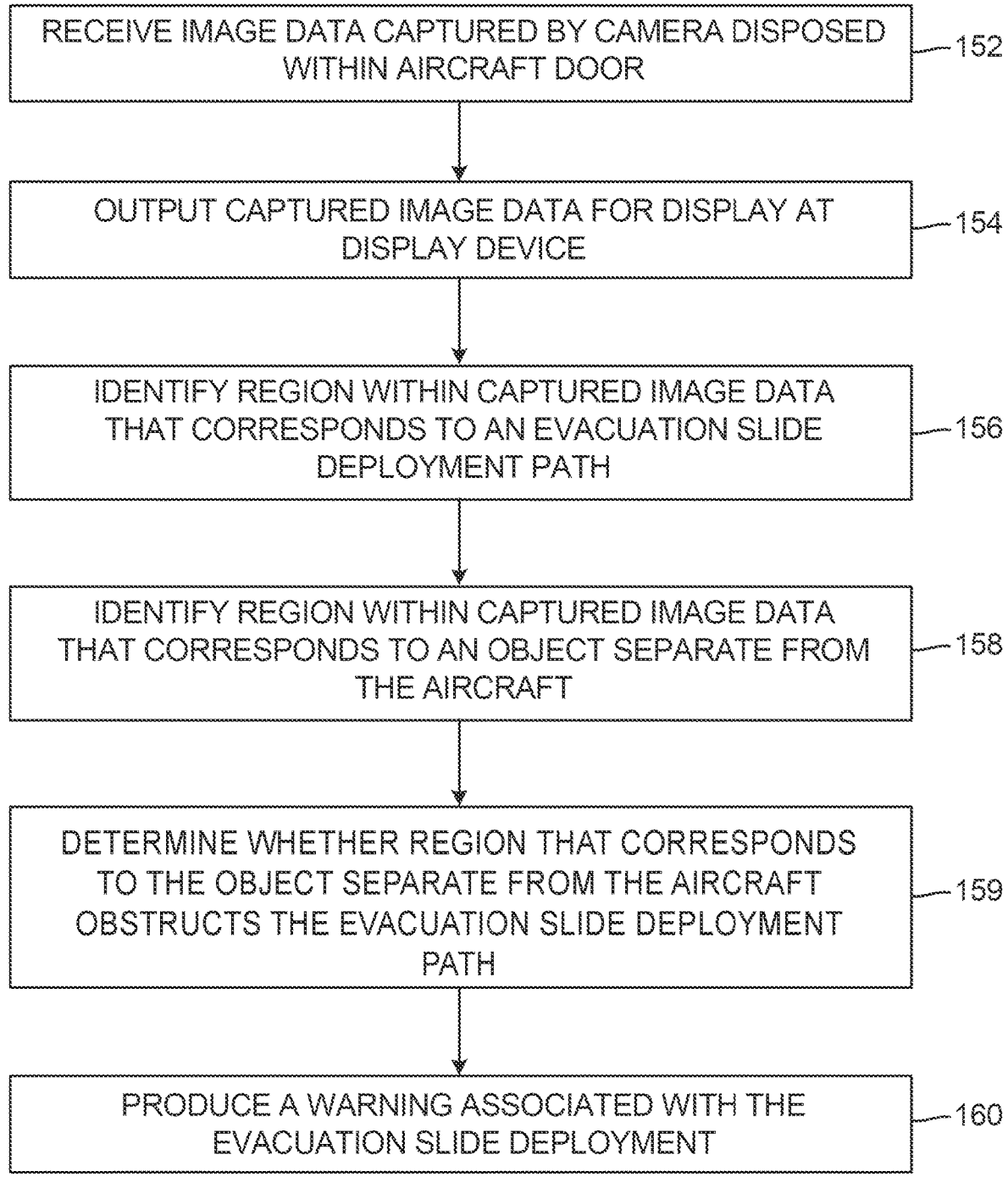
FIG. 16A is a flow chart illustrating example operations for utilizing captured image data from a camera disposed within an aircraft door to produce a warning associated with evacuation slide deployment in response to determining that an identified region within the captured image data that corresponds to an evacuation slide deployment path does not conform to baseline image data.
Figure 16B:
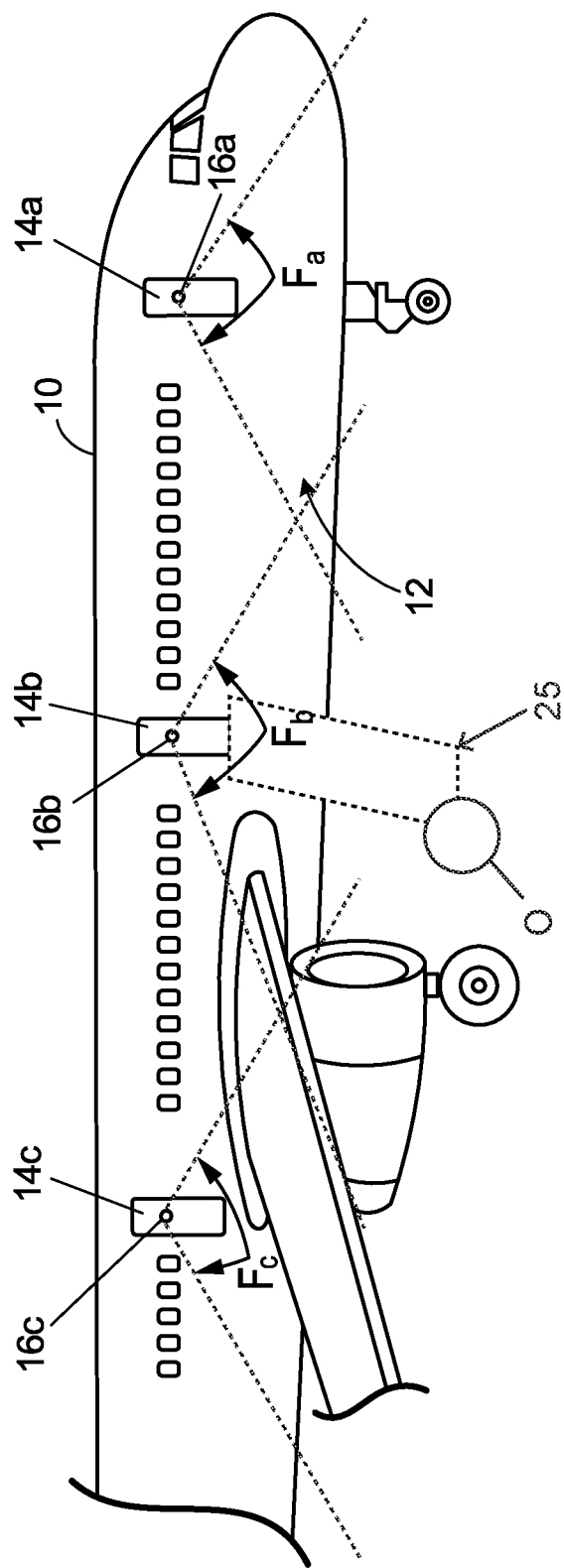
FIG. 16B is a schematic depiction of the aircraft of FIG. 1, including fields of view of the cameras of FIG. 1, and an evacuation slide deployment path.
Figure 16C:
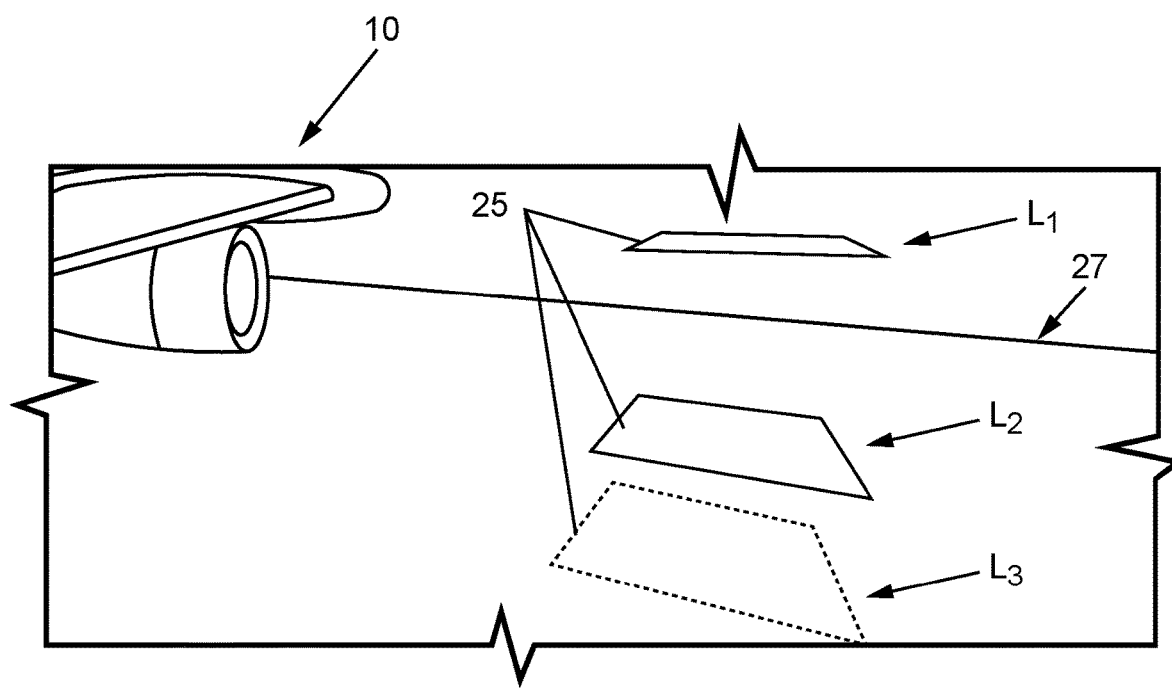
FIG. 16C is a schematic depiction of the evacuation slide deployment path of FIG. 16B against various terrain heights relative to the evacuation slide deployment path.

FIG. 16A is a flow chart illustrating example operations for utilizing captured image data from a camera disposed within an aircraft door to produce a warning in response to determining that a region within the captured image data that corresponds to an evacuation slide deployment path is obstructed. FIG. 16B illustrates aircraft 10 with aircraft skin 12, including doors 14a, 14b, and 14c having cameras 16a (with field of view $F_a$), 16b (with field of view $F_b$), and 16c (with field of view $F_c$) disposed therein, evacuation slide deployment path 25, and object O which is separate from aircraft 10. FIG. 16C shows evacuation slide deployment path 25 in a series of successful or failed deployment outcomes. For purposes of clarity and ease of discussion, the example operations of FIG. 16A are described below within the context of camera 16a (FIGS. 1-6) disposed within aircraft door 14a (FIGS. 1-4) and operatively connected to display device 20 (FIGS. 2 and 5).

As described in more detail below, processor 36 can analyze the image data captured by camera 16a in a variety of ways to determine that the evacuation slide deployment path 25 will generate a failed deployment outcome. This can include, for example, determining whether an object separate from aircraft 10 (such as object O, shown in FIG. 16B) will obstruct the evacuation slide deployment path. Processor 36 can further be configured to produce a warning associated with the evacuation slide deployment path in response to determining that the evacuation slide deployment path will generate a failed deployment outcome (as described below in reference to FIGS. 16B-16C).

In certain examples, the operations of the example of FIG. 16 can be executed in response to receiving an indication that aircraft 10 is in an emergency evacuation phase, such as input from aircraft avionics 24 indicating that the phase of the aircraft operations indicates that evacuation of the aircraft is imminent. As such, the example operations, in certain examples, can be performed only when the phase of aircraft operation indicates that emergency slide deployment is expected.

Image data captured by a camera that is disposed within an aircraft door and which has a field of view toward an external environment of the aircraft is received (Step 152). For example, processor 36 can receive image data captured by camera 16a having a field of view that is oriented toward an exterior of aircraft 10. The captured image data is output for display at a display device that is disposed within an interior of the aircraft (Step 154). For instance, processor 36 can output the captured image data that is received from camera 16a for display at display device 20 that is disposed within an interior of aircraft 10.

A region within the captured image data corresponding to an evacuation slide deployment path is identified (Step 156). For example, camera 16a can be disposed within a door of aircraft 10 such that the field of view of camera 16a is oriented to capture image data corresponding to evacuation slide deployment path 25. Processor 36 can analyze the captured image data to identify a region within the captured image data that corresponds to evacuation slide deployment path 25. For instance, processor 36 can analyze the captured image data by identifying pixels within the captured image data that correspond to an expected location of evacuation slide deployment path 25 within the captured image data based on the camera's fixed location relative to aircraft 10 and the evacuation slide deployment path. Processor 36 can identify the pixels within the captured image data that correspond to the location of evacuation slide deployment path 25 as the region corresponding to evacuation slide deployment path 25. In other examples, other path detection algorithms can be used.

A region within the captured image data that corresponds to an object separate from the aircraft is identified (Step 158). For example, processor 36 can analyze the captured image data by utilizing an object detection algorithm, such as the SSD algorithm for object detection, the YOLO object recognition algorithm, or other real-time object detection algorithm to identify a region of the captured image data that corresponds to object O (shown in FIG. 16B) separate from the aircraft in the captured image data. For instance, processor 36 can utilize the YOLO object recognition algorithm to identify the region within the captured image data corresponding to object O as the region within the captured image data that is output by the YOLO algorithm as a bounding box around an identified object separate from the aircraft, though other object detection algorithms are possible. For instance, the YOLO algorithm can be trained using baseline image data of objects separate from the aircraft to recognize any one or more of a plurality of objects. Candidate objects can include, e.g. vegetation of various types and sizes, and/or rocks of various types or sizes, and/or a ground surface. Processor 36, executing, a YOLO algorithm for example, can determine a region of the captured image data corresponding to an object that is separate from the aircraft as a region of a bounding box surrounding an object that is produced by the YOLO algorithm.

In some examples, candidate objects can include topological variations of the ground surface. This can occur when, for example, aircraft 10 is located on an incline or another surface which is not level and/or uniform, or when one set of landing gear for aircraft 10 fails. FIG. 16C shows three potential locations ($L_1$, $L_2$, $L_3$) for evacuation slide deployment path 25 relative to ground surface 27. As shown in FIG. 16C, evacuation slide deployment path 25 can be aligned with ground surface 27 (location $L_2$, showing a successful landing gear deployment outcome) relative to ground surface 27. Evacuation slide deployment path 25 can also be located above ground surface 27 (location $L_1$, a failed landing gear deployment outcome due to the collapse or other failure of the left main landing gear) or below ground surface 27 (location $L_3$, a failed landing gear deployment outcome due to the collapse or other failure of the right main landing gear). The relative location of evacuation slide deployment path 25 to ground surface 27 can vary based on the surface, potential obstructions, aircraft orientation, or other factors. The field of view $F_a$ of camera 16a can determine if obstructions are present within evacuation slide deployment path 25 even if the left or right main landing gear fail during landing.

It is determined whether the object separate from the aircraft obstructs evacuation slide deployment path 25 (Step 159). For example, processor 36 can determine the intersection of the region of the captured imaged data corresponding to evacuation slide deployment path 25 and the region of the captured image data corresponding to an object separate from the aircraft, such as object O. For instance, processor 36 can determine a pixel location of the object separate from the aircraft within the captured image data. The pixel location can be converted to a physical location based on the known field of view of camera 16a relative to a location of camera 16a on aircraft 10. Processor 36 can determine, based on the physical location of object O and the region of the captured image data corresponding to evacuation slide deployment path 25, that the object separate from the aircraft and evacuation slide deployment path 25 intersect. Processor 36 can determine that object O is obstructing evacuation slide deployment path 25 in response to identifying the intersection.

A warning associated with the evacuation slide deployment is produced in response to determining that evacuation slide deployment path 25 is obstructed (Step 160). For example, processor 36 can output a visual alert for display at display device 20 and/or a separate display device within aircraft 10 (e.g., an EFIS display). In certain examples, such as when display device 20 includes a speaker device, processor 36 can cause display 20 (or other audio output device) to produce an audible alarm corresponding to the warning associated with the obstruction of evacuation slide deployment path 25. In some examples, processor 36 can output an alert notification (e.g., a status or other notification) to aircraft avionics or other aircraft systems via an aircraft communication data bus. A failed evacuation slide deployment outcome due to an obstacle such as object O intersecting with evacuation slide deployment path 25 can also trigger a warning associated with the evacuation slide deployment. This warning can additionally or alternatively take the form of a green/red light system which communicates to crew members whether aircraft 10 should continue taxiing to a different location (a "red light" scenario in which the evacuation slide should not be deployed) or if the present location of aircraft 10 is suitable for deployment of the evacuation slide (a "green light" scenario). This warning can optionally include an alert that an aircraft door is being opened before a suitable location for the evacuation slide has been reached and/or a communication regarding directions to the nearest deployed evacuation slide on the aircraft.

Accordingly, techniques of this disclosure can enable processor 36 to analyze captured image data received from camera 16a to produce a warning in response to determining that an evacuation slide deployment path is obstructed, thereby alerting the pilots or other flight crew and increasing safety of operation of aircraft 10. Captured image data from any of cameras 16a, 16b, 16c, 16d can be aggregated to gather additional information about the external environment of aircraft 10. Additionally, camera 16a and processor 36 can form part of a system which can automate the evacuation slide deployment process and/or ensure that the evacuation slide is not deployed before a suitable location for the evacuation slide has been reached. This can help to prevent deployment of the evacuation slide when it is unnecessary.

Aggregation of Image Data Captured From Multiple Cameras

Figure 17:
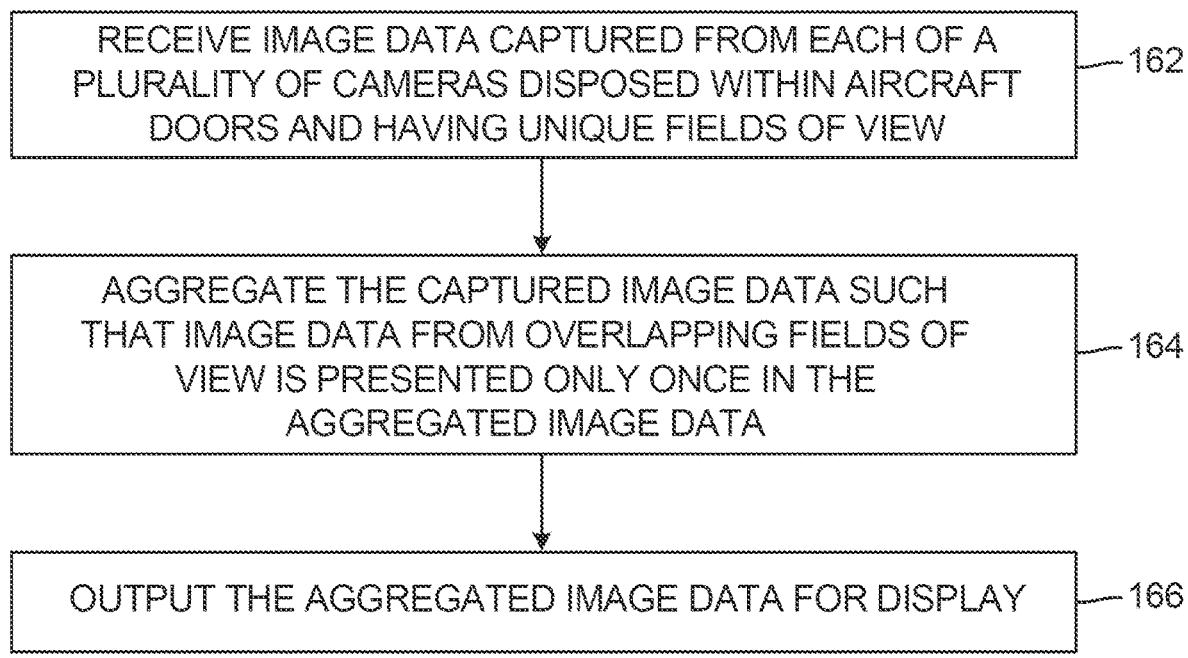
FIG. 17 is a flow chart illustrating example operations for aggregating captured image data received from each of a plurality of cameras disposed in a plurality of aircraft doors and having a unique field of view to produce aggregated image data representative of the external environment of the aircraft.

FIG. 17 is a flow chart illustrating example operations for utilizing captured image data from each of a plurality of cameras disposed within aircraft doors to output the aggregated image data for display. For purposes of clarity and ease of discussion, the example operations of FIG. 17 are described below within the context of cameras 16a, 16b, 16c, and 16d (FIG. 6) disposed within aircraft doors 14a, 14b, 14c, and 14d (FIG. 6).

Image data captured by each camera of the plurality of cameras disposed within aircraft doors and which has a unique field of view with respect to each other camera of the plurality of cameras toward an external environment of the aircraft is received (Step 162). For example, processor 36 can receive image data captured by cameras 16a, 16b, 16c, and 16d, each having a unique field of view among the group of cameras 16a, 16b, 16c, and 16d, and having fields of view oriented toward an exterior of aircraft 10.

Image data captured by each camera of the plurality of cameras is aggregated such that image data from overlapping fields of view of cameras 16a, 16b, 16c, and 16d is presented only once in the aggregated image data (Step 164). For instance, processor 36 can aggregate the captured image data by utilizing an image stitching algorithm, such as Keypoint, Registration, or other real-time image stitching algorithms to aggregate the captured image data such that image data corresponding to overlapping fields of view is presented only once in the aggregated image data.

As an example, processor 36 can utilize a Keypoint algorithm to detect and describe key features in image data captured by each camera of the plurality of cameras. For instance, the Keypoint algorithm can use Harris Corner Detection, Scale Invariant Feature Transform (SIFT), Speed-Up Robust Features (SURF) algorithms, or other feature detection and description algorithms to detect and describe key features in image data captured by each of the plurality of cameras. The Keypoint algorithm matches key features detected in multiple image data captured by each of the plurality of cameras, e.g., using the Euclidean distance between each key feature of each image data captured by each camera of the plurality of cameras. Processor 36 can transform and warp each image data from the captured image data from each of a plurality of cameras to align each of the matched key features, e.g., using the Random Sample Consensus algorithm (RANSAC). Processor 36 stitches each transformed and warped image data from each camera of the plurality of cameras while image data from overlapping fields of view is presented only once in the aggregate image data.

Aggregated image data is output for display (Step 166). For instance, processor 36 can output the aggregated image data with image data from overlapping fields of view presented only once at display device 20 or other display device.

Accordingly, processor 36 can analyze captured image data received from each camera of the cameras 16a, 16b, 16c, and 16d to produce aggregated image data with image data from overlapping fields of view presented only once, thereby providing the pilots or other flight crew an understanding of the external environment of aircraft 10, increasing the safety of operations of aircraft 10. Processor 36 can further analyze the aggregated image data by, for example, performing the functions described in reference to FIGS. 7A-16C—in particular, identifying a region within the aggregated image data that corresponds to the engine inlet, monitoring the engine inlet based on the aggregated image data associated with the leading edge of the wing (which can include detecting ground personnel within a threshold distance, detecting foreign objects to anticipate future ingestion and/or detecting damage to the engine inlet), and producing a warning associated with the engine inlet in response to the aggregated image data.

At least one of cameras 16a, 16b, 16c, 16d can be disposed within an aircraft door (such as doors 14a, 14b, 14c, 14d). To monitor the engine inlet, at least one camera of cameras 16a, 16b, 16c, 16d can be oriented such that the engine inlet is within the at least one camera's field of view. The location of cameras 16a, 16b, 16c, 16d can be varied to provide at least one field of view which includes the region to be monitored (here, the engine inlet). Cameras which do not have the engine inlet within their field of view can still add useful aggregated image data to provide information about, for example, objects separate from the aircraft which may be ingested by the engine.

Discussion of Potential Embodiments

The following are non-exclusive descriptions of possible embodiments of the present invention.

A system for monitoring an external environment of the aircraft includes an aircraft door, a camera, a display device, and a processor. The camera has a field of view toward the external environment of the aircraft and is disposed within an aircraft door such that an engine inlet of an engine of the aircraft is within the field of view of the camera. The display device is disposed within an interior of the aircraft. The processor is operatively coupled to the camera and display device. The processor receives image data captured by the camera that is representative of the external environment of the aircraft and outputs the captured image data for display at the display device. The processor analyzes the captured image data by: identifying a region within the captured image data that corresponds to the engine inlet, monitoring the engine inlet based on the captured image data corresponding to the engine inlet, and producing a warning associated with the engine inlet in response to the captured image data.

The system of the preceding paragraph can optionally include, additionally and/or alternatively, any one or more of the following features, configurations, and/or additional components:

A system for monitoring an external environment of an aircraft, according to an exemplary embodiment of this disclosure, among other possible things includes an aircraft door, a camera, a display device, and a processor. The camera has a field of view toward the external environment of the aircraft and is disposed within an aircraft door such that an engine inlet of an engine of the aircraft is within the field of view of the camera. The display device is disposed within an interior of the aircraft. The processor is operatively coupled to the camera and display device. The processor receives image data captured by the camera that is representative of the external environment of the aircraft and outputs the captured image data for display at the display device. The processor analyzes the captured image data by: identifying a region within the captured image data that corresponds to the engine inlet, monitoring the engine inlet based on the captured image data corresponding to the engine inlet, and producing a warning associated with the engine inlet in response to the captured image data.

A further embodiment of the foregoing system, wherein the processor is operatively coupled to the camera and to the display device to analyze the captured image data for ground personnel safety-clearance by identifying a region within the captured image data that corresponds to a person outside the aircraft, determining an image distance between the region within the captured image data that corresponds to the engine inlet and the region within the captured image data that corresponds to the person outside the aircraft, converting the image distance to a physical distance based on the field of view of the camera, and producing a warning corresponding to proximity of ground personnel to the engine inlet in response to determining that the physical distance is less than a threshold distance.

A further embodiment of any of the foregoing systems, wherein the processor is operatively coupled to the camera to utilize an object detection algorithm to identify at least one of: a region within the captured image data corresponding to the engine inlet and a region within the captured image data corresponding to a person outside the aircraft.

A further embodiment of any of the foregoing systems, wherein the processor is operatively coupled to the camera to determine a shortest-path least number of pixels between the region of the captured image data corresponding to the engine inlet and the region within the captured image data corresponding to the person outside the aircraft.

A further embodiment of any of the foregoing systems, wherein the processor is operatively coupled to the camera and to the display device to analyze the captured image data for engine inlet foreign object damage by identifying a region within the captured image data that corresponds to an object separate from the aircraft, determining a trajectory of the region that corresponds to the object relative to the region within the captured image data that corresponds to the engine inlet, determining, based on the trajectory, whether a probability that the object was ingested by the engine inlet exceeds a threshold probability, and producing a warning corresponding to ingestion of a foreign object by the engine inlet in response to determining that the probability that the object was ingested by the engine inlet exceeds the threshold probability.

A further embodiment of any of the foregoing systems, wherein the processor is operatively coupled to the camera to identify a region within the captured image data that corresponds to an object separate from the aircraft by utilizing an object detection algorithm.

A further embodiment of any of the foregoing systems, wherein the object detection algorithm is a real-time neural network-based algorithm trained using baseline image data of objects.

A further embodiment of any of the foregoing systems, wherein the processor is operatively coupled to the camera to analyze the image data to determine a motion vector of the region corresponding to the engine inlet and a motion vector of the region corresponding to the object separate from the aircraft using multiple successive frames of captured image data.

A further embodiment of any of the foregoing systems, wherein the processor is operatively coupled to the camera to utilize an optical flow algorithm to determine the motion vector of the region corresponding to the leading edge of the wing and the motion vector corresponding to the object separate from the aircraft.

A further embodiment of any of the foregoing systems, wherein the processor is operatively coupled to the camera and to the display device to analyze the captured image data for engine inlet damage by determining whether the region within the image data that corresponds to the engine inlet conforms to baseline image data corresponding to the engine inlet of the engine, and producing a warning associated with the engine inlet in response to determining that the region within the image data that corresponds to the engine inlet does not conform to the baseline image data indicating damage to the engine inlet or change to the engine inlet.

A further embodiment of any of the foregoing systems, wherein the processor is operatively coupled to the camera to access pixel coordinates of captured image data associated with the engine inlet in a baseline state, cause a computer-readable memory to store the pixel coordinates corresponding to the engine inlet in the baseline state, and compare the pixel coordinates corresponding to the engine inlet during operation with the pixel coordinates corresponding to the engine inlet in the baseline state.

A further embodiment of any of the foregoing systems, wherein the warning is a visual alert for display at the display device, an audible alarm, or an alert notification.

A method of monitoring an external environment of an aircraft includes receiving, with a processor, image data captured by a camera disposed within an aircraft door of the aircraft such that an engine inlet of an engine of the aircraft is within a field of view of the camera. The processor analyzes the captured image data by: identifying a region within the captured image data that corresponds to the engine inlet, monitoring the engine inlet based on the captured image data corresponding to the engine inlet, and producing a warning associated with the engine inlet in response to the captured image data. The captured image data is output for display at a display device disposed within an interior of the aircraft.

The method of the preceding paragraph can optionally include, additionally and/or alternatively, any one or more of the following features, configurations, and/or additional components:

A method of monitoring an external environment of an aircraft, according to an exemplary embodiment of this disclosure, among other possible things includes receiving, with a processor, image data captured by a camera disposed within an aircraft door of the aircraft such that an engine inlet of an engine of the aircraft is within a field of view of the camera. The processor analyzes the captured image data by: identifying a region within the captured image data that corresponds to the engine inlet, monitoring the engine inlet based on the captured image data corresponding to the engine inlet, and producing a warning associated with the engine inlet in response to the captured image data. The captured image data is output for display at a display device disposed within an interior of the aircraft.

A further embodiment of the foregoing method, further comprising identifying a region within the captured image data that corresponds to a person outside the aircraft. An image distance between the region within the captured image data that corresponds to the engine inlet and the region within the captured image data that corresponds to the person outside the aircraft is determined. The image distance is converted to a physical distance based on the field of view of the camera. A warning which corresponds to proximity of ground personnel to the engine inlet is produced in response to determining that the physical distance is less than a threshold distance.

A further embodiment of any of the foregoing methods, further comprising identifying a region within the captured image data that corresponds to an object separate from the aircraft. A trajectory of the region that corresponds to the object relative to the region within the captured image data that corresponds to the engine inlet is determined. It is determined, based on the trajectory, whether a probability that the object was ingested by the engine inlet exceeds a threshold probability. A warning corresponding to ingestion of a foreign object by the engine inlet is produced in response to determining that the probability that the object was ingested by the engine inlet exceeds the threshold probability.

A further embodiment of any of the foregoing methods, further comprising determining whether the region within the image data that corresponds to the engine inlet conforms to baseline image data corresponding to the engine inlet of the engine. A warning associated with the engine inlet is produced in response to determining that the region within the image data that corresponds to the engine inlet does not conform to the baseline image data.

A system of monitoring an external environment of the aircraft includes a plurality of aircraft doors, a plurality of cameras, a display device, and a processor. At least one of the plurality of cameras are disposed within one of the aircraft doors and each camera has a field of view that is unique among the plurality of cameras. An engine inlet of an engine of the aircraft is within the field of view of at least one camera. The display device is disposed within an interior of the aircraft. The processor is operatively coupled to the camera and display device to: receive, from each respective camera of the plurality of cameras, image data captured by the respective camera that is representative of the external environment of the aircraft within the field of view of the respective camera, aggregate the captured image data received from each camera of the plurality of cameras to produce aggregated image data representative of the external environment of the aircraft, wherein image data from overlapping fields of view of the plurality of cameras is presented only once in the aggregated image data, analyze the aggregated image data, and output the aggregated image data for display at the display device. The processor analyzes the aggregated image data by: identifying a region within the aggregated image data that corresponds to an engine inlet of an engine of the aircraft, monitoring the engine inlet, based on the aggregated image data corresponding to the engine inlet, and producing a warning associated with the engine inlet in response to the aggregated image data.

The system of the preceding paragraph can optionally include, additionally and/or alternatively, any one or more of the following features, configurations, and/or additional components:

A system of monitoring an external environment of the aircraft, according to an exemplary embodiment of this disclosure, among other possible things includes a plurality of aircraft doors, a plurality of cameras, a display device, and a processor. At least one of the plurality of cameras are disposed within one of the aircraft doors and each camera has a field of view that is unique among the plurality of cameras. An engine inlet of an engine of the aircraft is within the field of view of at least one camera. The display device is disposed within an interior of the aircraft. The processor is operatively coupled to the camera and display device to: receive, from each respective camera of the plurality of cameras, image data captured by the respective camera that is representative of the external environment of the aircraft within the field of view of the respective camera, aggregate the captured image data received from each camera of the plurality of cameras to produce aggregated image data representative of the external environment of the aircraft, wherein image data from overlapping fields of view of the plurality of cameras is presented only once in the aggregated image data, analyze the aggregated image data, and output the aggregated image data for display at the display device. The processor analyzes the aggregated image data by: identifying a region within the aggregated image data that corresponds to an engine inlet of an engine of the aircraft, monitoring the engine inlet, based on the aggregated image data corresponding to the engine inlet, and producing a warning associated with the engine inlet in response to the aggregated image data.

A further embodiment of the foregoing system, wherein the processor is operatively coupled to the camera and to the display device to analyze the aggregated image data for ground personnel safety-clearance by identifying a region within the aggregated image data that corresponds to a person outside the aircraft, determining an image distance between the region within the aggregated image data that corresponds to the engine inlet and the region within the aggregated image data that corresponds to the person outside the aircraft, converting the image distance to a physical distance based on the field of view of the camera, and producing a warning corresponding to proximity of ground personnel to the engine inlet in response to determining that the physical distance is less than a threshold distance.

A further embodiment of any of the foregoing systems, wherein the processor is operatively coupled to the camera and to the display device to analyze the aggregated image data for engine inlet foreign object damage by identifying a region within the aggregated image data that corresponds to an object separate from the aircraft, determining a trajectory of the region that corresponds to the object relative to the region within the aggregated image data that corresponds to the engine inlet, determining, based on the trajectory, whether a probability that the object was ingested by the engine inlet exceeds a threshold probability, and producing a warning corresponding to ingestion of a foreign object by the engine inlet in response to determining that the probability that the object was ingested by the engine inlet exceeds the threshold probability.

A further embodiment of any of the foregoing systems, wherein the processor is operatively coupled to the camera and to the display device to analyze the aggregated image data for engine inlet damage by determining whether the region within the aggregated image data that corresponds to the engine inlet conforms to baseline image data corresponding to the engine inlet of the engine, and producing a warning associated with the engine inlet in response to determining that the region within the aggregated image data that corresponds to the engine inlet does not conform to the baseline image data indicating damage to the engine inlet or change to the engine inlet.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for monitoring an external environment of an aircraft, the system comprising:
   an aircraft door;
   a camera with a field of view toward the external environment of the aircraft and disposed within the aircraft door such that an engine inlet of an engine of the aircraft is within the field of view of the camera;
   a display device disposed within an interior of the aircraft; and
   a processor operatively coupled to the camera and to the display device to:
     receive image data captured by the camera that is representative of the external environment of the aircraft;
     output the captured image data for display at the display device; and
     analyze the captured image data by:
       identifying a region within the captured image data that corresponds to the engine inlet;
       monitoring the engine inlet, based on the captured image data corresponding to the engine inlet;
       accessing pixel coordinates of captured image data associated with the engine inlet in a baseline state;
       causing a computer-readable memory to store the pixel coordinates corresponding to the engine inlet in the baseline state;
       comparing the pixel coordinates corresponding to the engine inlet during operation with the pixel coordinates corresponding to the engine inlet in the baseline state; and
       producing a warning associated with the engine inlet based upon the captured image data.

2. The system of claim 1, wherein the processor is operatively coupled to the camera and to the display device to analyze the captured image data for ground personnel safety-clearance by:
   identifying a region within the captured image data that corresponds to a person outside the aircraft;
   determining an image distance between the region within the captured image data that corresponds to the engine inlet and the region within the captured image data that corresponds to the person outside the aircraft;
   converting the image distance to a physical distance based on the field of view of the camera; and producing a warning corresponding to proximity of ground personnel to the engine inlet in response to determining that the physical distance is less than a threshold distance.

3. The system of claim 2, wherein the processor is operatively coupled to the camera to utilize an object detection algorithm to identify at least one of: a region within the captured image data corresponding to the engine inlet and a region within the captured image data corresponding to a person outside the aircraft.

4. The system of claim 3, wherein the processor is operatively coupled to the camera to determine a shortest-path least number of pixels between the region of the captured image data corresponding to the engine inlet and the region within the captured image data corresponding to the person outside the aircraft.

5. The system of claim 1, wherein the processor is operatively coupled to the camera and to the display device to analyze the captured image data for engine inlet foreign object ingestion by:
identifying a region within the captured image data that corresponds to an object separate from the aircraft;
determining a trajectory of the region that corresponds to the object relative to the region within the captured image data that corresponds to the engine inlet;
determining, based on the trajectory, whether a probability that the object was ingested by the engine inlet exceeds a threshold probability; and
producing a warning corresponding to ingestion of a foreign object by the engine inlet in response to determining that the probability that the object was ingested by the engine inlet exceeds the threshold probability.

6. The system of claim 5, wherein the processor is operatively coupled to the camera to identify a region within the captured image data that corresponds to an object separate from the aircraft by utilizing an object detection algorithm.

7. The system of claim 6, wherein the object detection algorithm is a real-time neural network-based algorithm trained using baseline image data of objects.

8. The system of claim 6, wherein the processor is operatively coupled to the camera to analyze the image data to determine a motion vector of the region corresponding to the engine inlet and a motion vector of the region corresponding to the object separate from the aircraft using multiple successive frames of captured image data.

9. The system of claim 8, wherein the processor is operatively coupled to the camera to utilize an optical flow algorithm to determine the motion vector of the region corresponding to the engine inlet and the motion vector corresponding to the object separate from the aircraft.

10. The system of claim 1, wherein the processor is operatively coupled to the camera and to the display device to analyze the captured image data for engine inlet damage by:
determining whether the region within the image data that corresponds to the engine inlet conforms to baseline image data corresponding to the engine inlet of the engine; and
producing a warning associated with the engine inlet in response to determining that the region within the image data that corresponds to the engine inlet does not conform to the baseline image data indicating damage to the engine inlet or change to the engine inlet.

11. The system of claim 1, wherein the warning is a visual alert for display at the display device, an audible alarm, or an alert notification.

12. A method of monitoring an external environment of an aircraft, the method comprising:
receiving, with a processor, image data captured by a camera disposed within an aircraft door of the aircraft such that an engine inlet of an engine of the aircraft is within a field of view of the camera;
analyzing, with the processor, the captured image data by:
identifying a region within the captured image data that corresponds to the engine inlet;
monitoring the engine inlet, based on the captured image data corresponding to the engine inlet;
accessing pixel coordinates of captured image data associated with the engine inlet in a baseline state;
causing a computer-readable memory to store the pixel coordinates corresponding to the engine inlet in the baseline state;
comparing the pixel coordinates corresponding to the engine inlet during operation with the pixel coordinates corresponding to the engine inlet in the baseline state; and
producing a warning associated with the engine inlet based upon the captured image data; and
outputting the captured image data for display at a display device disposed within an interior of the aircraft.

13. The method of claim 12, further comprising:
identifying a region within the captured image data that corresponds to a person outside the aircraft;
determining an image distance between the region within the captured image data that corresponds to the engine inlet and the region within the captured image data that corresponds to the person outside the aircraft;
converting the image distance to a physical distance based on the field of view of the camera; and
producing a warning corresponding to proximity of ground personnel to the engine inlet in response to determining that the physical distance is less than a threshold distance.

14. The method of claim 12, further comprising:
identifying a region within the captured image data that corresponds to an object separate from the aircraft;
determining a trajectory of the region that corresponds to the object relative to the region within the captured image data that corresponds to the engine inlet;
determining, based on the trajectory, whether a probability that the object was ingested by the engine inlet exceeds a threshold probability; and
producing a warning corresponding to ingestion of a foreign object by the engine inlet in response to determining that the probability that the object was ingested by the engine inlet exceeds the threshold probability.

15. The method of claim 12, further comprising:
determining whether the region within the image data that corresponds to the engine inlet conforms to baseline image data corresponding to the engine inlet of the engine; and
producing a warning associated with the engine inlet in response to determining that the region within the image data that corresponds to the engine inlet does not conform to the baseline image data.

16. A system for monitoring an external environment of an aircraft, the system comprising:
a plurality of aircraft doors;
a plurality of cameras, at least one camera of the plurality of cameras being disposed within one of the plurality of aircraft doors and each camera of the plurality of cameras having a field of view that is unique among the plurality of cameras, such that an engine inlet of an engine of the aircraft is within the field of view of at least one camera;

a display device disposed within an interior of the aircraft; and a processor operatively coupled to the camera and to the display device to:
receive, from each respective camera of the plurality of cameras, image data captured by the respective camera that is representative of the external environment of the aircraft within the field of view of the respective camera;
aggregate the captured image data received from each camera of the plurality of cameras to produce aggregated image data representative of the external environment of the aircraft, wherein image data from overlapping fields of view of the plurality of cameras is presented only once in the aggregated image data;
analyze the aggregated image data by:
identifying a region within the aggregated image data that corresponds to an engine inlet of an engine of the aircraft;
monitoring the engine inlet, based on the aggregated image data corresponding to the engine inlet;
accessing pixel coordinates of captured image data associated with the engine inlet in a baseline state;
causing a computer-readable memory to store the pixel coordinates corresponding to the engine inlet in the baseline state;
comparing the pixel coordinates corresponding to the engine inlet during operation with the pixel coordinates corresponding to the engine inlet in the baseline state; and
producing a warning associated with the engine inlet based upon the aggregated image data; and
output the aggregated image data for display at the display device, such that the displayed image data includes image data from overlapping fields of view only once.

17. The system of claim 16, wherein the processor is operatively coupled to the camera and to the display device to analyze the aggregated image data for ground personnel safety-clearance by:

identifying a region within the aggregated image data that corresponds to a person outside the aircraft;
determining an image distance between the region within the aggregated image data that corresponds to the engine inlet and the region within the aggregated image data that corresponds to the person outside the aircraft;
converting the image distance to a physical distance based on the field of view of the camera; and
producing a warning corresponding to proximity of ground personnel to the engine inlet in response to determining that the physical distance is less than a threshold distance.

18. The system of claim 16, wherein the processor is operatively coupled to the camera and to the display device to analyze the aggregated image data for engine inlet foreign object ingestion by:

identifying a region within the aggregated image data that corresponds to an object separate from the aircraft;
determining a trajectory of the region that corresponds to the object relative to the region within the aggregated image data that corresponds to the engine inlet;
determining, based on the trajectory, whether a probability that the object was ingested by the engine inlet exceeds a threshold probability; and
producing a warning corresponding to ingestion of a foreign object by the engine inlet in response to determining that the probability that the object was ingested by the engine inlet exceeds the threshold probability.

19. The system of claim 16, wherein the processor is operatively coupled to the camera and to the display device to analyze the aggregated image data for engine inlet damage by:

determining whether the region within the aggregated image data that corresponds to the engine inlet conforms to baseline image data corresponding to the engine inlet of the engine; and
producing a warning associated with the engine inlet in response to determining that the region within the aggregated image data that corresponds to the engine inlet does not conform to the baseline image data indicating damage to the engine inlet or change to the engine inlet.

* * * * *